United States Patent
Wu et al.

(10) Patent No.: US 7,826,863 B2
(45) Date of Patent: *Nov. 2, 2010

(54) POWER ALLOCATION IN A WIRELESS COMMUNICATION SYSTEM

(75) Inventors: Xinzhou Wu, Monmouth Junction, NJ (US); Arnab Das, Summit, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 532 days.

This patent is subject to a terminal disclaimer.

(21) Appl. No.: 11/855,054

(22) Filed: Sep. 13, 2007

(65) Prior Publication Data

US 2008/0188256 A1 Aug. 7, 2008

Related U.S. Application Data

(60) Provisional application No. 60/844,817, filed on Sep. 14, 2006, provisional application No. 60/848,041, filed on Sep. 26, 2006.

(51) Int. Cl.
*H04B 7/00* (2006.01)
*H04B 7/185* (2006.01)
*H04B 17/00* (2006.01)
*H04B 7/216* (2006.01)
*H04W 4/00* (2009.01)
*H04W 36/00* (2009.01)
*H04W 72/00* (2009.01)

(52) U.S. Cl. .................. 455/522; 455/67.11; 455/422.1; 455/436; 455/437; 455/439; 455/450; 370/342; 370/318; 370/331

(58) Field of Classification Search ................. 455/522, 455/67.1, 422.1, 436, 437, 439, 450; 370/342, 370/318, 331
See application file for complete search history.

(56) References Cited

U.S. PATENT DOCUMENTS

| | | | |
|---|---|---|---|
| 6,411,817 B1* | 6/2002 | Cheng et al. ................. | 455/522 |
| 6,529,494 B1* | 3/2003 | Ostman et al. ............... | 370/337 |
| 6,564,067 B1* | 5/2003 | Agin ........................... | 455/522 |
| 6,628,924 B1* | 9/2003 | Miyamoto .................... | 455/69 |
| 6,628,929 B1* | 9/2003 | Nomura ....................... | 455/126 |
| 6,711,149 B1* | 3/2004 | Yano et al. ................... | 370/342 |
| 6,748,234 B1* | 6/2004 | Agrawal et al. .............. | 455/522 |

(Continued)

FOREIGN PATENT DOCUMENTS

EP 1119113 7/2001

(Continued)

OTHER PUBLICATIONS

International Search report—PCT/US07/078480, International Search Authority—European Patent Office—Jan. 21, 2008.

*Primary Examiner*—Matthew D Anderson
*Assistant Examiner*—Bobbak Safaipour
(74) *Attorney, Agent, or Firm*—Donald C. Kordich

(57) ABSTRACT

Systems and methodologies are described that facilitate allocating power levels in a wireless communication network. A metric based upon spectral efficiency can be employed in connection with optimizing power allocation. Further, power for transmitters to utilize can be assigned as a function of time. Moreover, a single sub-carrier network and/or a multiple sub-carrier networks can leverage one or more power allocation schemes.

25 Claims, 26 Drawing Sheets

U.S. PATENT DOCUMENTS

| | | | |
|---|---|---|---|
| 6,873,613 B1 * | 3/2005 | Dent | 370/347 |
| 7,257,376 B2 * | 8/2007 | Reudink | 455/63.1 |
| 7,602,722 B2 * | 10/2009 | Chheda | 370/236 |
| 7,613,233 B2 * | 11/2009 | Hottinen | 375/219 |
| 7,623,884 B2 * | 11/2009 | Moon et al. | 455/522 |
| 2004/0014425 A1 * | 1/2004 | Unno | 455/69 |
| 2004/0106412 A1 * | 6/2004 | Laroia et al. | 455/448 |
| 2004/0136345 A1 * | 7/2004 | Yano et al. | 370/335 |
| 2008/0070585 A1 * | 3/2008 | Wu et al. | 455/452.2 |
| 2008/0188256 A1 * | 8/2008 | Wu et al. | 455/522 |
| 2009/0131068 A1 * | 5/2009 | Wu et al. | 455/452.2 |
| 2009/0131069 A1 * | 5/2009 | Wu et al. | 455/452.2 |
| 2010/0128504 A1 * | 5/2010 | Lee et al. | 363/89 |

FOREIGN PATENT DOCUMENTS

| | | |
|---|---|---|
| WO | 0122599 | 3/2001 |
| WO | 0232011 | 4/2002 |
| WO | 2004088899 | 10/2004 |

* cited by examiner

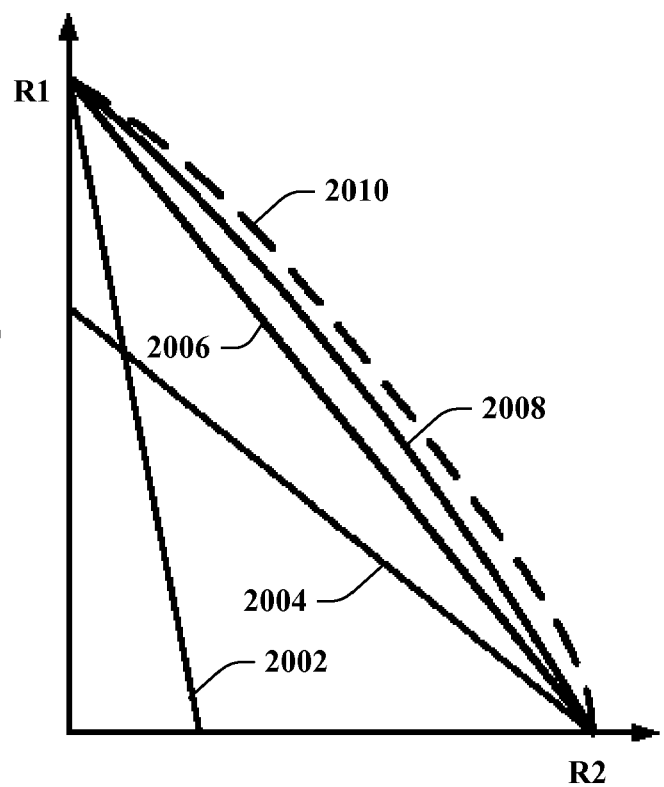
FIG. 20
FIG. 21
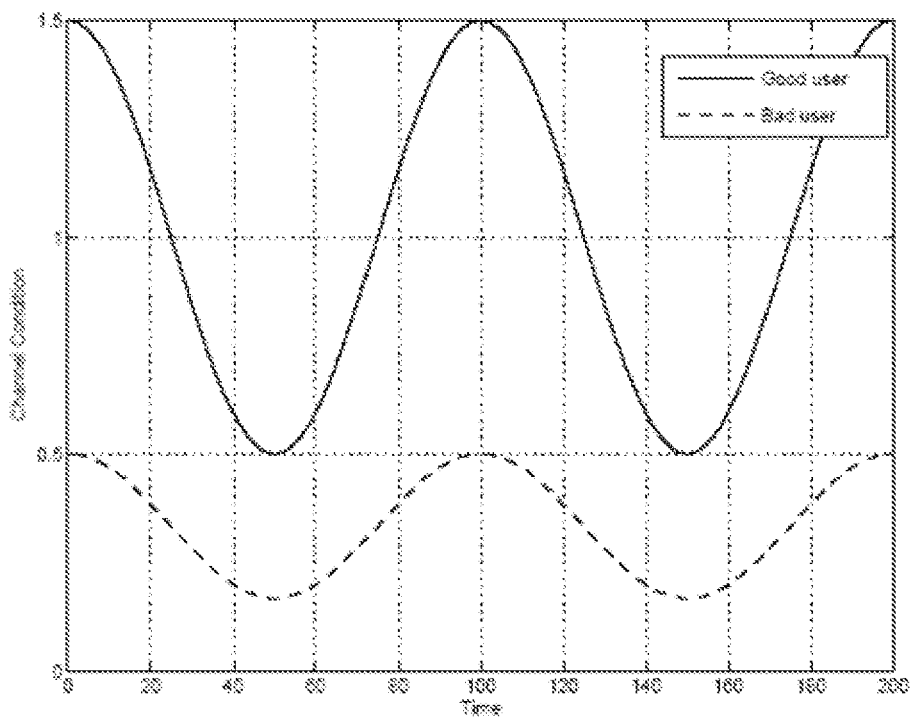

POWER ALLOCATION IN A WIRELESS COMMUNICATION SYSTEM

CROSS-REFERENCE TO RELATED APPLICATIONS

This application claims the benefit of U.S. Provisional Patent application Ser. No. 60/844,817 entitled "POWER ALLOCATION IN A WIRELESS COMMUNICATION SYSTEM" which was filed Sep. 14, 2006 and U.S. Provisional Patent application Ser. No. 60/848,041 entitled "FRACTIONAL POWER REUSE IN A MULTICARRIER DOWNLINK" which was filed Sep. 26, 2006. The entireties of the aforementioned applications are herein incorporated by reference.

BACKGROUND

I. Field

The following description relates generally to wireless communications, and more particularly to allocating power for transmitters in single-carrier or multi-carrier wireless communication systems.

II. Background

Wireless communication systems are widely deployed to provide various types of communication; for instance, voice and/or data can be provided via such wireless communication systems. A typical wireless communication system, or network, can provide multiple users access to one or more shared resources. For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Common wireless communication systems employ one or more base stations that provide a coverage area. A typical base station can transmit multiple data streams for broadcast, multicast and/or unicast services, wherein a data stream can be a stream of data that can be of independent reception interest to a wireless terminal. A wireless terminal within the coverage area of such base station can be employed to receive one, more than one, or all the data streams carried by the composite stream. Likewise, a wireless terminal can transmit data to the base station or another wireless terminal.

According to an example, a transmitter in a wireless communication system can utilize one or multiple sub-carriers for transmission. For a single transmitter with multiple sub-carriers, for instance, power can be efficiently allocated by evenly spreading power across the sub-carriers assuming that the channel is stationary (e.g., due to concavity of the Shannon capacity). However, when a second transmitter is introduced that transmits simultaneously as the first transmitter and therefore causes the transmitters to interfere with one another, the foregoing no longer holds true. For instance, when mobile devices are situated at the boundary of two cells, such devices can operate below 0 dB and thus experience significant diminution in quality of service. Moreover, when a single sub-carrier is employed by multiple interfering transmitters, similar inefficiencies and/or degraded service due to interference can commonly be experienced in connection with conventional power allocation techniques.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating allocation of power levels in a wireless communication network. A metric based upon spectral efficiency can be employed in connection with optimizing power allocation. Further, power for transmitters to utilize can be assigned as a function of time. Moreover, a single sub-carrier network and/or a multiple sub-carrier networks can leverage one or more power allocation schemes.

According to related aspects, a method that facilitates operating a communication network including a first wireless communication base station that includes a first sector is described herein. The method can include transmitting on a first channel at a first power level from the first sector during a first time period based on a first predetermined pattern, the first channel including a first frequency bandwidth. Further, the method can comprise transmitting on the first channel at a second power level from the first sector during a second time period based on the first predetermined pattern, the second power level is at least 0.5 dB different from the first power level.

Another aspect relates to a wireless communications apparatus. The wireless communications apparatus can include a memory that retains instructions related to transmitting on a first channel at a first power level from a first sector during a first time period based on a first predetermined pattern and transmitting on the first channel at a second power level from the first sector during a second time period based on the first predetermined pattern, the second power level is at least 0.5 dB different from the first power level. Moreover, the wireless communications apparatus can include a processor, coupled to the memory, configured to execute the instructions retained in the memory.

Yet another aspect relates to a wireless communications apparatus that enables communicating with allocated power levels. The wireless communications apparatus can include means for transmitting on a first channel at a first power level from a first sector during a first time period based on a first predetermined pattern, the first channel including a first frequency bandwidth. Moreover, the wireless communications apparatus can comprise means for transmitting on the first channel at a second power level from the first sector during a second time period based on the first predetermined pattern, the second power level is at least 0.5 dB different from the first power level.

Still another aspect relates to a machine-readable medium having stored thereon machine-executable instructions for transmitting on a first channel at a first power level from a first sector during a first time period based on a first predetermined pattern, the first channel including a first frequency bandwidth; and transmitting on the first channel at a second power level from the first sector during a second time period based on the first predetermined pattern, the second power level is at least 0.5 dB different from the first power level.

In accordance with another aspect, an apparatus in a wireless communication system can include a processor, wherein the processor can be configured to transmit on a first channel at a first power level during a first time period based on a first predetermined pattern, the first channel including a first frequency bandwidth. Further, the processor can be configured to transmit on the first channel at a second power level during a second time period based on the first predetermined pattern, the second power level is at least 0.5 dB different from the first power level.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 20 is an illustration of an example diagram representing an achievable rate region under opportunistic power allocation.

FIG. 21 is an illustration of an example diagram depicting channel conditions for two users within a cell under breathing cells where both channel gains can be normalized by the average channel gain of the good user.

DETAILED DESCRIPTION

Figure 1:
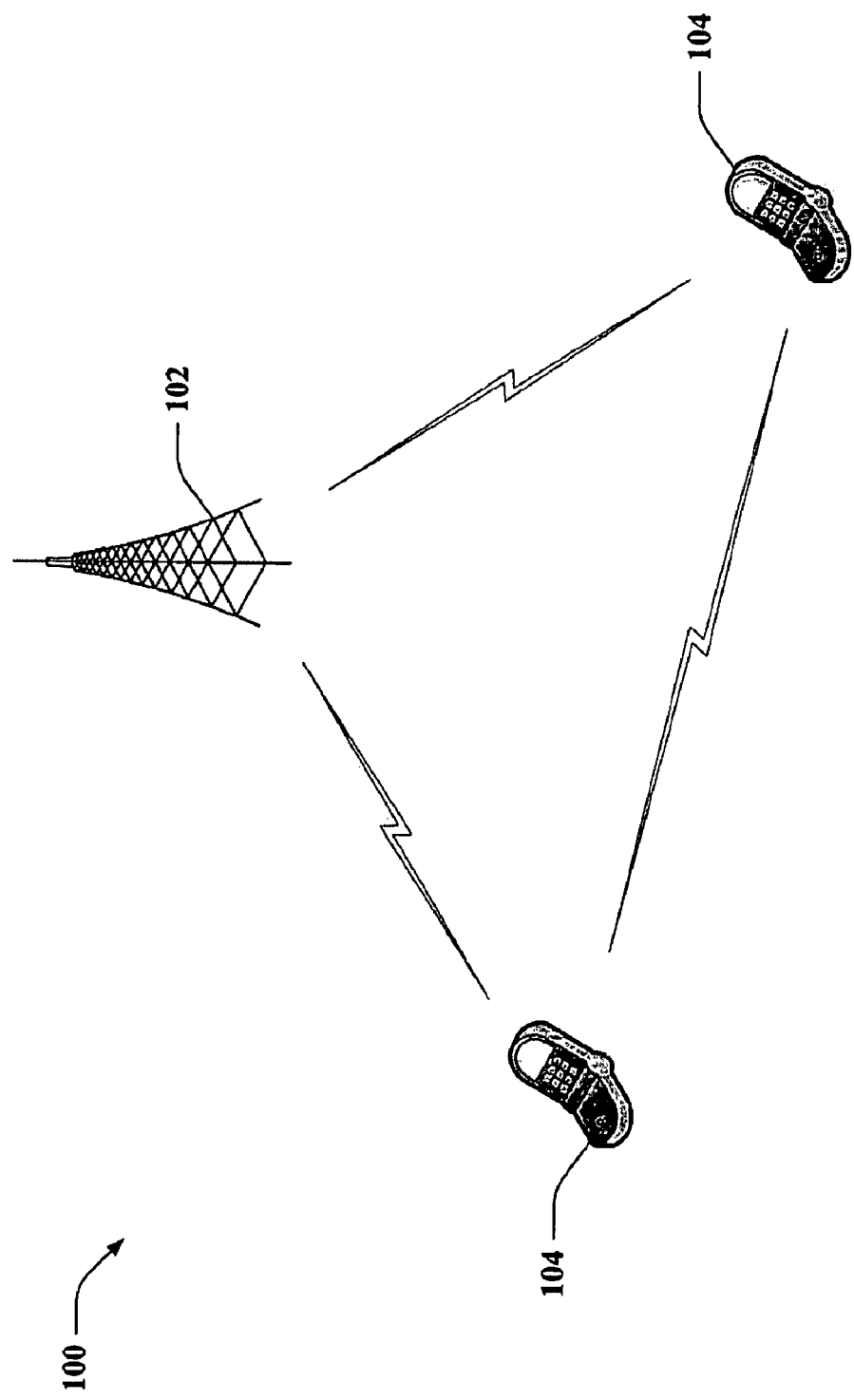
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 can comprise one or more base stations 102 (e.g., access points) in one or more sectors that receive, transmit, repeat, etc., wireless communication signals to each other and/or to one or more mobile devices 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless communication system 100. Base stations 102 can each communicate with one or more mobile devices 104. Base stations 102 can transmit information to mobile devices 104 over a forward link (downlink) and receive information from mobile devices 104 over a reverse link (uplink).

Base stations 102 and mobile devices 104 can utilize one or multiple sub-carriers for communication there between. By way of illustration, a plurality of base stations 102 can each utilize a common sub-carrier or a common set of sub-carriers for downlink transmission. Additionally or alternatively, a common sub-carrier or set of sub-carriers can be utilized for uplink transmission (e.g., in one or multiple cells or sectors) by mobile devices 104 that can interfere with one another.

System 100 can support differing types of users such as close-to-base station users and cell-boundary users. For close-to-base station users who may not be affected by inter-cell interference, even transmit power allocation across different carriers or frequency subbands can be more favorable since it offers more segments (or degrees of freedom). Meanwhile, cell-boundary users can benefit from schemes like simple frequency-reuse whereby some sub-carriers in each sector can be shut off since such a scheme can offer signal-to-noise (SNR) improvement that can compensate for the segment loss. When a mixture of users exists, the overall system throughput can be optimized (e.g., maximized) by assigning different powers to different carriers or frequency subbands.

More particularly, system 100 can employ a time-varying power allocation scheme to leverage time flexibility to improve spectral efficiency, where the power allocation changes over time according to a pre-determined pattern. Various example power allocation schemes are provided below in accordance with various aspects of the claimed subject matter. Moreover, examples described herein relate to OFDM systems; however, it is to be appreciated that concepts provided herein can be applied to systems that leverage differing types of technologies (e.g., CMDA systems, GSM system, . . . ).

Figure 2:
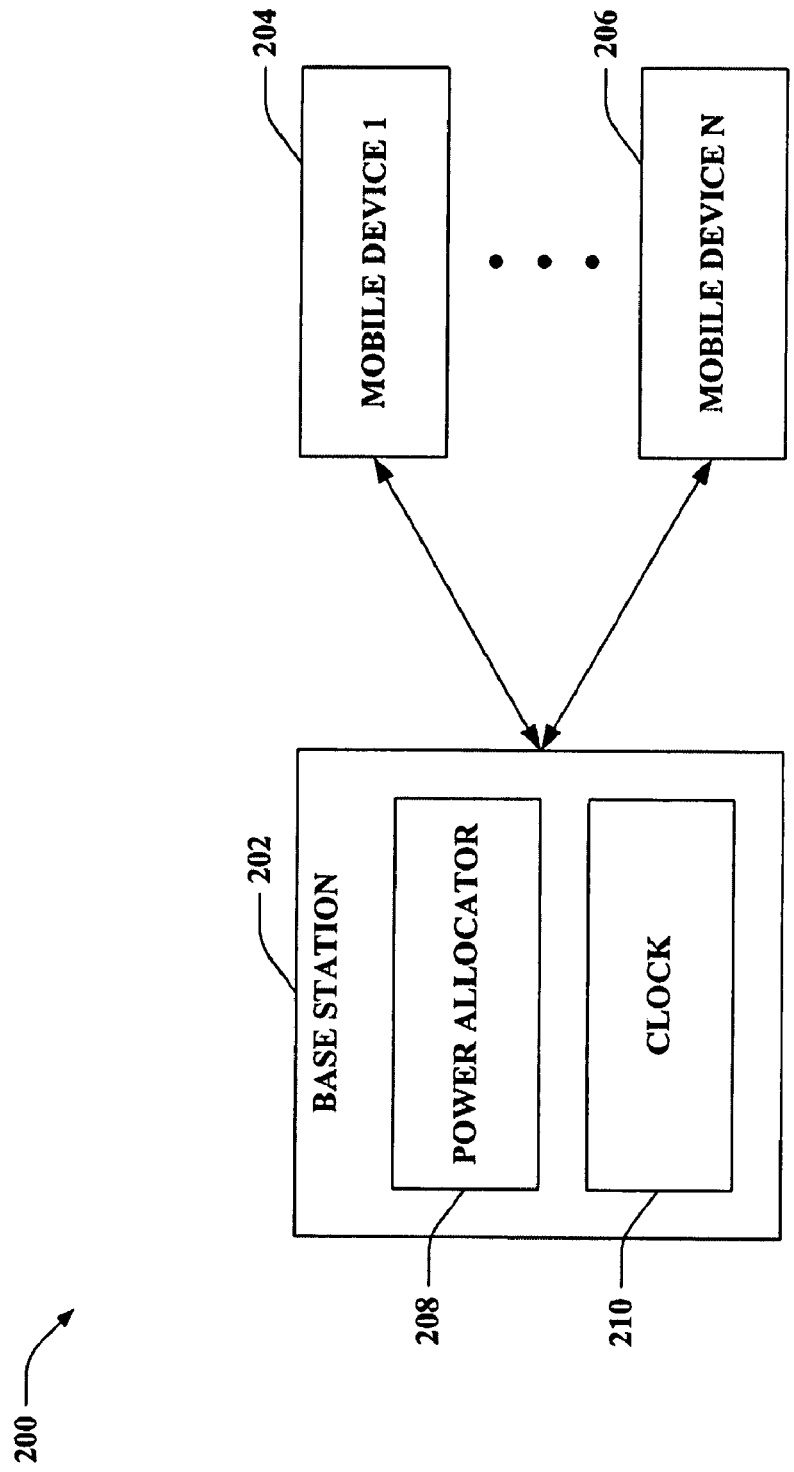
FIG. 2 is an illustration of an example system that enables controlling power allocation for transmission within a cell or sector.

With reference to FIG. 2, illustrated is an example system 200 that enables controlling power allocation for transmission within a cell or sector. System 200 includes a base station 202 that can communicate with one or more mobile devices 204-206 (e.g., mobile device 1 204, . . . , mobile device N 206, where N can be substantially any integer). Base station 202 can further include a power allocator 208 and a clock 210. Power allocator 208 can employ one or more of the example power allocation schemes described herein. Such schemes can enable optimizing performance (e.g., spectral efficiency) associated with a network. Moreover, power allocator 208 can utilize timing information obtained by clock 210 to schedule transmission (e.g., downlink transmission from base station 202 to one or more mobile devices 204-206, uplink transmission from mobile device 204-206 to base station 202, . . . ). For instance, timing information can be leveraged along with the power allocation scheme to select an identity of a transmitter and/or receiver as well as a power level to be utilized for transmission during a particular time slot.

According to an example, system 200 can be a single carrier system; thus, a common carrier can be employed for communicating between base station 202 and mobile device(s) 204-206 (as well as for similar communication in disparate sector(s) and/or cell(s)). Base station 202 can be coordinated with disparate base stations (not shown) to implement a particular power allocation scheme; hence, power levels for transmission over the common carrier can be assigned by power allocator 208 as a function of time determined by clock 210.

Figure 7:
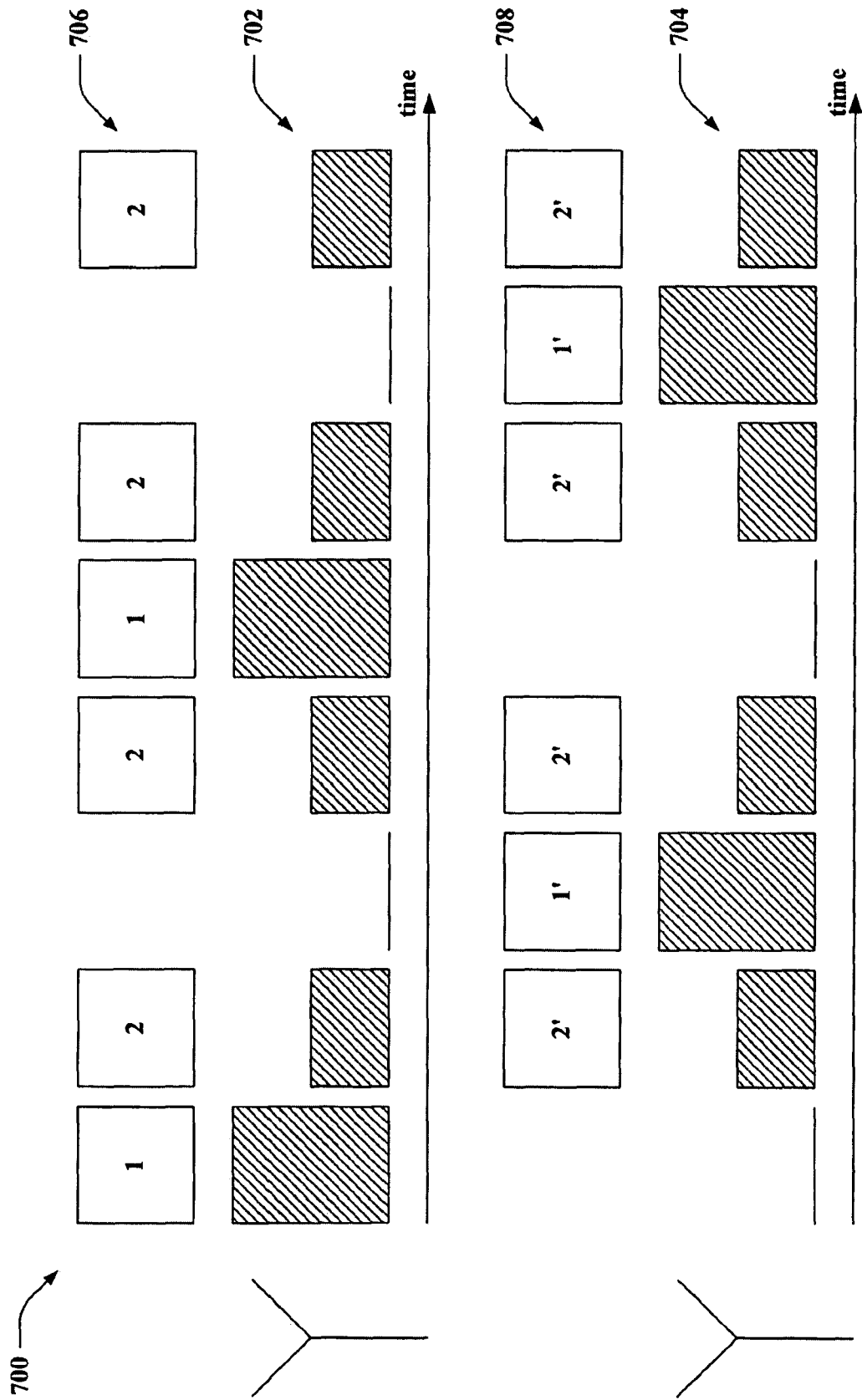
FIG. 7 is an illustration of an example time varying power allocation scheme for a single carrier system.
Figure 8:
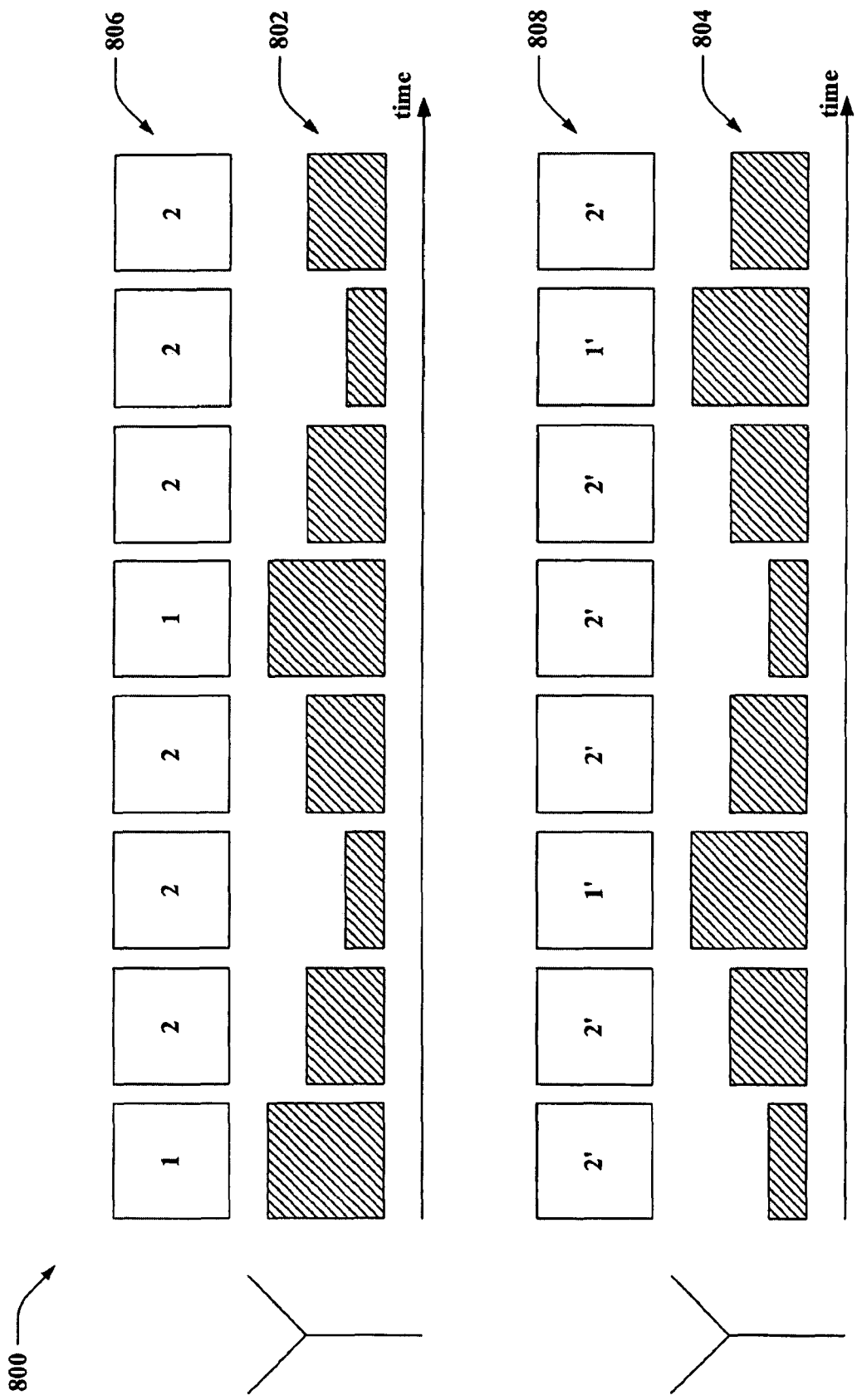
FIG. 8 is an illustration of an example time varying power allocation scheme for a single carrier cellular data network.
Figure 11:
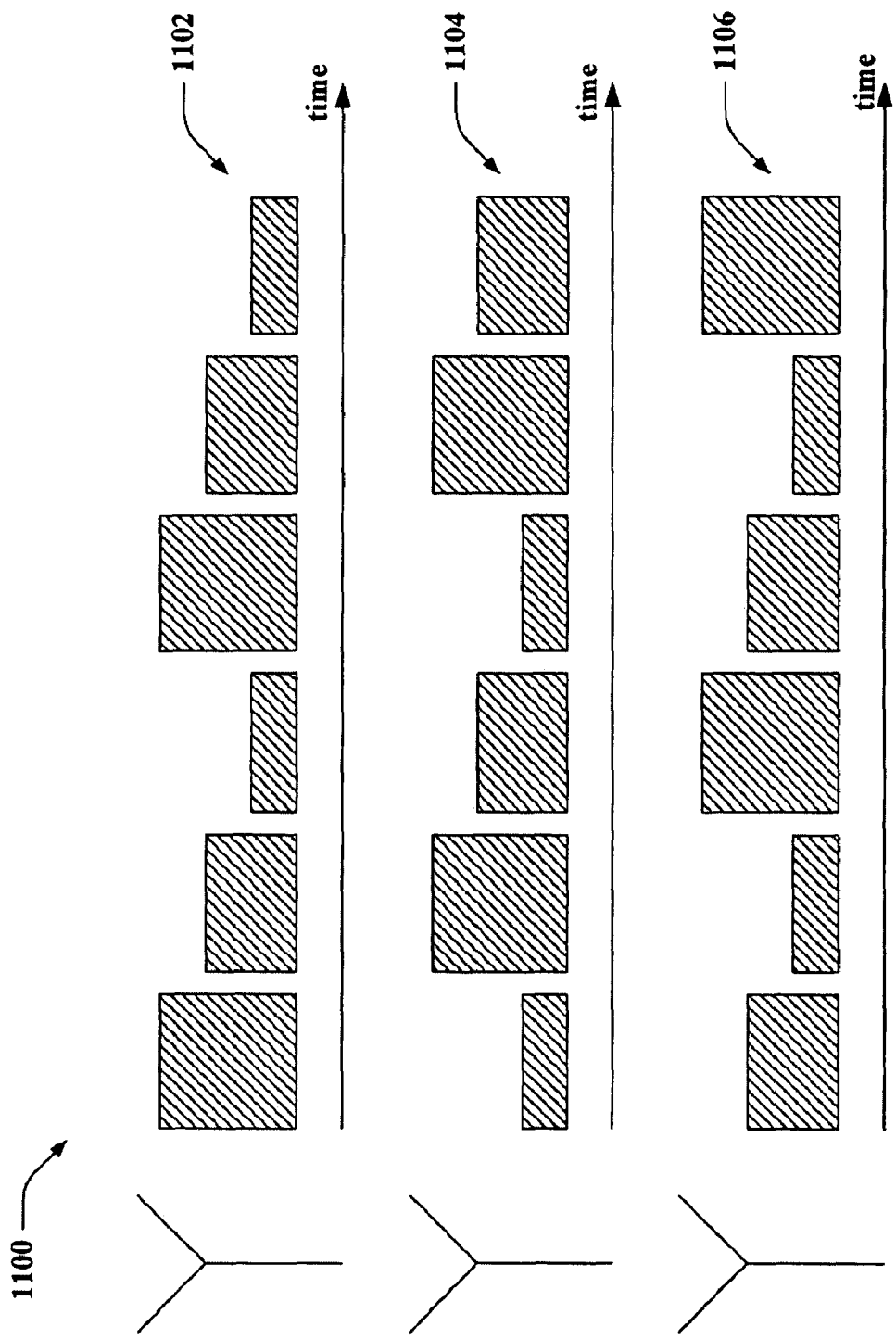
FIG. 11 is an illustration of an example power allocation scheme for use with differing sectors according to various aspects of the claimed subject matter.

By way of illustration, power allocator 208 can assign a particular power level from a set of M discrete power levels, where M can be substantially any integer (e.g., employing the example schemes in FIGS. 7-8, 11). Base station 202 can utilize a set of discrete power levels that can be substantially similar to set(s) employed by disparate base stations in the network and/or the sets of discrete power levels can differ between base stations. According to an example, base station 202 can employ a set of discrete power levels that includes $P_1$ and $P_2$, while a neighboring base station (not shown) can utilize a set of discrete power levels that includes $P_3$ and $P_4$. For instance, $P_1$ can be equal to $P_4$ and $P_2$ can be equal to $P_3$; yet, it is contemplated that such power levels can differ from one another. Additionally or alternatively, $P_1$ can be larger than $P_2$ and $P_4$ can be larger than $P_3$; however, the claimed subject matter is not so limited. Power allocator 208 of base station 202 can assign a power level of $P_1$ during a first time slot, $P_2$ during a second time slot, etc. Moreover, a disparate power allocator of the neighboring base station can assign a power level of $P_3$ during the first time slot, $P_4$ during the second time slot, and so forth. The assigned power level for a particular time slot can be utilized by a transmitter (e.g., base station 202, one or more mobile device 204-206, . . . ) for communicating with a receiver (e.g., one or more mobile devices 204-206, base station 202, . . . ). Following this example, clock 210 can enable base station 202 to be synchronized with the neighboring base station (and/or any disparate base station(s)). Additionally, another example of a time-varying power allocation scheme is to enable both base station 202 and its neighboring base station choose a power allocation pattern with period 2 by repeating the two power levels chosen by each base station. Two signal-to-noise ratios (SNRs) can be measured by base station 202 for effectuating scheduling decisions. Such time division pattern reuse can be beneficial for delay sensitive users such as voice over IP (VOIP) users since the power levels can more rapidly change (as compared to use of smooth power allocation patterns) without providing a user with a bad SNR for a significant period of time.

Figure 12:
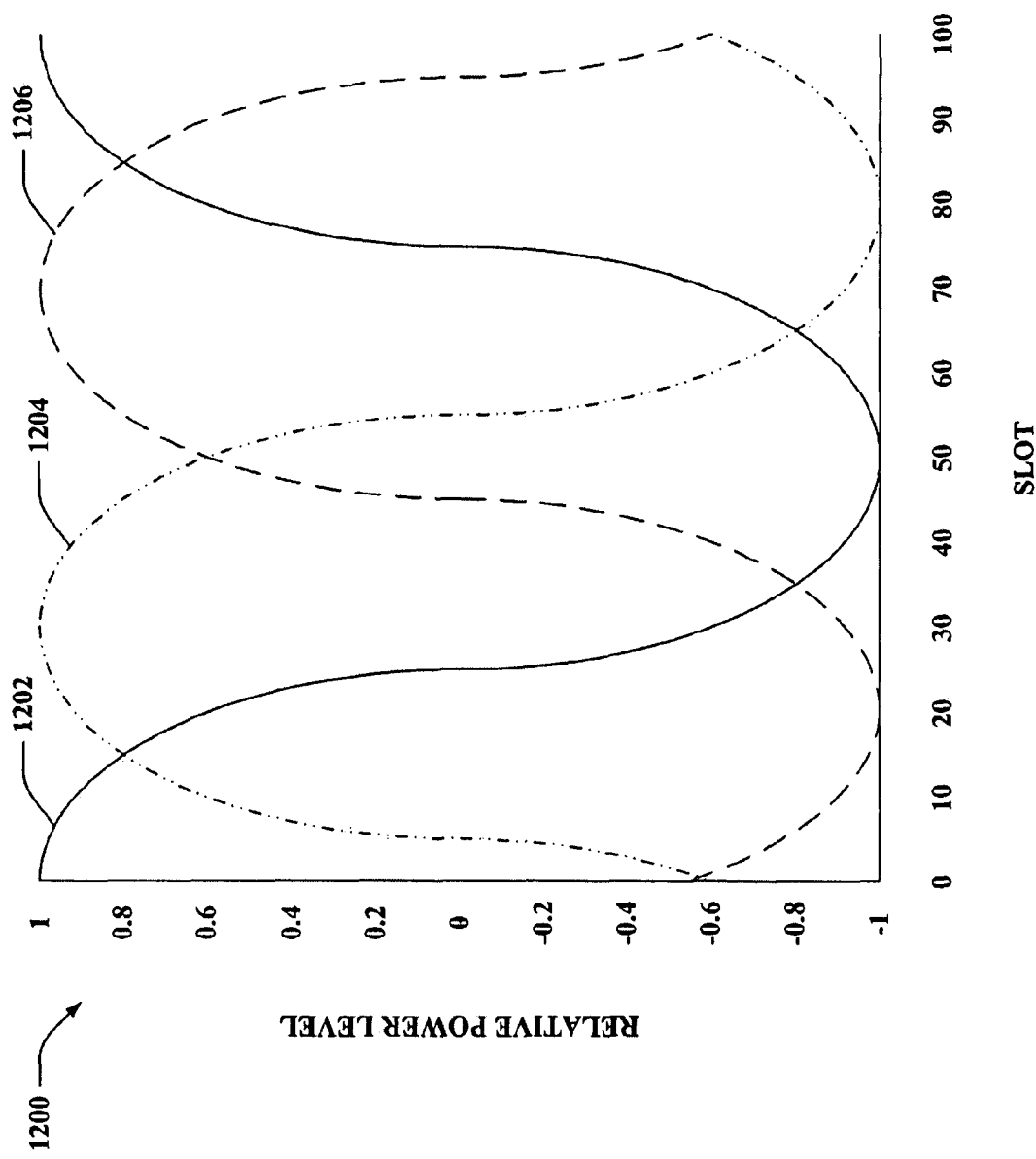
FIG. 12 is an illustration of an example scheme that includes smooth power variation curves (e.g., power allocation curves, smooth power allocation pattern curves, . . . ) for disparate sectors (and/or cells).
Figure 13:
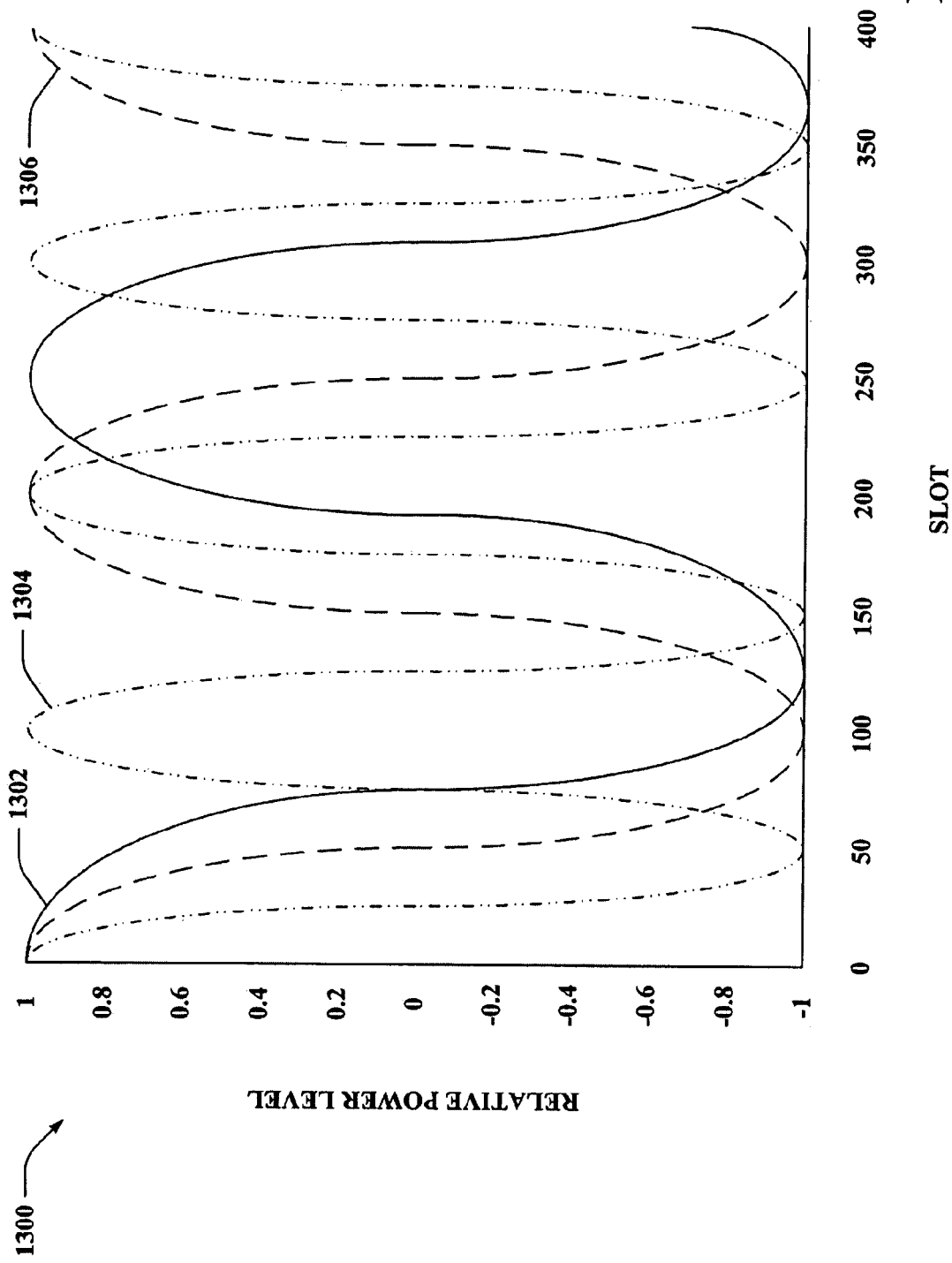
FIG. 13 is an illustration of another example power allocation scheme in accordance with various aspects of the claimed subject matter.

According to another illustration, power allocator 208 can use a smooth power allocation pattern for assigning power rather than a few discrete power levels (e.g., as described in FIGS. 12-13). The smooth power allocation pattern includes many more power levels into a set of possible power levels and enables assigning power levels with small differences to adjacent time intervals, which can enable smooth power variation over time and more importantly, easier tracking of the SNR. For instance, power allocator 208 can employ a power allocation pattern that can be close to a sinusoidal curve setting forth the power to be assigned as a function of time. The sinusoidal power allocation pattern can have a period of 100 time slots, for example; however, the claimed subject matter is not so limited as substantially any period or any curve is contemplated. Meanwhile, the power allocation pattern of a neighboring base station can be phase shifted (e.g., 180 degree shift if two power allocation patterns are utilized in a network, 120 degree shift if three power allocation patterns are utilized in the network, . . . ). Base stations within a network that utilize phase shifted power allocation patterns can be roughly synchronized (e.g., by respective clocks).

According to another example, power allocation patterns utilized by differing base stations can be frequency shifted; thus, the sinusoidal curves of the power allocation patterns can have disparate frequencies. When differing frequencies are employed for the power allocation patterns, base stations need not be synchronized since over time differing channel conditions can be observed.

Figure 9:
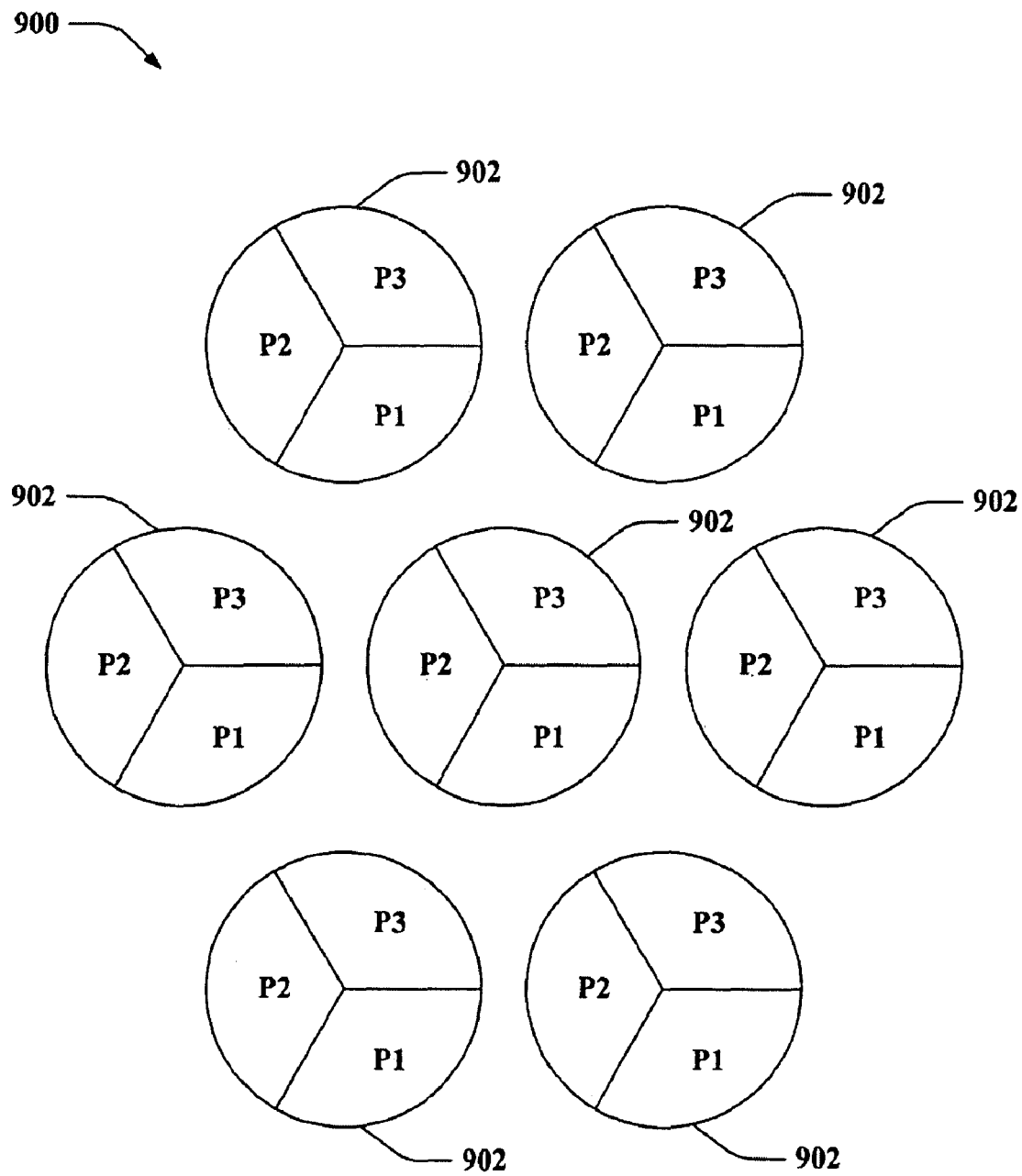
FIG. 9 is an illustration of an example sector-wise reuse multi-cell deployment in accordance with various aspects of the claimed subject matter.
Figure 10:
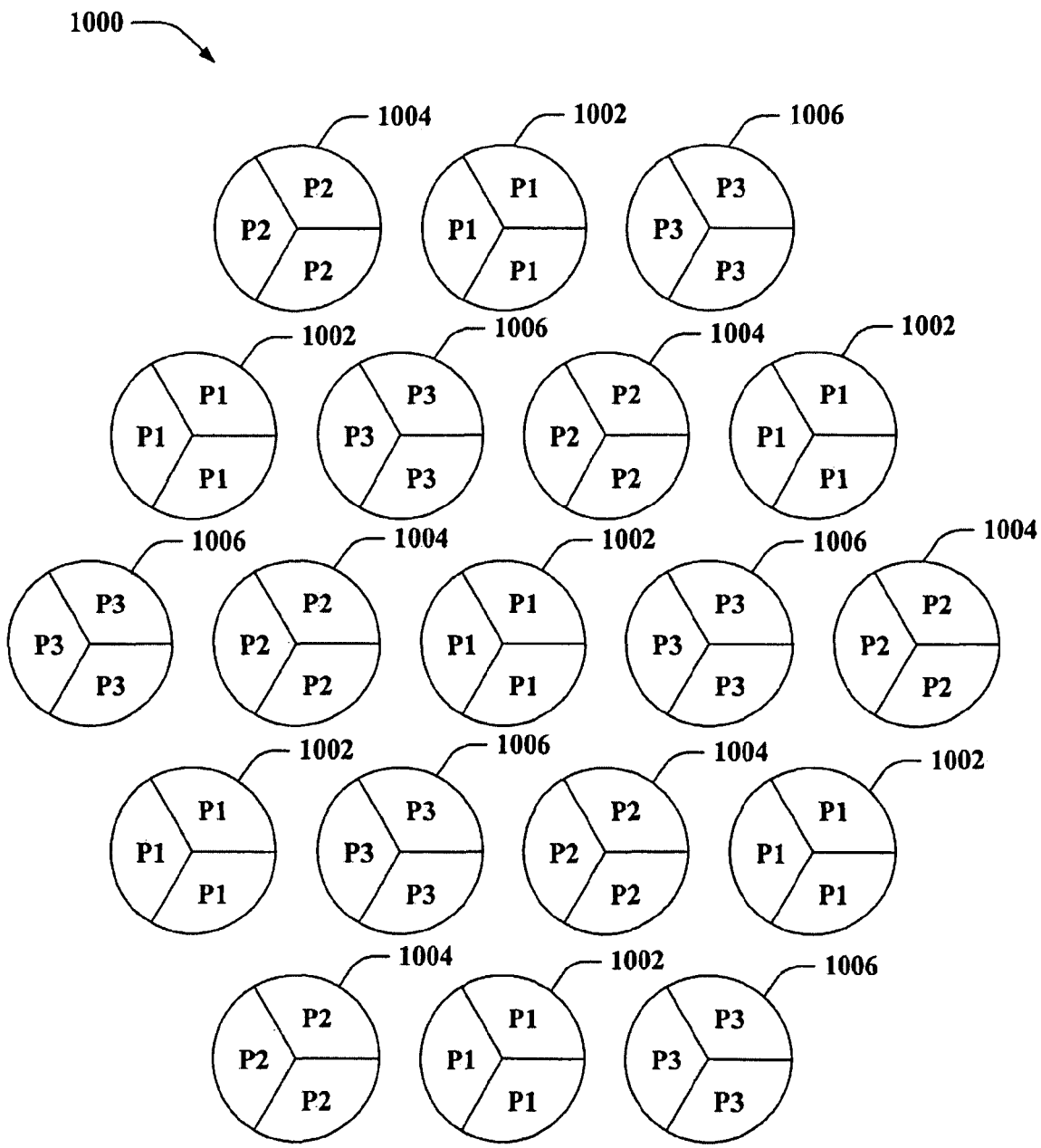
FIG. 10 is an illustration of an example cell-wise reuse deployment of multiple cells for a power allocation reuse scheme.

It is to be appreciated that differing power allocation patterns can be employed by disparate sectors and/or different cells. For instance, with sector-wise reuse, each sector of a cell can utilize a differing power allocation pattern curve (e.g., respective phase shifted, frequency shifted, etc. patterns), while the cells in the network can repeat a similar reuse pattern (e.g., as shown in FIG. 9). Further, for cell-wise reuse, the sectors of a cell can each utilize a common power allocation pattern curve, and each cell can employ a differing power allocation pattern curve as compared to adjacent neighboring cells (e.g., as shown in FIG. 10).

By way of further illustration, the power allocation pattern utilized by base station 202 can be predetermined and/or adaptively selected. According to an example, each sector and/or cell can be assigned a prefixed power allocation pattern. Pursuant to another illustration, the power allocation pattern for each sector and/or cell can be adaptive over time depending upon the load; thus, load information can be shared between sectors and/or cells to adjust mean, frequency, etc. associated with power allocation over time. Following this illustration where there are two cells, one cell can have 10 users and the other cell can have 100 users. The average power level for the cell with 10 users can be shifted down in comparison to the average power level for the cell with 100 users, for example; however, the claimed subject matter is not limited to the aforementioned example.

Figure 3:
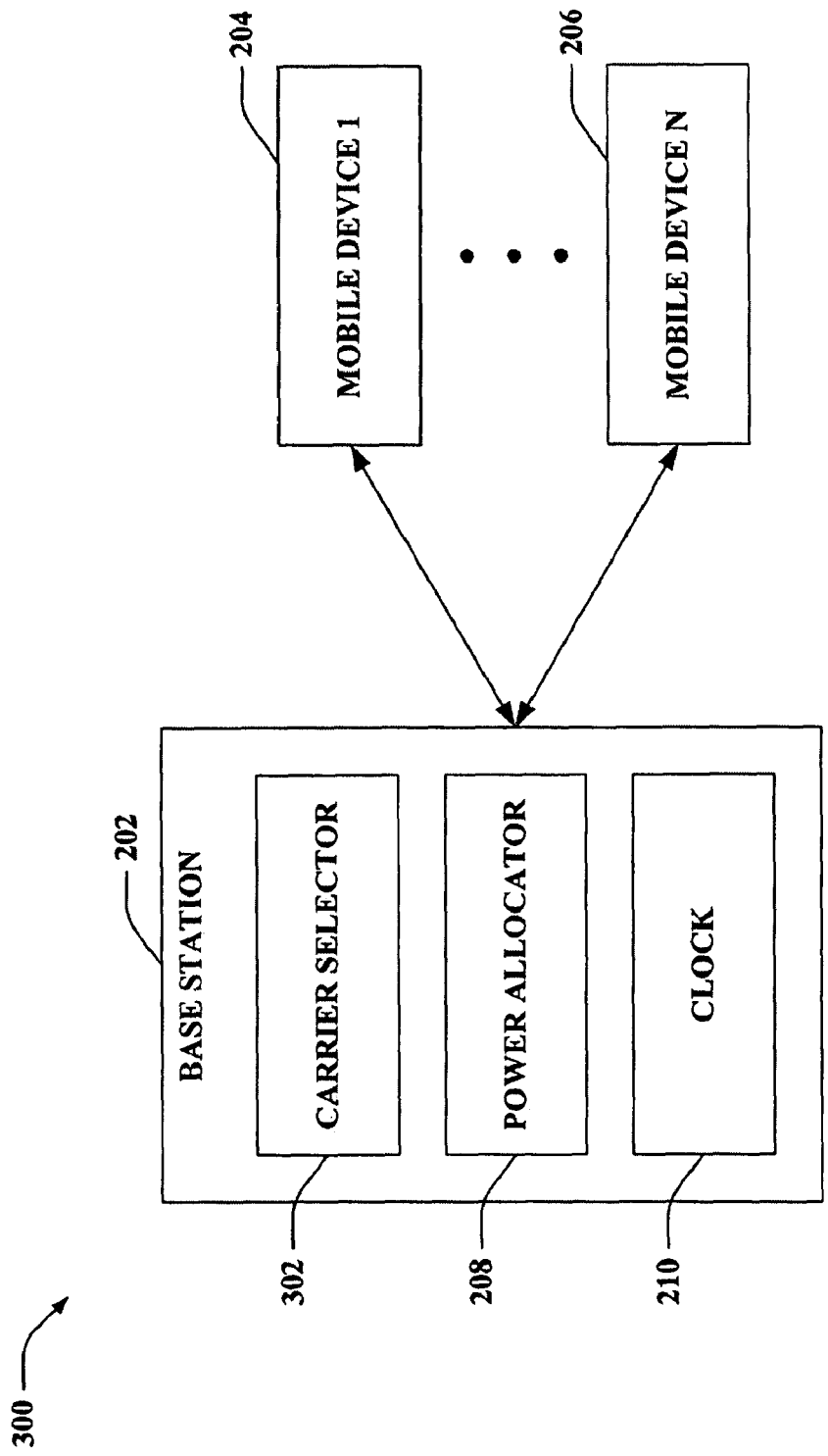
FIG. 3 is an illustration of an example system that allocates power levels in a multiple sub-carrier network.

Now turning to FIG. 3, illustrated is an example system 300 that allocates power levels in a multiple sub-carrier network. It is contemplated that any number of sub-carriers (e.g., carriers) can be supported by system 300. System 300 includes base station 202 and mobile devices 204-206 as described above. Base station 202 can further include power allocator 208 and clock 210. Moreover, base station 202 can include carrier selector 302 that can be utilized in conjunction with power allocator 208 to assign power levels to each of the carriers as a function of time (e.g., determined by clock 210). Thereafter, transmissions (e.g., users can be selected, . . . ) can be scheduled upon the carriers with the assigned power levels.

According to an illustration, base station 202 can have a maximum power constraint. Moreover, carrier selector 302 and power allocator 208 can enable utilizing complementary patterns for power assignment for each of the carriers such that the sum of the power can remain constant for all of the carriers supported by base station 202. Carrier selector 302 and power allocator 208 can utilize discrete power levels and/or smooth power allocation pattern curves (e.g., sinusoidal curves for each sub-carrier that can be phase shifted and/or frequency shifted) in connection with assigning a power level to each of the carriers during each time slot. Moreover, the following provides example multiple sub-carrier schemes that can be utilized in connection with system 300.

Figure 4:
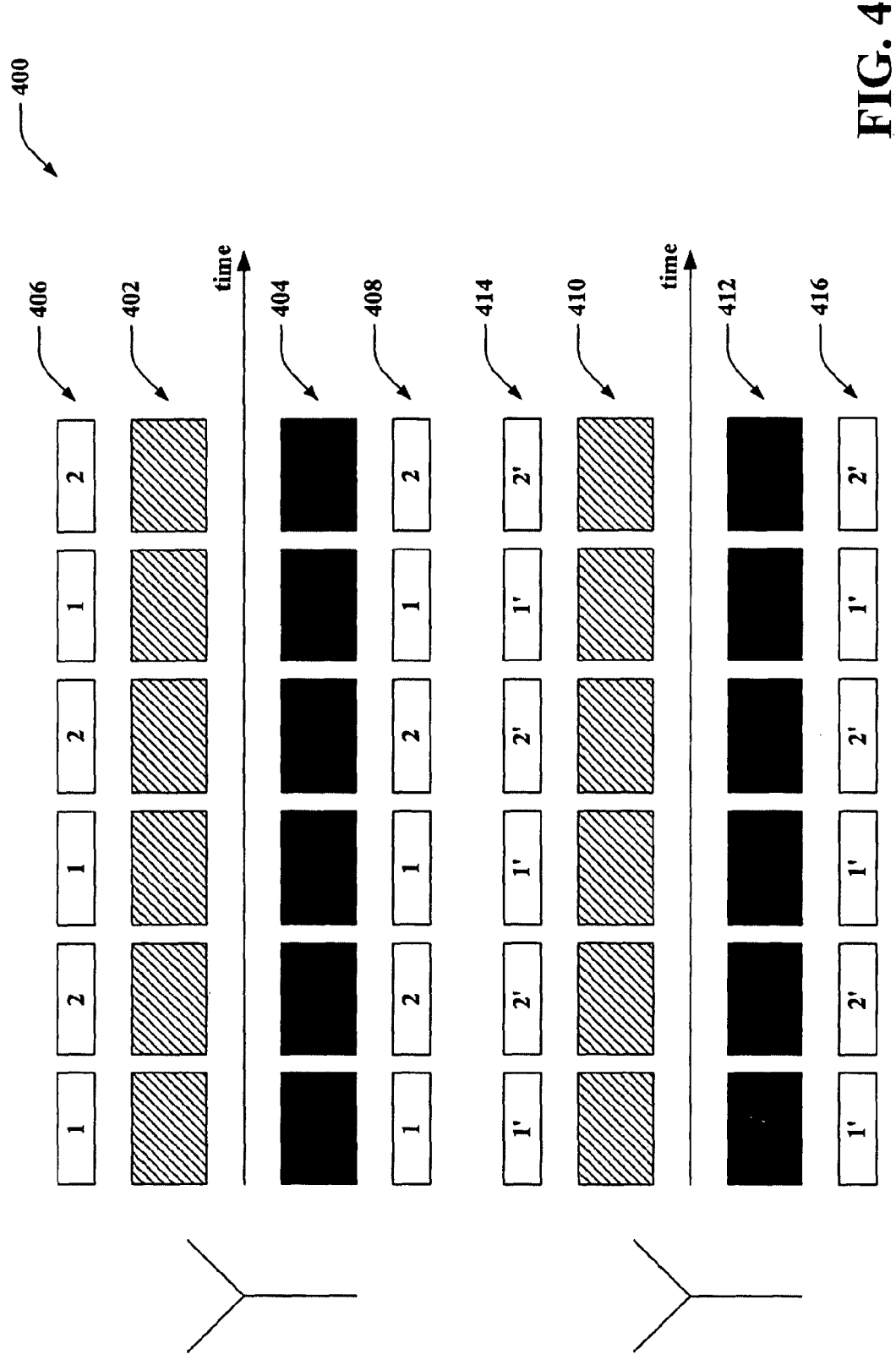
FIG. 4 is an illustration of example even power level allocation scheme for a multiple sub-carrier system.

Turning to FIG. 4, illustrated is an example even power level allocation scheme 400 for a multiple sub-carrier system. According to this example, two transmitters can utilize two sub-carriers; however, it is to be appreciated that the claimed subject matter contemplates utilizing any number of transmitters and any number of sub-carriers. By way of illustration, each of the transmitters can be associated with a disparate sector and/or cell. The hatched bars 402 indicate power usage in sub-carrier 1 for transmitter 1, while the solid bars 404 indicate the power usage in sub-carrier 2 for transmitter 1. Also, the numbered blocks 406-408 represent the user scheduled at a time slot in each sub-carrier (e.g., number blocks 406 correspond to sub-carrier 1 and number blocks 408 correspond to sub-carrier 2 for transmitter 1). For instance, user 1 can be a cell-boundary user and user 2 can be a close-to-base station user. Additionally, hatched bars 410 represent power usage in sub-carrier 1 for transmitter 2 and solid bars 404 represent power usage in sub-carrier 2 for transmitter 2. Numbered blocks 414 indicate the user scheduled at each time upon sub-carrier 1 and numbered blocks 416 set forth the user scheduled during each time upon sub-carrier 2 for transmitter 2 (e.g., user 1' can be a cell-boundary user and user 2' can be a close-to-base station user).

The power allocation for the two transmitters can be symmetric; thus, if $(P_1, P_2)$ are assigned to the two sub-carriers (represented by $f_1$ and $f_2$, respectively) in transmitter 1, $(P_2, P_1)$ will be assigned to sub-carriers in transmitter 2. Moreover, $P_1 = P_2 = P/2$, assuming P is a total available power at each transmitter. By utilizing the even power level allocation scheme 400, users at the boundary of two cells operate below 0 dB. Thus, scheme 400 can be favorable for close-to-base station users (e.g., user 2), while cell-boundary users can be associated with an SNR below 0 dB. On the other hand, if all power is assigned to one of the sub-carriers (not shown) (e.g., and the other sub-carrier is assigned zero power according to such scheme), the boundary user can have an SNR of $hP/N_0$, where h is the path loss and $N_0$ is noise power. Under an interference-limited scenario, the SNR can be larger than 0 dB, which can benefit cell-boundary users. However, by not utilizing one of the two sub-carriers, half of the degree of freedom is sacrificed (even though power gain can compensate for the loss to improve capacity for a boundary user), which can adversely impact close-to-base station users. Under the aforementioned schemes, neither the cell-boundary users nor the close-to-base station users may operate at their optimal operating power allocation point due to a tradeoff there between.

Figure 5:
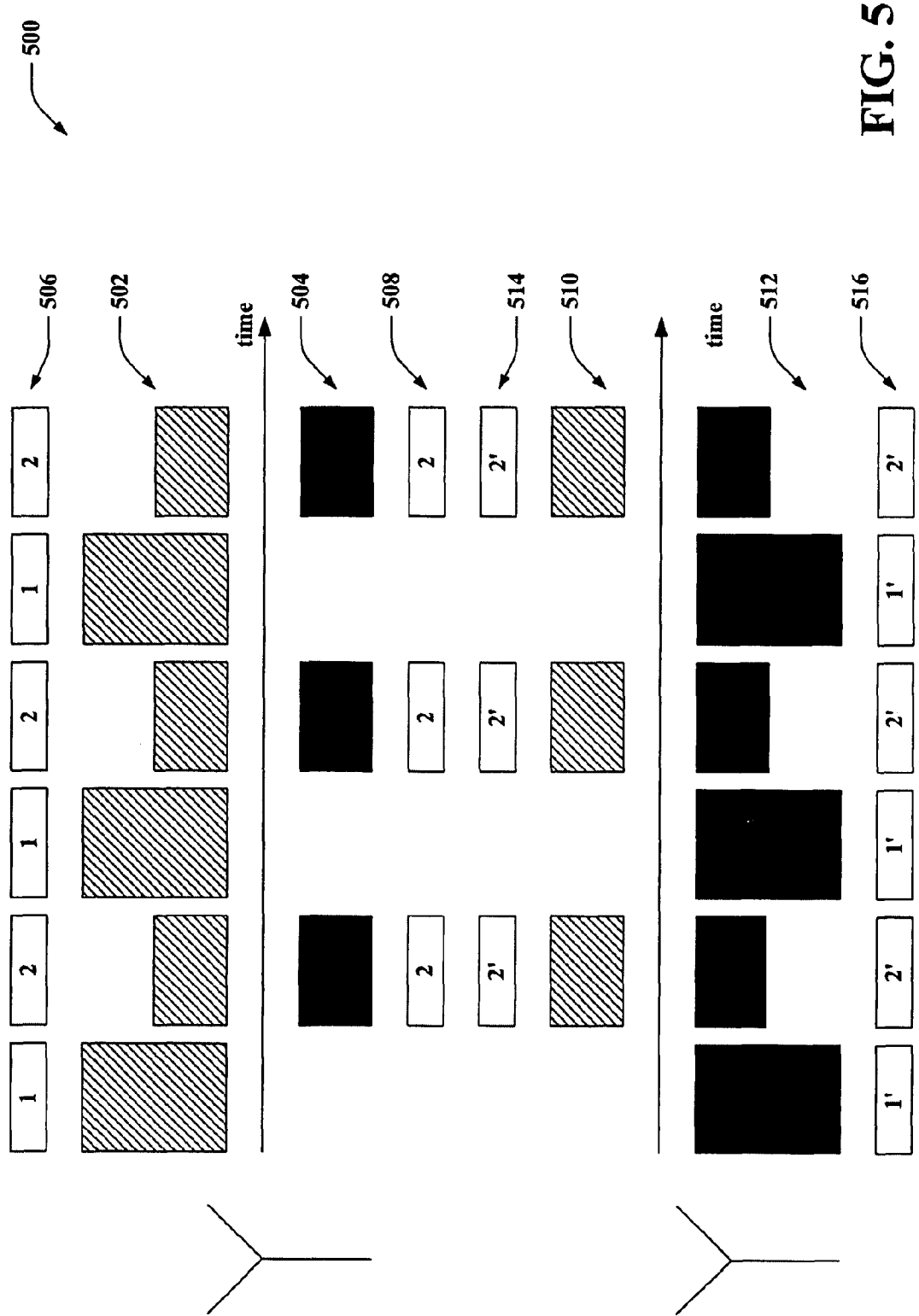
FIG. 5 is an illustration of an example time varying power allocation scheme for a multiple sub-carrier system.

With reference to FIG. 5, illustrated is an example time varying power allocation scheme 500 for a multiple sub-carrier system. Hatched bars 502 represent power allocated to sub-carrier 1 and solid bars 504 represent power allocated to sub-carrier 2 for transmitter 1. Moreover, blocks 506 identify a user scheduled in sub-carrier 1 at each time slot and blocks 508 identify a user scheduled in sub-carrier 2 at each time slot. Further, for transmitter 2, hatched bars 510 indicate power allocated to sub-carrier 1 and solid bars 512 indicate power allocated to sub-carrier 2, while blocks 514 relate to a user scheduled upon sub-carrier 1 and blocks 516 relate to a user scheduled upon sub-carrier 2.

As depicted, power allotted for each of the sub-carriers can change as a function of time, and thus, the scheme 500 can improve overall spectral efficiency when leveraged by a variety of users (e.g., close-to-base station users (2, 2') and cell-boundary users (1, 1')). Rather than fixing the power allocation to be the same across time (as in scheme 400 of FIG. 4), the scheme 500 can change the power allocation to be either (P/2, P/2) or (P, 0) at differing times (e.g., for transmitter 1). Additionally, transmitter 2 can alternate the power allocation to be either (P/2, P/2) at differing times. For instance, during a first time slot shown, transmitter 1 can transmit on sub-carrier 1 to user 1 with a power of P, and during a second time slot can transmit to user 2 with a power level of P/2 on sub-carrier 1 and a power level of P/2 on sub-carrier 2, and so forth. Accordingly, during a subset of the time slots, sub-carrier 2 can be allocated zero power, and therefore, effectively be turned off. Meanwhile, transmitter 2 can transmit on sub-carrier 2 with a power of P to user 1' during the first time slot and can transmit to user 2' on both sub-carriers 1 and 2, each with a respective power of P/2, during the second time slot.

As shown, the transmitters can be symmetric; however, it is contemplated that the claimed subject matter is not limited to utilizing symmetric power allocation patterns. For instance, it is to be appreciated that the transmitters can utilize substantially similar periodic power allocation patterns that have substantially similar periods, yet the patterns can be offset in phase from one another. Moreover, according to the illustrated example, user 1 and user 1' can be cell-boundary users and user 2 and user 2' can be close-to-base station users. More particularly, performance for the close-to-base station users can be substantially similar to a traditional even power allocation scheme (e.g., scheme 400 of FIG. 4). Further, the cell-boundary users can experience an improved data rate although fewer segments are assigned to such users; the improvement in the interference-limited scenario can be due to increased SNR.

Figure 6:
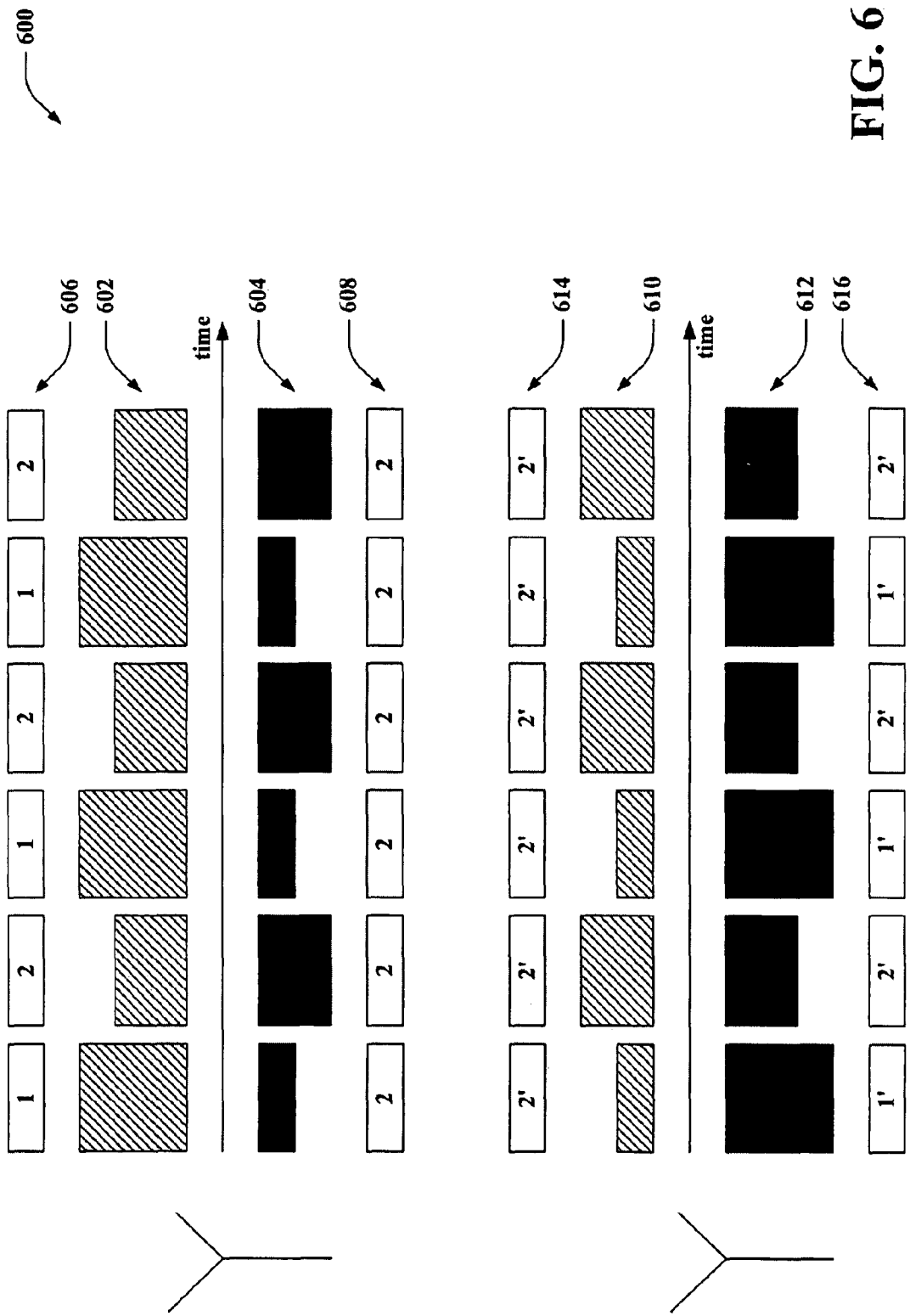
FIG. 6 is an illustration of an example time varying power allocation scheme for a multiple sub-carrier environment.

Referring to FIG. 6, illustrated is another example time varying power allocation scheme 600 for a multiple sub-carrier environment. Hatched bars 602 represent power usage in sub-carrier 1 and solid bars 604 represent power usage in sub-carrier 2 for transmitter 1. Further, blocks 606 indicate an identity of a user scheduled at each time slot for sub-carrier 1 and blocks 608 indicate an identity of a user scheduled at each time slot for sub-carrier 2 (e.g., where user 1 can be a cell-boundary user and user 2 can be a close-to-base station user). Additionally, hatched bars 610 indicate power usage in sub-carrier 1 and solid bars 612 indicate power usage in sub-carrier 2 for transmitter 2, with blocks 614-616 providing the corresponding user identities scheduled upon the respective sub-carrier (e.g., user 1' being a cell-boundary user and user 2' being a close-to-base station user). To improve spectral efficiency, the scheme 600 can improve the data rate of close-to-base station users (e.g., in comparison to the scheme 500 of FIG. 5). The scheme 600 can improve performance of close-to-base station users while maintaining enhanced performance for cell-boundary users in comparison to an even power allocation scheme (e.g., the scheme 400 of FIG. 4). In particular, the scheme 600 does not shut off one of the sub-carriers (e.g., sub-carrier 2 for transmitter 1, sub-carrier 1 for transmitter 2, . . . ) during a subset of time slots. Rather, a low power level is allotted during such time slots to maintain the SNR improvement for boundary users that can be significant enough to compensate for the segment loss (e.g., since the cell-boundary users can be scheduled upon half of the segments as compared to scheduling in an even power allocation scheme). Moreover, close-to-base station users (e.g., user 2, user 2') can be scheduled to the low power level segments.

Now referring to FIG. 7, illustrated is an example time varying power allocation scheme 700 for a single carrier system. Accordingly, power levels for the single carrier can be coordinated at different sectors (and/or different cells) during each time slot. Bars 702 represent power levels in a first sector during each time slot and bars 704 represent power levels in a second sector during each of the time slots. Moreover, blocks 706 identify a user assigned to each time slot upon the carrier in the first sector and blocks 708 identify a user assigned to each time slot upon the carrier in the second sector. For example, user 1 and user 1' can be cell-boundary users and user 2 and user 2' can be close-to-base station users. Further, the transmitters associated with each of the sectors can interfere with each other.

The scheme 700 can yield a spectral efficiency improvement similar to that demonstrated in scheme 500 of FIG. 5. In particular, at a first time slot, a cell-boundary user can be assigned a power P in a first sector, while no assignment can be provided to a user in the second sector. Next, at a second time slot, a close-to-base station user can be assigned a power P/2 in the first sector and a disparate close-to-base station user can be assigned a power P/2 in the second sector. Further, at third time slot, a cell-boundary user can be assigned a power P in the second sector and an assignment can be lacking for the first sector. Moreover, during a fourth time slot, the close-to-base station users can again be scheduled, and so forth.

Turning to FIG. 8, illustrated is another example time varying power allocation scheme 800 for a single carrier cellular data network. The scheme 800 includes bars 802 related to power levels during each time slot for a first sector and bars 804 related to power levels during each time slot for a second sector. Moreover, blocks 806 identify a user assigned to each time slot for the first sector and blocks 808 identify a user assigned to each time slot for the second sector (e.g., user 1 and user 1' can be cell-boundary users, user 2 and user 2' can be close-to-base station users, . . . ).

The scheme 800 provides additional segments for close-to-base station users (e.g., user 2, user 2', . . . ) to be scheduled upon. In particular, rather than allotting a power level of zero to a first sector and P to a second sector during a time slot, the first sector can be assigned a low power level that is greater than zero (e.g., while the second sector can be allocated a high power level less than P). Accordingly, a close-to-base station user can utilize the low power level associated with the first sector and a cell-boundary user can be assigned to the high power level corresponding to the second sector during this particular time slot. Additionally, during a next time slot, the power levels for each of the sectors can be substantially similar (e.g., middle power level) and close-to-base station users can be assigned to utilize the sub-carrier in each of these sectors.

Referring to FIG. 9, illustrated is an example sector-wise reuse multi-cell deployment 900 in accordance with various aspects of the claimed subject matter. As depicted, the multi-cell deployment 900 can comprise multiple cells 902 dispersed over a geographic area to form a communication network. Each of the cells 902 can include three sectors as shown; however, it is contemplated that one or more of the cells 902 can include fewer than and/or greater than three sectors. Further, it is to be appreciated that the multi-cell deployment 900 can support multiple carriers and/or a single carrier.

The sectorized cells 902 can be located in a regular hexagon grid and can extend beyond the grid depicted (e.g., any number of cells 902 can be included in the grid, . . . ). For each of the sectors of the cells 902, a power variation curve (e.g., P1, P2, P3, . . . ) can be chosen; further, the curves can be reused across all of the sectors. According to the illustrated example, three distinct power variation curves (e.g., power allocation curves, smooth power allocation pattern curves, . . . ) can respectively be allocated to each of the three sectors of each of the cells 902; thus, sector 1 can be allocated power variation curve 1 (P1), sector 2 can be allocated power variation curve 2 (P2), and sector 3 can be allocated power variation curve 3 (P3). Moreover, the same pattern can be reused across all of the cells 902.

FIG. 10 illustrates an example cell-wise reuse deployment 1000 of multiple cells for a power allocation reuse scheme. A plurality of cells 1002, 1004, 1006 are included within the grid associated with the deployment 1000. As shown, the cells 1002-1006 include three sectors; however, the claimed subject matter is not limited to utilization of cells with three sectors. The deployment 1000 can be employed when leakages from intra-cell sectors are significant. In particular, the deployment 1000 can use substantially similar power variation curves for sectors inside the same cell and different power variation curves across different cells. Thus, according to the depicted example, cells 1002 can include three sectors that utilize power variation curve 1 (P1), cells 1004 can include three sectors that employ power variation curve 2 (P2), and cells 1006 can include three sectors that use power variation curve 3 (P3). Further, each cell 1002 can be adjacent to cell(s) 1004 and/or cell(s) 1006 (and cells 1004 and cells 1006 can similarly be adjacent to differing types of cells), and therefore, adjacent cells can utilize differing power variation curves (e.g., a cell 1002 is not directly adjacent to another cell 1002). It is contemplated, however, that any number of differing power variation curves can be employed by different cells, and thus, the claimed subject matter is not limited to the illustrated example.

Now turning to FIG. 11, illustrated is an example power allocation scheme 1100 for use with differing sectors according to various aspects of the claimed subject matter. The scheme 1100 includes three power variation curves 1102, 1104, and 1106 that can be allocated to differing sectors. The power variation curves 1102-1106 can utilize a common carrier (e.g., for use in a single carrier system).

By way of example, a cell (e.g., the cell 902 from FIG. 9) can include three sectors, and each one of the sectors can be assigned a respective one of the power variation curves 1102-1106. Moreover, a similar pattern (e.g., assigning power variation curves 1102-1106 to sectors) can be repeated throughout a set of cells. According to another illustration, each sector of a cell can utilize one of the power variation curves (e.g., the power variation curve 1102), and disparate power variation curves (e.g., the power variation curves 1104, 1106) can be employed by directly adjacent cells (e.g., in accordance with the deployment 1000 of FIG. 10).

The scheme 1100 varies the power allocation in a slot-by-slot basis. Thus, sectors in a network can employ at least some synchronization to coordinate power of each sector during each time slot. For example, a time division duplexing (TDD) system can support the scheme 1100; however, the claimed subject matter is not so limited. Moreover, the power variation curve 1102-1106 employed by a particular sector can provide three states as a function of the power level; hence, a base station can track variation of the SNRs under each state to make scheduling decisions.

Now referring to FIG. 12, illustrated is an example scheme 1200 that includes smooth power variation curves for disparate sectors (and/or cells). The illustrated example includes three power variation curves 1202, 1204, 1206; however, it is contemplated that a system can employ less than or greater than three power variation curves. As shown, each of the three power variation curves 1202-1206 can be offset by 120 degrees in phase from one another (e.g., if two curves are utilized in a disparate system, the curves can be offset by 180 degrees, if four curves are employed then the offset can be 90 degrees, . . . ). According to an example, the power variation curve 1202 can be assigned to all sectors in a cell, and directly neighboring cells can utilize the power variation curve 1204 and/or the power variation curve 1206. Pursuant to another illustration, a cell can include three sectors, each of which can employ a corresponding one of the power variation curves 1202-1206 (e.g., such a pattern can be repeated across a plurality of cells).

The scheme 1200 can be employed when a coarser synchronization is available over sectors (as compared to the slot-by-slot synchronization used with the scheme 1100 of FIG. 11). Thus, slot-by-slot synchronization need not be utilized with the scheme 1200. Moreover, the relative power level can be defined in a linear scale and/or can be offset. Further, the maximum relative power offset can be scaled by a constant instead of being fixed to 1.

FIG. 13 illustrates another example power allocation scheme 1300 in accordance with various aspects of the claimed subject matter. The scheme 1300 includes three power variation curves 1302, 1304, 1306, each with a disparate frequency. By employing the different frequencies for power variation curves 1302-1306 utilized by disparate sectors, a system need not be synchronized. It is contemplated that any frequencies can be utilized for power variation curves 1302-1306. Moreover, it is to be appreciated that fewer than and/or more than three power variation curves can be utilized in a system.

The following set forth in connection with FIGS. 14-22 provides additional discussion with regards to various aspects, features, techniques, etc. associated with the claimed subject matter. With the advent of wideband cellular communications, more and more attention has been drawn to the problem of how to efficiently communicate in a multiple-carrier system. A possible solution to address this problem is to look at the frequency-reuse schemes, which is fairly well studied in narrow-band systems, for example, GSM networks. Specifically, in narrow-band networks, operators typically choose to allocate only part of the total bandwidth to each cell such that the inter-cell interference can be controlled to be negligible. A scheme which allocates 1/N of the total bandwidth to each cell is referred to as a reuse-N scheme. In narrow-band networks, reuse-N (e.g., where N can be dependent on the geometry of the deployment) can be utilized in a multi-cell deployment since the dynamic range of the inter-cell interference from neighboring cells due to different locations of mobiles can make reliable communications difficult.

With CDMA and OFDM technologies, reuse-1 systems can be employed due to the salient feature of inter-cell interference averaging. Specifically, the inter-cell interference in CDMA and OFDM technologies are averaged over the total bandwidth within a carrier due to the presence of pseudo-noise signature sequence in CDMA systems and independent tone-hopping in OFDM systems. However, in a reuse-1 deployment, the cell boundary users still suffer from an average SNR below 0 dB. In a typical hexagon deployment, 30 percent of the users can have an average SNR below 0 dB, for example. To satisfy certain fairness constraints between cell boundary users and other users, the system has to spend a lot of resource on the cell boundary users, which restricts overall system performance. It thus can be desirable to reduce the number of cell boundary users or completely remove the cell boundary, if possible.

Towards this end, the reuse-N schemes can be attractive for wideband systems. For example, for the regular hexagon deployment, a reuse-3 scheme can prevent inter-cell interference from direct neighboring cells and thus reduce the number of cell boundary users. Of course, for a reuse-3 deployment, the system now uses 3 carriers and occupies three times the bandwidth as compared to a single-carrier system. Thus, a fair comparison to make here is to compare between systems with the same bandwidth usage. Under certain performance metric, reuse-3 can outperform reuse-1. However, if networks with mainly elastic traffic sources are considered, for example, delay-insensitive data users, reuse-3 may not be the best choice due to its conservativeness in bandwidth reuse. Each cell only uses ⅓ of the total bandwidth to achieve a power gain for the cell boundary users and a tradeoff from bandwidth to power is usually not beneficial. Towards this end, a more flexible "frequency-reuse" scheme, which is referred to as a Flex-Band scheme, can be utilized.

In the Flex-Band proposal, all carriers can be used in all cells. Thus, from frequency-reuse point of view, it is a reuse-1 approach. However, each carrier is allowed to choose a different power level in the same cell. Different cells use a different power-reuse scheme within the cell. Apparently, the Flex-Band proposal is essentially a fractional power reuse scheme and both the simple frequency reuse-1 scheme and reuse-3 scheme are special cases of it. For brevity of notation, the frequency reuse-1 scheme can be referred to as the reuse-1 scheme and the frequency reuse-N scheme can be referred to as reuse-N scheme.

In cellular networks, the spectral efficiency can be defined as the data capacity normalized by bandwidth. Moreover, the spectral efficiency can be an important system performance metric to compare between different technologies. Specifically, the spectral efficiency is the cell overall throughput normalized by bandwidth when certain number of data users are dropped uniformly in cells. Further, the cell throughput is measured when a certain fairness criterion is enforced among different users in the system (e.g., the system can not maximize its throughput by putting all its resource to close-to-base station users).

The following analyzes whether it is beneficial to adopt a fractional power reuse scheme in a multi-carrier downlink, from a spectral efficiency point of view. Specifically, the capacity region of the system under a fractional power reuse scheme can be studied and compared to the capacity region under the even-power-allocation scheme. For instance, the following can be determined:

(1) In a single-cell TDMA scheme where a user is scheduled in each time slot with a fixed power constraint, a fractional power reuse scheme can yield a better capacity region as compared to the reuse-1 scheme. However, the improvement can be slim and if more than one user that can be scheduled is used in each carrier, the same improvement can be achieved even with the reuse-1 scheme.

(2) In a multi-cell system, the capacity region can be improved by fractional power reuse. This improvement can not be achieved by relaxing the one-user-per-slot policy and this shows that fractional power reuse can enable achieving the capacity region in a multi-cell multi-user system.

(3) The capacity region of a multi-cell system can be further improved by introducing time variation in the fractional power reuse scheme, which is an opportunistic power reuse scheme and is also referred to the breathing-cell scheme. In this scheme, each cell can vary its transmit power with a different frequency and/or phase, or equivalently saying, with a different power allocation pattern. The total number of power allocation patterns can be limited and can be reused over the entire network. Each cell can schedule cell boundary users when the channel condition (e.g., depending on its current transmit power and inter-cell interference) is good and can schedule close-to-base station users when the channel is bad.

A wideband cellular downlink can be considered with a given number of carriers. Communications scheduled in different carriers do not interfere with each other while simultaneous communications in same carriers in different cells create inter-cell interference. This is also referred to as the co-channel interference. Theoretically, if we assume perfect backhaul between the base stations, one can apply Costa Pre-coding at each base station to remove the co-channel interference, if the concurrent communications in neighboring cells can be known in a non-causal way. However, such a scheme may not be practical in reality due to the following two difficulties: (i) Costa pre-coding uses perfect knowledge of the channel side information at the base station; (ii) this scheme leverages symbol-level global system synchronization. Additionally, the complexity of such a scheme is very high. Thus, it is not assumed that such schemes are to be used at the base stations. Each base station can treat the inter-cell interference as a pure additive to the noise which can not be taken advantage of.

For simplicity, time can be assumed to be slotted. In each time slot, one user per carrier per cell can be allowed to transmit (e.g., a TDMA scheme). TDMA downlink has been adopted into many systems including IS-856 (EV-DO) systems, for example. With this assumption, intra-cell interference can be mitigated and thus the effect of power reuse schemes on the inter-cell interference can be reviewed. It is to be appreciated that although a TDMA approach is described herein, more than one user can be allowed to be scheduled within the same slot using an orthogonal system resource, which is possible in an OFDM-based network.

Users can be considered to be stationary (e.g., the channel is AWGN between the user and the base station or the channel varies in a slower time scale as compared to the communication time scale). When a user i is assigned the slot t, it can transmit at a rate of $$C_i(t) = \log_2\left(1 + \frac{h_i P_i(t)}{N_0}\right)$$

bits per second, where $h_i$ is the channel gain between user i and its serving base station and $P_i(t)$ is its transmit power at time t. $N_o$ is the noise power density (e.g., the following assigned $N_o=1$). Further, a power budget at the base station (e.g., the average power used per carrier) can be bounded by $P_m$.

A determination can be made as to how to allocate power levels to different carriers in different cells to maximize the system capacity. In a data network, the spectral efficiency (bits per second per Hertz) can be a useful capacity metric to compare different networks, where all users are assumed to be infinite-backlogged. However, spectral efficiency is usually defined associated with a given fairness criterion between users within the network and is thus hard to characterize in closed-form expressions. Thus, the following considers the capacity region instead of the spectral efficiency. The spectral efficiency under a fairness constraint can be viewed as an operating point within the capacity region. By considering the capacity region, the impact of different schemes under different fairness constraints can be evaluated. According to an example, the capacity region for a two-user system can be considered, where one user is chosen to be a cell-boundary user while the other one is close to the base station. This model can be a good simplification of a loaded system where multiple users are dropped uniformly in each cell.

Each mobile can be a wideband mobile (e.g., it can be scheduled in part of or all the carriers). The system scheduler can choose which users to transmit on each carrier without worrying about whether or not a mobile can transmit/receive on a particular carrier.

Single cell scenario: When only a single cell and a single user are considered, the problem considered degrades to a point-to-point communication problem over parallel channels. In such a scenario, due to the concavity of the Shannon capacity formula, it is optimal to allocate your power evenly across the parallel channels and make full use of the available degrees of freedom (e.g., there is no benefit to vary the power allocation across carriers or time). However, in a multi-user scenario, such observation is not true anymore. In other words, benefit can be obtained from varying power across carrier or time to do better than the even-power-allocation scheme. For convenience, in the following, the even-power-allocation scheme is referred to as a simple Reuse-1 scheme.

Next, the capacity region for two users under a two carrier system with a fixed power allocation scheme can be evaluated, where each carrier chooses a time-invariant power level.

Capacity region under fixed power allocation scheme: In this section, a two-user single-cell system with two carriers is evaluated. The power vector allocated to the two carriers is $(P_1, P_2)$. The main result of this section is summarized in the following theorem.

Theorem 1: Assume the path-loss gains for the two users in the system are $h_1, h_2$ and satisfy $h_2 \geq h_1$. The capacity region under a fixed power allocation scheme $(P_1, P_2)$ $(P_2 \geq P_1)$ is the convex hull of four capacity vectors $(0, 0), (R_1, 0), (0, R_2),$ and $(R'_1, R'_2)$, where $R_1, R_2, R'_1, R'_2$ are defined below.

$$R_1 = \log_2(1+h_1 P_1) + \log_2(1+h_1 P_2); \qquad (1)$$

$$R_2 = \log_2(1+h_2 P_1) + \log_2(1+h_2 P_2); \qquad (2)$$

$$R'_1 = \log_2(1+h_1 P_2); \qquad (3)$$

$$R'_2 = \log_2(1+h_2 P_1). \qquad (4)$$

Figure 14:
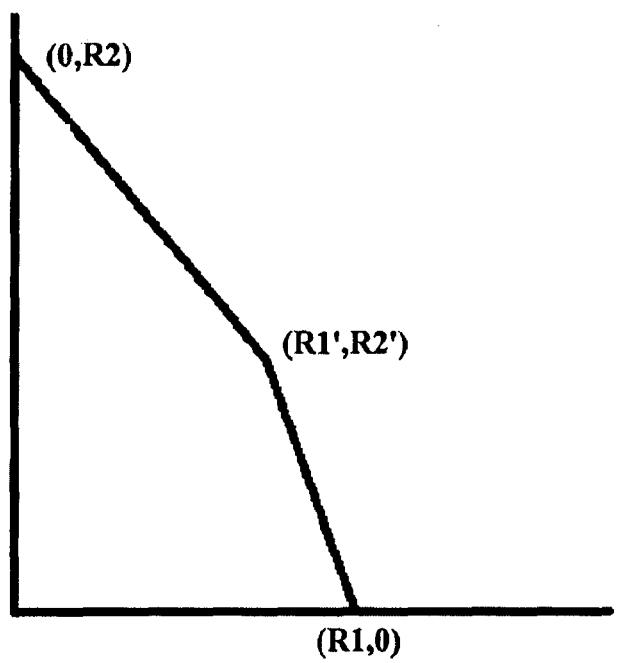
FIG. 14 is an illustration of an example diagram of a capacity region for a two-user two-carrier single-cell system under a fixed power allocation.

Remark: The capacity region illustrated in FIG. 14 is a polygon with vertexes given by $(0, 0), (R_1, 0), (0, R_2),$ and $(R'_1, R'_2)$. $R_i$ (i=1, 2) is the capacity of user i when both carriers schedule user i only all the time. Since $h_2 > h_1$, user 1 can be referred to as the bad user and user 2 as the good user. Similarly, carrier 1 can be referred to as the good carrier and carrier 2 as the bad carrier. $(R'_1, R'_2)$ is the capacity tuple when the good user is scheduled on a bad carrier only and the bad user is scheduled on the good carrier only. FIG. 14 shows an example of such a region.

This region is essentially a convolution of the capacity regions for the two carriers. Specifically, the region consists of all rate tuples which can be expressed in the form of the summations of two rate tuples, each belonging to the capacity region of a carrier. Such sum is also referred to as the Minkawski sum of two convex regions.

Proof: The achievability can be simple. By scheduling only user 1 to carrier 2 (e.g., the bad user uses all the resource of the good carrier), and by varying the fraction of time that user 1 is scheduled in carrier 2, points on the straight line with end points $(R_1, 0)$ and $(R'_1, R'_2)$ can be achieved. On the other hand, by scheduling only user 2 to carrier 1 and varying the fraction of time that user 2 is scheduled within carrier 2, the straight line between $(0, R_2)$ and $(R'_1, R'_2)$ can be achieved.

Figure 15:
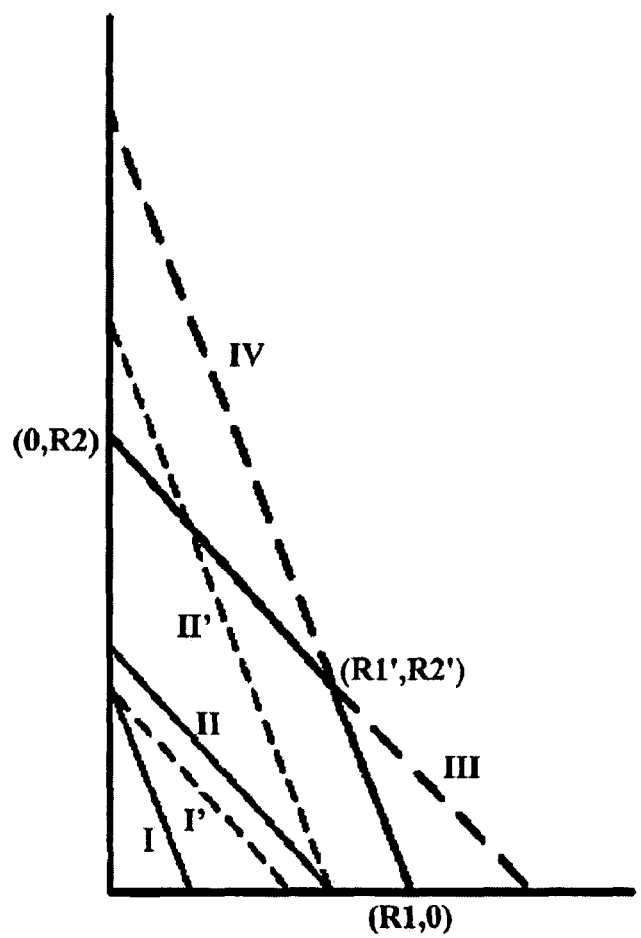
FIG. 15 is an illustration of an example graphical depiction of a proof in accordance with various aspects of the claimed subject matter.

FIG. 15 illustrates the converse via a graphical approach. In FIG. 15, straight line I denotes the boundary of the capacity region for carrier 1, II denotes the boundary of the capacity region for carrier 2. An observation that can be made here is if the two capacity regions for the two carriers are compared, such that the bad user can be improved by a larger factor by scheduling it on the good carrier. This is again due to the concavity of the capacity. Thus, line I is steeper as compared to line II.

The capacity region of the two-carrier system is then the set of rate tuples which can be written as the summation of a rate tuple within the capacity region of carrier 1 and a rate tuple within the capacity region of carrier 2. For simplicity, the capacity region can be equal to I+II. Apparently, the capacity region has to be bounded by both I+II' and I'+II, where I' and II' are also shown in FIG. 15. Specifically, line I' is parallel to II and intersects the $R_2$ axis at the same end point as I. II' is parallel to I and intersects the $R_1$ axis at the same end point as II. Similarly, straight line III is parallel to straight lines I' and II and intersects the $R_2$ axis at $(0, R_2)$ while straight line IV is parallel to straight lines I and II' and intersects the $R_1$ axis at $(R_1, 0)$.

Further, it can be shown that III=I'+II and IV=I+II'. To see that III=I'+II (the other proof can be similar), it suffices to see that the summation of any point $(x_1, y_1)$ on I' and any point $(x_2, y_2)$ on II has to reside on III. This is true since I' and II have the same slope and thus the two points can be represented by the following:

$$y_1 = -sx_1 + c_1;$$

$$y_2 = -sx_2 + c_2,$$

where s is the common slope and $c_1$, $c_2$ are two constants. It can be seen that $y_1+y_2=-s(x_1+x_2)+c_1+c_2$, for any choice of $(x_1, y_1) \in I'$ and $(x_2, y_2) \in II$. Next, the straight line $$y=-sx+c_1+c_2, \quad (5)$$

can be shown to coincide with III. It suffices to show that $(0, R_2)$ satisfy (5), e.g., $R_2=c_1+c_2$. This is trivial since $c_1$ and $c_2$ are the rate that user 2 can achieve within carrier 1 and 2 when all resources are allocated to it while $R_2$ is maximum rate user 2 can get in both carriers. The theorem follows.

A by-product of the proof above is that the optimal scheduling policy of a multi-carrier system, from a capacity point of view, can be determined.

Corollary 1: To achieve any point on boundary of the capacity region of a fixed power-allocation two-carrier system, at least one of the followings must be true (1) the good user is only scheduled in the bad carrier; or (2) the bad user is only scheduled in the good carrier.

Proof: Assume that there is a point on the boundary of the capacity region shown above which can be achieved by a scheme without satisfying condition (1) or (2). Equivalently saying, a scheme where both users are scheduled to both carriers which actually achieves a rate tuple on the capacity boundary can be utilized. Assuming $\alpha_{ij}=(i,j=1, 2)$ to be the time fraction that user i is scheduled on carrier j. Thus, $\alpha_{11}+\alpha_{21}=\alpha_{12}+\alpha_{22}=1$. The rate tuple achieved by this scheme is thus $(\alpha_{11}C_{11}+\alpha_{12}C_{12}, \alpha_{21}C_{21}+\alpha_{22}C_{22})$, where $C_{ij}$ is a capacity of user i when scheduled in carrier j, e.g., $C_{ij}=\log_2(1+h_iP_j)$. Thus, an observation that can be made is that:

$$\frac{C_{12}}{C_{11}} > \frac{C_{22}}{C_{21}}, \quad (6)$$

e.g., the benefit of scheduling the bad user in the good carrier is dominating the benefit of scheduling the good user there.

It can be shown that this rate tuple cannot be on the boundary if both $\alpha_{11}$ and $\alpha_{22}$ are non-zero, e.g., there exists an achievable rate tuple which is strictly larger than this one component wisely. To see this, the rate tuple achieved under time fraction $\beta_{ij}$ can be considered, where $\beta_{ij}$ is again the time fraction that user i is scheduled on carrier j. Moreover, $\beta_{ij}$ can be chosen as follows:

$\beta_{11}=\alpha_{11}-\eta$;

$\beta_{12}=\alpha_{12}+\epsilon$;

$\beta_{21}=\alpha_{21}+\eta$;

$\beta_{22}=\alpha_{22}-\epsilon$, where $\eta$ and $\epsilon$ are small positive numbers which satisfy $$\frac{C_{22}}{C_{21}} < \frac{\eta}{\epsilon} < \frac{C_{12}}{C_{11}}.$$

Since $\alpha$'s are positive, small enough $\eta$ and $\epsilon$ can be identified such that the $\beta$'s are positive as well.

The rate tuple achieved by this scheme can be seen to be $(\alpha_{11}C_{11}+\alpha_{12}C_{12}-\eta C_{11}+\epsilon C_{12}, \alpha_{21}C_{21}+\alpha_{22}C_{22}+\eta C_{21}-\epsilon C_{22})$ which is larger than the rate tuple under $\alpha_{ij}$ component wisely. Thus, there exists a contradiction.

Remarks: This corollary gives a general guideline for scheduling policies in a multi-carrier system. As shown below, the same rule is also true in a multi-cell system where inter-cell interference exists.

Comparison to the reuse-1 scheme: The capacity region under a fixed power allocation scheme was evaluated above. Now, it can be determined whether or not it is optimal to allocate power evenly across the carriers, by comparing the capacity region under a general $(P_1, P_2)$ allocation to the one under reuse-1 scheme.

Apparently, for the two extreme points $(R_1, 0)$ and $(0, R_2)$, to deviate from the simple reuse-1 scheme is suboptimal as seen in the single user case. But it is not yet proved if the capacity region under a general $(P_1, P_2)$ scheme is a subset of the capacity region under the even-power-allocation scheme. By choosing $(P_1, P_2)$ carefully, beneficial results can be obtained in comparison to the even-power-allocation scheme in some part of the capacity region.

Lemma 1: Consider a two-user two-carrier single-cell system with $h_1 < h_2$. There exist a power allocation scheme $(P_1, P_2)$ such that the capacity region under $(P_1, P_2)$ is not a subset of the capacity region under Reuse-1 scheme.

Proof: To see this, the point $(R'_1, R'_2)$ as defined in (3) and (4) is considered. Since the capacity region under Reuse-1 is a linear region under the system assumption, $(R'_1, R'_2)$ is a candidate to consider here because it is the vertex of the polygon which may not be included in the Reuse-1 capacity region.

The capacity region can be written as $$\left\{(R_1, R_2): \frac{R_1}{2\log_2(1+h_1P_m)} + \frac{R_2}{2\log_2(1+h_2P_m)} \leq 1\right\}.$$

Thus, it suffices to show that there exists an $\alpha \in (0, 1]$ such that $(P_1, P_2)=((1-\alpha)P_m, (1+\alpha)P_m)$ and $$\frac{\log_2(1+h_1P_2)}{2\log_2(1+h_1P_m)} + \frac{\log_2(1+h_2P_1)}{2\log_2(1+h_2P_m)} > 1.$$

The left-hand-side of the inequality above can be defined as $g(\alpha)$. Thus, $$g(0)=1. \quad (7)$$

Further, the first-order derivative of $g(\alpha)$ is $$g'(\alpha) = \frac{1}{\log_2(1+h_1P_m)} \frac{1}{1+\frac{\alpha h_1 P_m}{1+h_1P_m}} \frac{h_1P_m}{1+h_1P_m} -$$

$$\frac{1}{\log_2(1+h_2P_m)} \frac{1}{1-\frac{\alpha h_2 P_m}{1+h_2P_m}} \frac{h_2P_m}{1+h_2P_m}.$$

Further, $$g'(0)>0, \quad (8)$$

if $h_1 < h_2$. This can be true because $$g'(0) = \frac{1}{\log_2(1+h_1P_m)} \frac{h_1P_m}{1+h_1P_m} - \frac{1}{\log_2(1+h_2P_m)} \frac{h_2P_m}{1+h_2P_m}$$

$$g'(0) = f(h_1P_m) - f(h_2P_m)$$

where f(.) can be defined as $$f(x) = \frac{1}{\log_2(1+x)} \frac{x}{1+x}$$

and can be shown to be a monotone decrease function for x>0. The lemma follows from (7) and (8).

From here, if $(P_1, P_2)$ is chosen appropriately, better results can be obtained than the reuse-1 scheme for certain choice of utility function, or equivalently, fairness criterion. On the other hand, an uneven power allocation leads to a sub-optimal performance when the operating point shifts to the end points where most system resource is allocated to one of the users. Such properties are depicted in FIG. 16.

Capacity region under opportunistic power allocation: The capacity region for a single-cell two-carrier system can be considered, by introducing time-varying power allocation across time. Specifically, in each time slot, the scheduler of the system can determine both (1) which user to transmit on each carrier, and (2) which power level to use on each carrier under the average power constraint.

Figure 16:
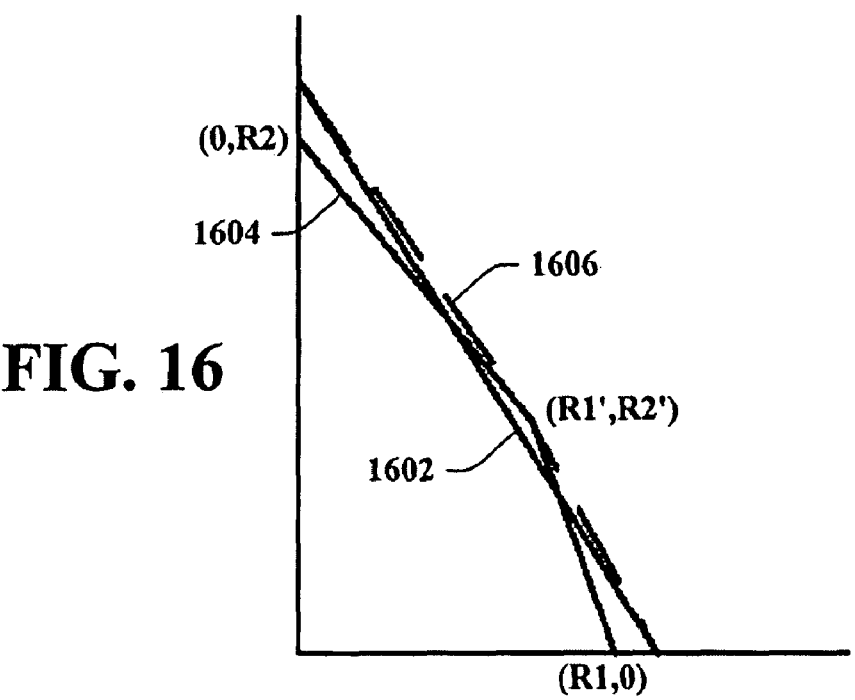
FIG. 16 is an illustration of an example diagram of a capacity region of ($P_1$, $P_2$) as compared to reuse-1.

The benefit of allowing time-varying power allocation is apparent from FIG. 16. As illustrated, curve 1602 is a capacity region under reuse-1, curve 1604 is a capacity region under $(P_1, P_2)$, and curve 1606 is a capacity region under time-sharing. As shown in FIG. 16, a naive lower bound to the true capacity region can be obtained by performing time-sharing between the two end-points of the reuse-1 scheme and the better-performance point $(R'_1, R'_2)$ under any power allocation scheme. This yields a capacity-region curve consist of two straight lines which can outperform reuse-1 at all points. The capacity region can further be optimized by looking at all possible $(P_1, P_2)$ allocations. However, this scheme is not necessarily optimal. Next, it can be determined whether further optimization can be obtained and/or what is the optimal user and power scheduling policy as shown in the next theorem.

Theorem 2: Assume the path-loss gains for the two users in the system are $h_1$, $h_2$. The capacity region of the single-cell two-carrier system is the convex hull of following rate tuples $\{(2\alpha \log_2(1+h_1P_1), 2(1-\alpha)\log_2(1+h_2P_2)): 0 \leq \alpha \leq 1, \alpha P_1 + (1-\alpha)P_2 = P_m\}$.

Remarks: In the expression above, $\alpha$ is the usual time-sharing parameter, which represents the time fraction that the system is scheduling one of the users. $P_1$ and $P_2$ can be viewed as the power-sharing parameters. This theorem yield that to achieve any point on the boundary of the capacity region under the one-user-per-slot-per-carrier constraint, the optimal strategy utilizes a time/power sharing strategy instead of the simple time-sharing strategy, which yields the straight-line region under reuse-1. In this strategy, the system picks different power levels accordingly when it schedules different users. After a power level is picked, the system sticks to it when the same user is scheduled.

Proof: Achievability is trivial. User 1 can be scheduled in $\alpha$ of the total segments over both carriers and use power $P_1$ to transmit. User 2 is scheduled $1-\alpha$ of the total segments using $P_2$.

For the converse, it can be argued that any rate tuple which is out of capacity region defined above may not be achieved. For any scheduling policy, it can be assumed that user 1 gets a fraction of the total segments with average power $P_1$ and user 2 gets the rest of the segments with average transmit power $P_2$. Due to the concavity of the capacity, the rate that user 1 obtained under this scheduling policy is upper bounded by $2\alpha \log_2(1+h_1P_1)$ which is achieved by spreading the power evenly across the segments (or degrees of freedom) assigned to that user. A similar argument can be made with regarding to user 2.

Figure 17:
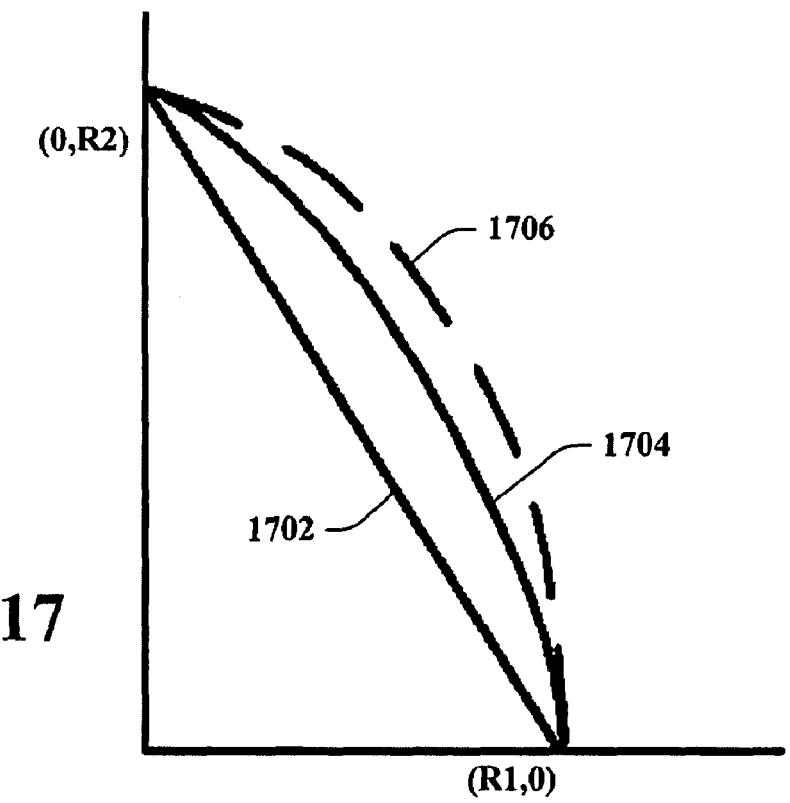
FIG. 17 is an illustration of an example diagram of capacity regions under reuse-1, general time/power sharing and superposition.

Another observation that can be made is that in the proof of Theorem 2, the fact that there are two carriers can be irrelevant. Such a scheme can be easily extend to the single-carrier system, where flexible time/power sharing can be applied to achieve a better capacity region as compared to the simple reuse-1 scheme. A comparison between the capacity region under this scheme and the reuse-1 scheme is shown in FIG. 17. FIG. 17 illustrates an example comparison of capacity regions under simple reuse-1, general time/power sharing and superposition. As depicted, 1702 represents a capacity region under reuse-1, 1704 depicts a capacity region under opportunistic power allocation, and 1706 represents a capacity region under super-position.

The benefit of flexible time/power sharing against the simple reuse-1 scheme can decrease as the difference between two users gets smaller. Further, if the one-user-per-slot constraint is removed to allow scheduling multiple users, then the information-theoretic capacity region is achieved by super-position coding and decoding, which can be better than the capacity region under time/power sharing.

To allow power to vary over time arbitrarily may not be desirable in cellular networks since it will cause fluctuation in inter-cell interference and thus make channel quality tracking difficult. On the other hand, superposition coding also adds complexity to the system. Accordingly, alternative ways to achieve the capacity region beyond the linear Reuse-1 region without applying either time/power sharing or superposition coding can be leveraged.

A possibility to improve the spectral efficiency is to introduce the multi-carrier system. To have a two-carrier system can achieve some rate tuples outside the linear region, by choosing power levels and scheduling policies carefully. Now consider a system with infinite number of carriers. In this case, the capacity region (normalized by the number of carriers) can be the same as the single-carrier capacity region under flexible time/power sharing, since power can be assigned to carriers in a similar way to that proposed in the time/power sharing scheme in the time domain.

When considering a finite number of carriers, a quantization error can result if time-varying power allocation is not allowed. Specifically, the percentage of degrees of freedom using a specific power level is not of infinite precision any more. Thus, the capacity region achievable with a finite number of carriers will be a subset of the single-carrier capacity region under time/power sharing.

In an orthogonal system, for example, an OFDM system, the super linear capacity region can be achieved even with a single carrier since multiple sub-carrier tones can be included within a carrier. If more than one user is allowed to schedule in the same time slot within the same carrier, then more energy can be used on some of the tones where the bad user can be scheduled while the good user can be scheduled at the rest of the tones. Additionally, a single cell scenario can be similar to a multi-carrier system under the one user per carrier per slot constraint.

Two-cell Scenario: A two-cell scenario can be evaluated. Similar to the single-cell scenario, the capacity region for a multi-carrier system can be reviewed and then the capacity region under an opportunistic power allocation scheme can be analyzed, which can be applied to single carrier systems. For a two-cell case, the definition of capacity region can be slightly different from the capacity region described above. For instance, the following provides assumptions and defines capacity region in connection with the two-cell scenario.

Definitions and assumptions: The capacity region described for the two-cell scenario can be the capacity region for users in one of the cells. The cell of interest can be referred to as the primary cell and the other cell can be referred to as the interfering cell or simply the interferer. Clearly, the capacity region of the primary cell depends on the transmitting power in the interferer cell. The interferer can be assumed to be blasting at the maximum allowed power in its carriers. This assumption is valid in a loaded system where the spectral efficiency is calculated.

Another factor which will affect the capacity region is the power allocation in the carriers of the interferer cell. Towards this end, another assumption can relate to the symmetry between these two cells. Specifically, assume L carriers in each cell and assume that the primary call assign power vector $P=(P_1, P_2, \ldots, P_L)$ to the L carriers. By the symmetry assumption, the power allocation can be constrained in the interferer cell to be a permutation of P. Further, assuming $\pi_{ij}$ to be the fraction of carriers where the primary cell assigns power level $P_i$ and the interferer assigns $P_j$, then $\pi_{ij}=\pi_{ji}$.

As an example, consider the case where two carriers exist in each cell. If $(P_1, P_2)$ is used in the primary, then the symmetry assumption constrains the power allocation to the two carriers in the interferer to be either $(P_1, P_2)$ or $(P_2, P_1)$. Any other power allocations (e.g., power allocations using any other power levels) in the interferer can be excluded.

Due the presence of the interferer, the channel quality from a mobile to both cells can affect the performance for a user. For notational convenience, $\eta_i$ to be the path loss ratio of user i, e.g., $$\eta_i = \frac{h_i^{(2)}}{h_i^{(1)}},$$

where $h_i^{(k)}$ represents the path loss gain between user i and cell k. After introducing $\eta_i$, the super index for the h's and a user's channel need not be used and can be represented by the channel gain $h_i$ and the path loss ratio $\eta_i$.

In general, $h_i$ and $\eta_i$ are not necessarily fully correlated. If there are two mobiles, for example, the one with better $h_i$ can have a larger path loss ratio. To reduce the complexity of the problem, it can be assumed that $\eta_i$ and $h_i$ are fully correlated when multiple users are considered, e.g., if $h_2 \geq h_1$, then $\eta_2 \leq \eta_1$. With this assumption, for users with better channel quality, they see less interference from the interferer too and thus the path loss $h_i$ can distinguish between a "good" user and a "bad" user.

System capacity with two carriers under fixed power allocation: First, two carriers in each cell in the system can be considered. Due to existence of the interferer, an even-power-allocation scheme is not guaranteed to be optimal even for a single user. For example, consider a user in the cell boundary, e.g., $\eta \approx 1$. In this case, an even-power-allocation leads to approximately zero SNR and further limit the sum rate for this user, if the system allocates all the resources to him, by 2 bits per second, according to (14). However, all the power is assigned to one of the carriers, e.g., choose $(P_1, P_2)=(2P_m, 0)$, this user will lose half of the degrees of freedom and obtain a power gain on the carrier in use. Due to the concavity of capacity formulation, when the interference does not change, it is beneficial to use more degrees of freedom rather than focusing the power on part of the bandwidth. However, at the presence of an interferer, it is possible that the power gain can dominate the loss in degrees of freedom. Specifically, using the formulation in (14), the SNR under a $(2P_m, 0)$ allocation is $h_2P_2$. In an interference limited scenario, we have $h_2P_2 \gg 1$. Apparently, in this case, a capacity gain for certain users can be obtained by allowing power allocation to deviate from the even-power-allocation scheme. In particular, the maximum capacity of a single user in the two-cell system can be evaluated as follows.

Single user capacity with two carriers: The following problem can be analyzed: what is the optimal power allocation scheme in the presence of a cooperative interferer for a given user? The following lemma answers this question.

Lemma 2: The optimal power allocation scheme for a mobile parameterized by channel gain h and path-loss ratio $\eta$ (the subscript can be removed in this lemma since all resources can be scheduled to a single user in the primary cell) is either a reuse-1 or a reuse-2 scheme, e.g., $(P_m, P_m)$ or $(2P_m, 0)$.

Proof: To see this, the sum capacity (over the two carriers) of a user under a power allocation scheme $(P_m+x, P_m-x)$ can be represented as a function of x, which is the amount of power chosen to deviate from the even-allocation method:

$$C(x) = \log_2\left(1 + \frac{h(P_m + x)}{1 + \eta h(P_m - x)}\right) + \log_2\left(1 + \frac{h(P_m - x)}{1 + \eta h(P_m + x)}\right).$$

C(x) can be maximized for $x \in [-P_m, P_m]$ when $x=0$, $x=P_m$, or $x=-P_m$. Since $C(x)=C(-x)$, it suffices to show that $C(x)$ is either monotonely decreasing or increasing within the interval $x \in [0, P_m]$.

To see this, the first-order derivative of $C(x)$ with respect to x can be evaluated such that $$C'(x) = \frac{1}{\ln(2)}\left\{\frac{1}{x+z_1} - \frac{1}{z_1-x} - \frac{1}{x+z_2} + \frac{1}{z_2-x}\right\}, \quad (9)$$

where the poles $z_1$ and $z_2$ are defined below $$z_1 = P_m + \frac{1 + 2\eta h P_m}{(1-\eta)h}; \quad (10)$$

$$z_2 = P_m + \frac{1}{\eta h}. \quad (11)$$

It can be determined that $z_1, z_2 > P_m$. Given $x \in [-P_m, P_m]$, the four terms (without sign) in (9) are all positive. Further, if $z_1 > z_2$, then $C'(x) > 0$ for all $x \in [0, P_m]$ while if $z_1 \leq z_2$, then $C'(x) < 0$.

The condition for z1>z2 in the proof above is $$hP_m > \frac{1-2\eta}{2\eta^2}. \tag{12}$$

In other words, for users satisfying (12), the optimal power allocation scheme is reuse 2. On the other hand, for mobiles that cannot satisfy (12), the optimal power allocation scheme is reuse 1. There are two observations that can be derived from this condition: (1) Given a power constraint $P_m$ at the base station, mobiles with worse path loss ratio are more likely to benefit from a reuse-2 allocation; and (2) Given a mobile constrained by h and η, it is more likely for this mobile to benefit from a reuse-2 allocation in a base station with higher power constraint. Simply put, reuse-2 allocation is more favorable for an interference-limited deployment with a lot of cell-boundary mobiles.

Two user capacity region: As before, the capacity region of two users under a given power allocation vector $(P_1, P_2)$ in the primary cell can be considered. As utilized above, a power allocation can be $(P_1, P_2)$ or $(P_2, P_1)$ in the interferer cell. $(P_1, P_2)$ in the interferer may not be an interesting scenario since in this case, in the interference-limited deployment, the performance can be quite similar to the simple reuse 1 scheme. Thus, the capacity region under power allocation $(P_1, P_2)$ at the primary and $(P_2, P_1)$ at the interferer can be evaluated.

Theorem 3: Assume the path-loss gains for the two users in the primary cell are $h_1$, $h_2$ and satisfy $h_2 \geq h_1$. Assume the path loss ratio $\eta_1$, $\eta_2$ satisfy $\eta_1 \geq \eta_2$. The capacity region under a fixed power allocation scheme $(P_1, P_2)$ $(P_2 \geq P_1)$ is the convex hull of four capacity vectors $(0, 0)$, $(R_1, 0)$, $(0, R_2)$, and $(R'_1, R'_2)$, where $R_1$, $R_2$, $R'_1$, and $R'_2$ are defined below.

$$R_1 = \log_2\left(1 + \frac{h_1 P_1}{1 + \eta_1 h_1 P_2}\right) + \log_2\left(1 + \frac{h_1 P_2}{1 + \eta_1 h_1 P_1}\right); \tag{13}$$

$$R_2 = \log_2\left(1 + \frac{h_2 P_1}{1 + \eta_2 h_2 P_2}\right) + \log_2\left(1 + \frac{h_2 P_2}{1 + \eta_2 h_2 P_1}\right); \tag{14}$$

$$R'_1 = \log_2\left(1 + \frac{h_1 P_2}{1 + \eta_1 h_1 P_1}\right); \tag{15}$$

$$R'_2 = \log_2\left(1 + \frac{h_2 P_1}{1 + \eta_2 h_2 P_2}\right). \tag{16}$$

Proof: The proof is similar to the proof to Theorem 1.

Figure 18:
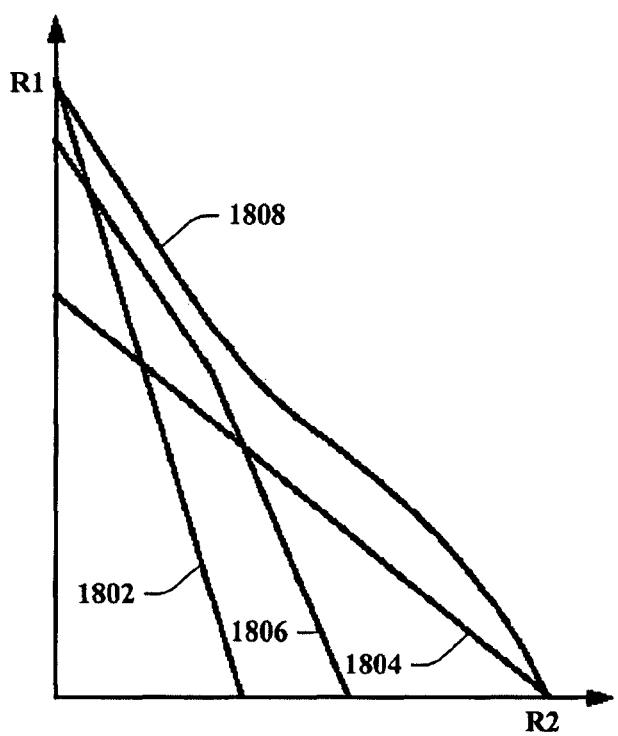
FIG. 18 is an illustration of an example diagram of capacity regions for a two-user two-carrier two-cell system under reuse-1, reuse-2 and a ($P_1$, $P_2$) allocation.

Remarks: $R_i$ (i=1, 2) can be the capacity when both carriers are assigned to user i and $(R'_1, R'_2)$ can be the rate tuple when the good user is scheduled to the bad carrier and the bad user is scheduled to the good carrier. The capacity region of an arbitrary power allocation method can be compared to the capacity regions under reuse 1 and reuse 2 scheme. For simplicity, the case where a good user and a bad user coexist in the primary cell can be evaluated. However, it should be noted that the definition of good and bad is different than the ones used in the single cell case. In the single cell case, there is no clear constraint to quantize how good a user is and the words good and bad come from the relative channel quality comparison between the two users. Here, a bad user can be a user with an h and q such that (12) is satisfied while a good user can be a user such that (12) is not satisfied. FIG. 18 illustrates example capacity regions under such an assumption.

Referring to FIG. 18, illustrated is an example of capacity regions for a two-user two-carrier two-cell system under reuse-1, reuse-2 and a $(P_1, P_2)$ allocation. At 1802, a reuse-1 capacity region is illustrated. At 1804, a reuse-2 capacity region is shown. Further, at 1806, a $(P_1, P_2)$ capacity region is depicted. Moreover, 1808 represents an achievability regions under all power allocation schemes. As shown in FIG. 18, the good user's rate is maximized in a reuse-1 scheme while the bad user's rate is maximized in reuse-2 scheme. For a general $(P_1, P_2)$ allocation, the capacity region is again a convex region characterized by Theorem 3.

Further, the set of achievable rate tuples under any power allocation scheme can be analyzed. This achievable region can be the union of the capacity regions under all power allocation schemes and is also shown at 1808. For any rate tuple within this achievable region, a power allocation scheme and a scheduling policy to achieve this rate tuple can be determined. However, it is to be appreciated that this region is not necessarily a convex region.

Opportunistic power allocation: Schemes to improve upon the rate regions achieved in FIG. 18 can leverage introducing time-varying power allocation scheme. Due to the non-convexity of the rate region by the fixed power allocation scheme, the region can be improved by time-sharing between different power allocation schemes. An example is to time-share with reuse-1 and reuse-2, which can effectuate achieving a linear region connecting the point $(R_1, 0)$ and $(0, R'_2)$. Further, similar to the single cell case, after introducing time-variation, there is not much difference between a single-carrier system and a multi-carrier system, from a spectral efficiency point of view. Thus, the capacity region under an average power constraint when a corporative interferer exists can be evaluated as described below.

A single-carrier two-cell can be utilized according to an example. At each time slot, the scheduler can pick one user to transmit and a power level to transmit under an average power constraint. Again, to maximize the throughput in the primary cell, the interference cell can shut down completely. Here, again a symmetry assumption can be utilized. Specifically, both cells can be assumed to have to choose from the same power alphabet. A power alphabet is a set of discrete power levels that a cell is allowed to choose from at a given time slot. Assuming the power alphabet is $P_1, P_2, \ldots, P_L$, we define a matrix $\pi=\{\pi_{ij}\}$, $1 \leq i,j \leq L$, where $\pi_{ij}$ represents the time fraction that the primary cell chooses power level $P_i$ while the interferer chooses $P_j$. Assuming symmetry can enforce that $\pi_{ij}=\pi_{ji}$.

Single user capacity under opportunistic power allocation: The capacity for a single user in the primary cell can be reviewed. When the interferer does not exist, or the interferer chooses a even-power-allocation scheme, e.g., interferer is incorporative, the strategy for the primary cell is also to use an even-power-allocation scheme. However, when a corporative interferer exists, the problem is not well understood even for a single user. The study of the single user capacity will also lead to the end-points in the capacity region when more than one user exist in the primary cell and give insight into the multiuser problem.

The single-user capacity problem can be formulated as below:

$$\max_{P,\pi} \sum_{ij} \pi_{ij} C_{ij} \tag{17}$$

$$\text{s.t.} \quad \sum_{ij} \pi_{ij} = 1; \tag{18}$$

-continued $$\sum_{ij} \pi_{ij} P_i = P_m; \qquad (19)$$

$$0 \leq \pi_{ij} \leq 1, \forall\, i,j; \qquad (20)$$

$$\pi_{ij} = \pi_{ji}, \qquad (21)$$

where $C_{ij}$ is the capacity of the user, (characterized by h and η), when the primary cell chooses $P_i$ and the interferer chooses $P_j$. For simplicity, again the AWGN Shannon capacity formula can be utilized and $$C_{ij} = \log_2\left(1 + \frac{hP_i}{1 + \eta hP_j}\right). \qquad (22)$$

The constraints (18) and (20) come from the definition of π. Constraint (19) follows from the average power constraint, and (21) is a consequence of the symmetry assumption.

This problem is an extension to the two-carrier problem considered above. Actually, to vary power in time has no essential difference to vary power in the frequency domain, except that since time goes on forever, a finer allocation (or time-sharing) between different schemes can be obtained. If the system can have infinite number of carriers, the problem to find the optimal power allocation across carriers is substantially similar to the problem to find the optimal power allocation in time.

Theorem 4: The maximum rate for a single user under the opportunistic power allocation is determined by the solution to the following optimization problem $$\max \theta_1 \log_2\left(1 + \frac{hP_1}{1+\eta hP_1}\right) + \theta_2 \frac{\log_2(1+2hP_2)}{2} \qquad (23)$$

$$\text{s.t.} \quad \theta_1 + \theta_2 = 1; \qquad (24)$$

$$\theta_1 P_1 + \theta_2 P_2 = P_m; \qquad (25)$$

$$0 \leq \theta_1, \theta_2 \leq 1. \qquad (26)$$

Remarks: As compared to the original infinite-dimensional optimization problem (17), the optimization problem here can be simpler. In (23), the optimization has four parameters $\theta_1$, $\theta_2$, $P_1$ and $P_2$, and can be interpreted as follows. The optimization (23) is essentially a time/power sharing between reuse-1 and reuse-2 scheme. $\theta_1$ and $\theta_2$ correspond to the time fraction that the system is choosing reuse-1 and reuse-2 schemes, respectively. $P_1$ and $P_2$ are the power levels the system chooses for reuse-1 and reuse-2, given the average power constraint can be satisfied. In other words, this theorem reveals that among all possible power allocation strategies, for any single mobile in the system, the optimal strategy to optimize its capacity within the system can be in the form of time/power sharing between reuse-1 and reuse-2.

It should be noted here the time/power sharing here is different from the time/power sharing scheme mentioned in the single cell case since there the sharing is between users while here the resource is shared among different transmitting strategies for the same user.

Proof: To prove this theorem, (17) can be optimized over all possible probability matrix π given a fixed set of power alphabet. After fixing P, it can be seen that $C_{ij}$'s are constant with respect to π and the problem (17) becomes a linear programming problem.

Next the constraint (21) can be removed by reducing the number of parameters to optimize.

$$\max_{\{\pi_{ij}: i \geq j\}} \sum_{i \geq j} \pi_{ij}(C_{ij} + C_{ji} I_{i \neq j}) \qquad (27)$$

$$\text{s.t.} \quad \sum_{i \geq j} \pi_{ij}(1 + I_{i \neq j}) = 1; \qquad (28)$$

$$\sum_{i \geq j} \pi_{ij} P_i = P_m; \qquad (29)$$

$$0 \leq \pi_{ij} \leq 1, \forall\, i,j, \qquad (30)$$

where $I_{i \neq j}$ is the indicator function that i is not equal to j.

Another observation that can be made is that (28) already ensures that $\pi_{ij} \leq 1$, given that $\pi_{ij} \geq 0$, for all i,j. Thus, the linear constraints can be now reduced to $$\sum_{i \geq j} \pi_{ij}(1 + I_{i \neq j}) = 1; \qquad (31)$$

$$\sum_{i \geq j} \pi_{ij} P_i = P_m; \qquad (32)$$

$$\pi_{ij} \geq 0, \forall\, i,j. \qquad (33)$$

Since the linear programming problem is optimized at one of the vertexes of the linear region, the vertexes of the region determined by (31)-(33) can be reviewed. For instance, optimizing $\{\pi_{ij}: i \geq j\}$ can have at most two non-zero entries.

It can be shown that the above is true if there are three $\pi_{ij}$'s (i≥j) to optimize over. In the three-dimensional space, the two constraints (31) and (32) restrict the feasible $\pi_{ij}$'s to be on a straight line. Thus, the vertexes of the convex region are nothing but the endpoints of the straight line when it hits one of the three plains: $\pi_{ij}=0$. (It has to hit the plains since the whole region is a bounded region.) Thus, one of the three parameters have to be zero, which proves the above for the case of three $\pi_{ij}$'s. For the general case, this argument can be applied to any non-zero three $\pi_{ij}$'s and shown that it does not reduce the optimality by considering only two out of three $\pi_{ij}$'s to be non-zero.

Therefore, for any power alphabet of any size, it does not lose any optimality by only assigning the probability to up to four power levels. Further, in the upper half (including the diagonal entries), it is sufficient to consider only two non-zero $\pi_{ij}$ entries. With this simplification, three cases can be evaluated: (i) both non-zero entries are not diagonal entries; (ii) one of the entries is a diagonal entry; and (iii) both entries are diagonal entries. However, in the case of (ii) and (iii), it can be considered as a special case of (i) by allowing the power alphabet to have identical entries. In view of this, the power alphabet can be assumed to be $(P_1, P_2, P_3, P_4)$, and the non-zero probability entries are $\pi_{12}$, $\pi_{21}$ and $\pi_{34}$, $\pi_{43}$.

Lemma 2 can be applied here and further it can be determined that $P_1=P_2$ or one of $P_1$, $P_2=0$. In particular, the choice of $P_1$ and $P_2$ can be optimized, without changing the average of them, which can yield the same problem as the two-carrier two-cell single-user problem seen above, and thus, Lemma 2 is applicable here. Same argument holds for $P_3$ and $P_4$. In other words, both $(P_1, P_2)$ and $(P_3, P_4)$ are either reuse-1 or reuse-2. On the other hand, if both of them belong to the same reuse scheme, either reuse-1 or reuse-2, there may be no motivation to choose different power levels. This can be for reuse-2; for reuse-1, on the other hand, the concavity of the following function can be argued: $\log_2$ $$\left(1+\frac{x}{1+ax}\right),$$

which can be straightforward when evaluating the second-order derivative with respect to x.

A numerical solution to the optimization problem in (23) can also be provided. The solution is summarized in the following corollary.

Figure 19:
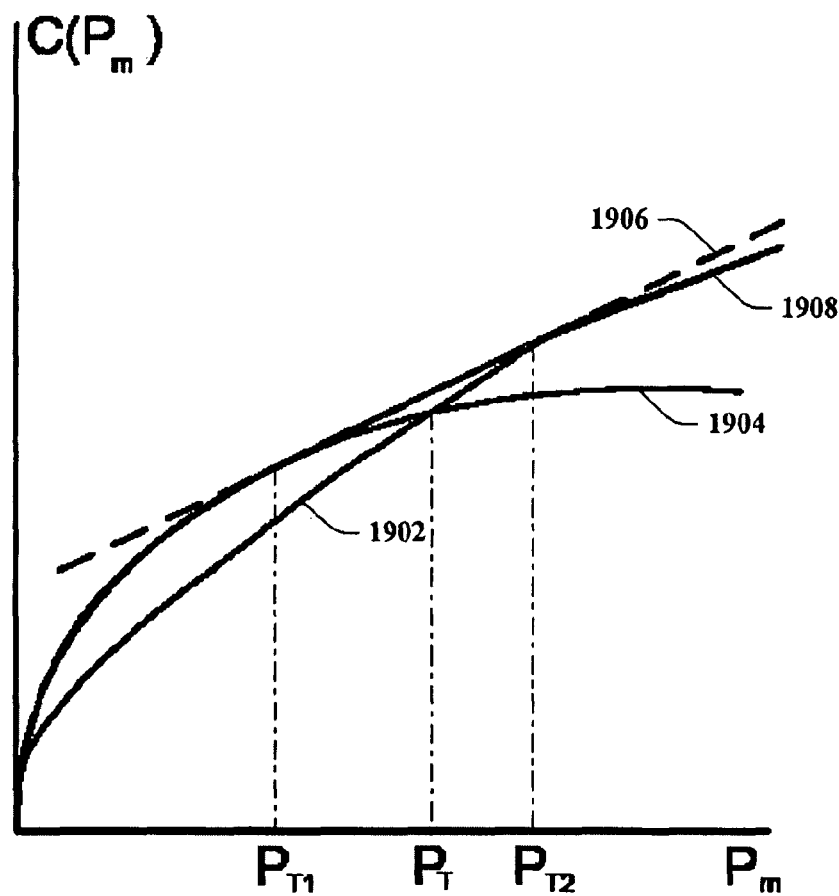
FIG. 19 is an illustration of an example diagram of various capacity regions.

Corollary 2: The capacity of a single user under opportunistic power allocation with average power $P_m$, or equivalently, the solution to the optimization problem (17), is determined by the following equation:

$$C(P_m) = \begin{cases} \log_2\left(1+\frac{hP_m}{1+\eta h P_m}\right) & \text{if } P_m < P_{T1}; \\ \frac{P_m - P_{T1}}{P_{T2} - P_{T1}}\log_2\left(1+\frac{hP_{T1}}{1+\eta h P_{T1}}\right) + \frac{P_{T2} - P_m}{P_{T2} - P_{T1}}\frac{1}{2}\log_2(1+2hP_{T2}) & \text{if } P_{T1} \le P_m < P_{T2}; \\ \frac{1}{2}\log_2(1+2hP_m) & \text{if } P_m \ge P_{T2}. \end{cases} \quad (34)$$

where $P_{T1}$ and $P_{T2}$ are defined in FIG. 19.

FIG. 19 illustrates a solution to the single user power allocation problem. As depicted, 1902 illustrates capacity under reuse 2, 1904 shows capacity under reuse 1, 1906 illustrates a common tangential line, and 1908 represents a capacity. The line 1904 is the capacity with average power $P_m$ under reuse 1, which is given by $$\log_2\left(1+\frac{hP_m}{1+\eta h P_m}\right).$$

The line 1902 is the capacity under reuse 2, which is given by ½ $\log_2(1+2hP_m)$. The dashed line 1906 is a straight line which is tangential to both capacity curves. $P_{T1}$ and $P_{T2}$ are the tangential points of the common tangential line to the two capacity curves.

Again referring to FIG. 19, in the lower SNR regime, the reuse-1 curve 1904 performs similar as compared to the reuse-2 capacity curve 1902 since in the low SNR regime, the capacity scales linearly with the transmit power regardless the how many degrees of freedom are used. However, as available power grows, reuse-1 starts to outperform reuse-2 since the optimal strategy generally is to spread the available power evenly across bandwidth. However, due to the existence of the interferer, the reuse-1 capacity will be bounded by $\log_2$ $$\left(1+\frac{1}{\alpha}\right)$$

as SNR grows while the reuse-2 SNR keeps growing logarithmically.

This solution illustrates that when the available power $P_m$ is less than $P_{T1}$, which is determined given h and $\eta$ for a mobile, then reuse-1 is optimal. If the average power is larger than the other threshold $P_{T2}$, then reuse-2 is optimal, where the transmitter transmits at 2 $P_m$ half of the time and keeps silent in the other half degrees of freedom. When the average power $P_m$ falls between the two thresholds, then a time/power sharing between reuse-1 and reuse-2 is optimal. Further, when doing reuse-1, the transmitter should transmit at power $P_{T1}$; when doing reuse-2, the transmitter should transmit at power $2P_{T2}$ when it is transmitting. This illustrates the optimal transmitting strategy at a given power level.

An alternate angle to look at this problem is to find the optimal transmitting strategy for different mobiles (with different h and $\eta$) given an average power constraint. For the mobiles which are close to the transmitter, e.g., $\eta \ll 1$, the hard limit for the rate in reuse-1 case is very large and the intersection point $P_T$ can be out of the power range of interest. In this case, reuse-1 can be optimal for a power constraint. On the other hand, for cell boundary users, e.g., $\eta$ is comparable to, in this case, the reuse-1 curve can be compressed into a small capacity region between 0 and probably a couple of bits per second. In this case, the threshold power levels are moved to close to 0 and for any reasonable power constraint, reuse-2 is optimal, among possible transmitting strategies.

A relation exists between Corollary 2 and Lemma 2. Lemma 2 focused on the scenario where the system has two carriers and discussed the best way to allocate power between the two carriers to maximize the rate for a single user in the primary cell. This is equivalent to find the optimal opportunistic power allocation scheme if restricted to a power alphabet size of 2 and a probability matrix with zero diagonal entries. It shows that there is a single threshold for the average power $$P_T = \frac{1-2\alpha}{2h\alpha^2}$$

such that if $P_m > P_T$, reuse-2 is optimal and otherwise reuse-1 is optimal. It can be seen that $P_T$ corresponds to the intersection point of reuse-1 and reuse-2 capacity curves in FIG. 19. Thus, removing the constraints on the alphabet size and the probability matrix above helps improve the capacity for $P_m \in (P_{T1}, P_{T2})$.

Proof: Achievability is trivial if the above transmitting strategy is employed. For the converse, Theorem 4 has narrowed down the optimal transmitting strategy to a much smaller set of strategies as described in (23). Thus, it can be shown that by doing time/power sharing between reuse-1 and reuse-2, better results than curve 1908 may not be obtained. This is again true since any achievable rate tuple under time/power sharing between reuse-1 and reuse-2 lies on one of the straight lines connecting two points: one on the reuse-1 curve and the other on the reuse-2 curve.

Capacity region under opportunistic power allocation: The capacity region for two users in the primary cell under opportunistic power allocation can be analyzed. An achievability region can be shown which improves upon the capacity region depicted in FIG. 18. This region roughly estimates the improvement that can be yielded as compared to the capacity region under simple reuse-1 schemes.

A strategy is to do time-sharing between reuse-1 and reuse-2. This will achieve a capacity region for rate tuples under a straight line connecting the two extreme points under reuse-1 and reuse-2 in FIG. 18. This linear region can be further improved by using the same strategy as used for the single user scenario, e.g., do time/power sharing between reuse 1 and reuse 2. By doing this, the achievable rate region can be characterized as the following lemma.

Lemma 3: For a single-carrier two-cell system, assume that the two users in the primary cell are characterized by $(h_1, \eta_1)$ $(h_2, \eta_2)$ and satisfy that $h_2 \geq h_1$ and $\eta_2 \leq \eta_1$, e.g., user 1 is a good user and user 2 is a bad user. The capacity region for these two users is lower bounded by the following rate region $$\left\{\left(\theta \frac{\log_2(1+2h_1 P_1)}{2}, (1-\theta)\log_2\left(1+\frac{h_2 P_2}{1+\alpha_2 h_2 P_2}\right)\right): 0 \leq \theta \leq 1,\right.$$
$$\left.\theta P_1 + (1-\theta)P_2 = P_m\right\}.$$

The achievable rate region can be compared to the simple reuse-1 and reuse-2 scheme. As shown in FIG. 20, the region is a superset to either the reuse-1 or reuse-2 scheme. FIG. 20 illustrates an achievable rate region under opportunistic power allocation. Moreover, line 2002 represents a reuse-1 capacity region, line 2004 depicts a reuse-2 capacity region, line 2006 illustrates time sharing between reuse-1 and reuse-2, line 2008 depicts time/power sharing between reuse-1 and reuse-2, and line 2010 illustrates time/power sharing between reuse-1 and $(P_1, P_2)$. The achievable rate region can be superior to the region based on time-sharing between reuse-1 and reuse-2 too by giving another freedom to share power as well. Thus, by doing this scheme, capacity gain can be achieved against the traditional reuse-1 scheme.

By using a time/power sharing between reuse-1 and reuse-2, a restriction to a power alphabet of size 3, with one the alphabet being 0, can be utilized. However, it is not clear a priori that such choices are optimal or close to optimal in the case of multiple users although it can be known that they are optimal in the single-user scenario. Next it can be shown that for the two user case, to consider a power level alphabet of size 4 is sufficient.

Theorem 5: Every rate tuple within the capacity region for the two users in a two-cell system under opportunistic power allocation can be achieved by a power allocation scheme with a power level alphabet of size 4.

Proof: Apparently, it suffices to show that the statement is true for all rate tuple on the boundary of the capacity region. First, the capacity region can be a convex region under opportunistic power allocation. This is true since any two rate tuples within the capacity region, a simple time-sharing strategy can achieve all rate tuples on the straight line connecting these two tuples. In other words, they are within the capacity region as well, which shows the convexity of the region.

An important property for a convex region is that for any point lying on the boundary of the region, a tangential straight line can be found such that the whole region is on one side of the straight line. Thus, for any point $(R_1, R_2)$ on the boundary, a set of linear parameters $w_1$ and $w_2$ can be found such that $(R_1, R_2)$ is the solution to the following optimization problem:

$$\max w_1 R_1 + w_2 R_2 \tag{35}$$

$$\text{s.t.} (R_1, R_2) \in \Lambda, \tag{36}$$

if $\Lambda$ denotes the capacity region under opportunistic power allocation. Further, this problem can be written more explicitly as follows:

$$\max_{P,\pi,\beta} \sum_{ij} \pi_{ij}\left(w_1 \beta_{ij}\log_2\left(1+\frac{h_1 P_i}{1+\eta_1 h_1 P_j}\right) + \right. \tag{37}$$
$$\left. w_2(1-\beta)\log_2\left(1+\frac{h_2 P_i}{1+\eta_2 h_2 P_j}\right)\right)$$

$$\text{s.t.} \sum_{ij} \pi_{ij} = 1; \tag{38}$$

$$\sum_{ij} \pi_{ij} P_i = P_m; \tag{39}$$

$$0 \leq \pi_{ij} \leq 1, \forall i,j; \tag{40}$$

$$\pi_{ij} = \pi_{ji}; \tag{41}$$

$$0 \leq \beta_{ij} \leq 1, \forall i,j. \tag{42}$$

The optimization over $\{\beta_{ij}\}$ given the power allocation alphabet P and the joint probability matrix $\{\pi_{ij}\}$ is trivial. From (37), it can be apparent to assign the user with better weighted capacity in state $\pi_{ij}$. Thus, the objective function (37) can be simplified to $$\max_{P,\pi} \sum_{ij} \pi_{ij}\left(\max\left(w_1 \log_2\left(1+\frac{h_1 P_i}{1+\eta_1 h_1 P_j}\right), w_2 \log_2\left(1+\frac{h_2 P_i}{1+\eta_2 h_2 P_j}\right)\right)\right).$$

Optimization over $\pi$ given any set of alphabet P can be considered. This is again a linear programming problem and the argument used in the proof of Theorem 4 can be employed. A conclusion can be reached that optimality is not lost by focusing on alphabets with size 4 and the corresponding joint probability matrix with at most four non-zero entries: $\pi_{12}, \pi_{21}, \pi_{34}, \pi_{43}$. By trying all possible choices of P, $\pi$ and all possible scheduling policies under this constraint, the whole capacity region can be achieved.

Remarks: Although Theorem 5 does not provide a closed-form expression for the capacity region, it significantly reduces the complexity of the original optimization problem (37) to an optimization problem with eight parameters. On the other hand, it also shows that the time/power sharing between reuse-1 and reuse-2 can not be too far away from the optimal capacity region since in general, any point within the capacity region should be able to be achieved by time/power sharing with two general reuse schemes: ($P_1$, $P_2$) and ($P_3$, $P_4$). A conjecture that can be made is that one of the reuse schemes should be the reuse-1 scheme, e.g., $P_3=P_4$. Thus, a better scheme which might outperform time/power sharing between reuse-1 and reuse-2 is to do time/power sharing between reuse-1 and ($P_1$, $P_2$). An advantage of this scheme can be significant especially when $P_2$ is chosen to be a small power instead of zero. Of course, according to the scheduling guideline observed herein, the good user can be scheduled in this close-to-zero carrier. By doing this, the available degrees for the good users can be increased by taking a small hit on the SNR of the bad users scheduled in $P_1$. Overall, better points can be achieved as compared to the capacity region under time/power sharing between reuse-1 and reuse-2. This observation is also shown in FIG. 20.

All the curves shown in FIG. 20 can be achievable curves under certain power reuse schemes in the time domain or the frequency domain. The benefit of doing this now can be significant. For all or nearly all practical systems, the operating point won't sit on the end point of (0, $R_2$). For any other operating point, an improvement can be provided by using smarter power reuse schemes than the simple reuse-1 scheme. The more cell-edge users in the system, the more benefit obtained.

Moreover, this improvement won't go away even when the one-user-per-slot constraint is removed. In other words, in multi-cell scenario, a good design within the carrier is not sufficient to take good care of the inter-cell interference. Collaboration in different carriers/time slots and joint power allocation and scheduling can improve the performance of all types of users in the system.

Breathing cells: opportunistic power allocation in the multi-cell scenario. The above theoretic analysis can indicate that varying power across time and/or frequency is beneficial for the overall system performance, without introducing too much complexity to the system. Further, scheduling can be done in such a way that good users are mostly scheduled in the bad carriers/time-slots, while the bad users are mostly scheduled in the good carriers/time-slots. In the single cell scenario, the gain by doing this is not so significant. On the other hand, the potential gain by doing this scheme when inter-cell interference exists can be very important since now for the cell boundary users, the power gain can now easily compensate for the loss in segments. This benefit can be seen in the capacity region comparison as shown above.

In a typical multi-cell cellular deployment, around thirty percent of the users can have an average SNR below 0 dB due to the inter-cell interference. This plays a key bottleneck to the system performance for both data and delay-sensitive applications. Thus, one would expect that similar schemes can be utilized to smartly reuse power across carriers or time to improve the system spectral efficiency. Accordingly, a scheme can be leveraged to extend the intuitions achieved in the single-cell and two-cell cases to the multi-cell scenarios, and qualitatively analyze the potential gain that can be achieved by introducing these schemes in the current cellular networks.

Power allocation patterns and their reuse over the network: The scheme proposed here is called the breathing-cell scheme, where each cell varies its transmit power limit in a slow pace (as compared to the communication time scale), and in a cooperative way, e.g., a cell transmits at high power when the others are transmitting at relatively low power. An example is shown in FIG. 12. In this example, each cell varies its power between $-P_m$ and $P_m$ with a period of 100 time slots. For adjacent cells, they choose different power level types to create fluctuations in SNRs, as shown in FIG. 10.

A slow-time-scale power variation can be chosen since in a practical system, it may not desirable to have the power varying too rapidly because of the following considerations: (1) the mobile can have difficulty to track the channel variation if the power varies too fast; and (2) it is not desirable to require too much synchronization between different base stations.

Scheduling in breathing cells: With this opportunistic power allocation scheme, stationary users in the system can see channel fluctuations. However, the channel fluctuations are highly correlated across users. For example, when the cell's allocated power curve goes up, and the neighboring cells' power goes down, all users within the cell will see channel quality improvement. Similar to the above observations, in such scenarios, a good way is to schedule a good user when the channel is bad and to schedule a bad user when the channel is good. In the two user case, this guideline is simple enough to implement. However, in the more interesting multi-user scenario, it is not that straight forward to find a simple scheduling rule to choose user wisely and fairly.

The proportional-fair scheduler can solve this problem. In the proportional-fair scheduler, the scheduler picks user k* in each time slot with the largest $R_k(t)/T_k(t)$, where $R_k(t)$ is the estimated rate that user k can transmit if scheduled based on its SNR report and $T_k(t)$ is the average throughput of user k in history. In implementations, $T_k(t)$ can be calculated over a comparatively long sliding window as compared to the communication scale, since the channel of a moving user can be non-ergotic. The window size also reflects the maximum tolerable delay in scheduling. This scheduler can be shown to maximize the system utility of $\Sigma_k \log(T_k)$, where $T_k$ is the long-term average throughput of user k.

In the case of symmetric user channel conditions, e.g., the distribution of the channel conditions between users can be substantially similar, and the proportional fair scheduler can pick the user with the best channel condition. Thus, all users will be picked when their channel conditions are relatively good as compared to the average levels and the more users in the system, the better chance that a user will be picked at its best possible channel. From a system point of view, it looks like the system's sum throughput is increasing as the number of users are increasing and this phenomena is referred to as the multi-user diversity. With multi-user diversity, tractable channel fading/variations can actually bring benefit to the system.

Figure 22:
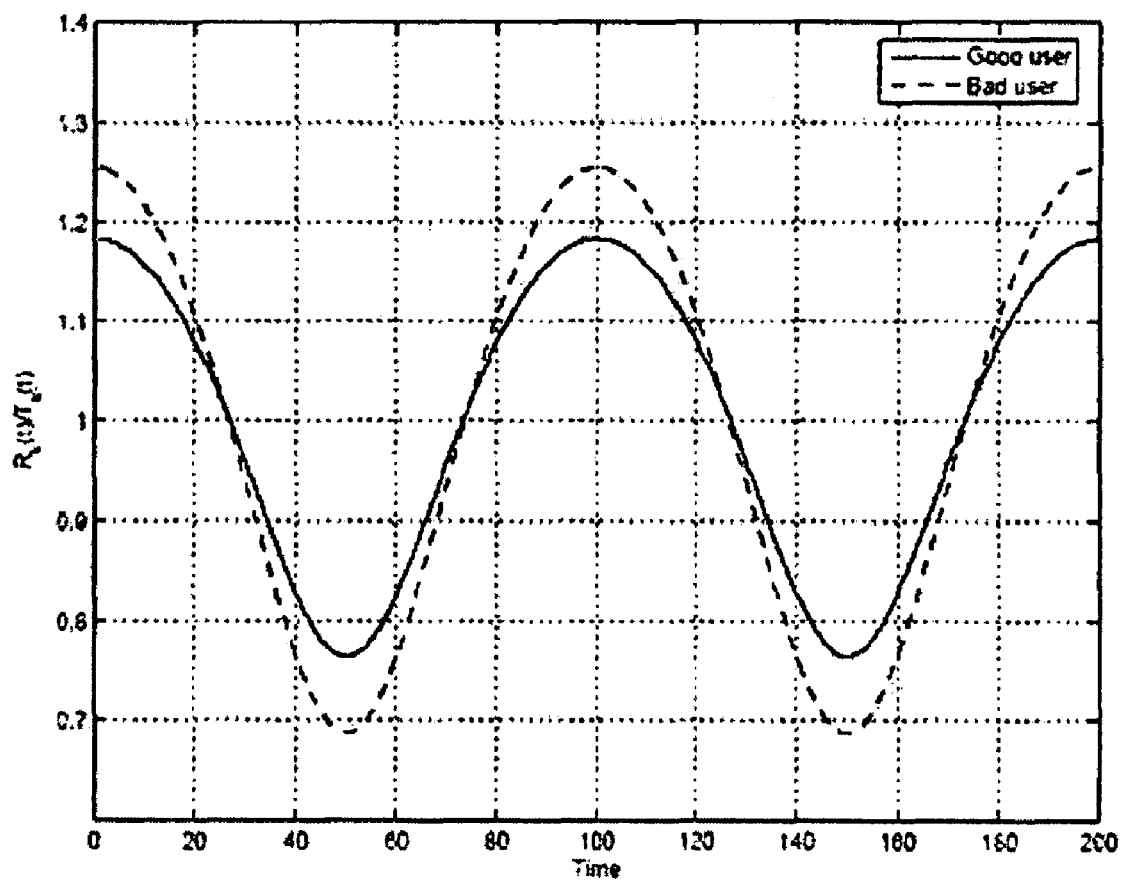
FIG. 22 is an illustration of an example diagram depicting a channel condition and normalized schedulable rate for different users in a breathing-cell scheme.

However, in breathing cells, the proportional fair scheduler behaves differently. First of all, the channel quality of users is highly correlated assuming users are stationary and the channel quality is fully determined by the power allocation variation across time. FIG. 21 and FIG. 22 show the channel condition and normalized schedulable rate for different users in the breathing-cell scheme.

In particular, FIG. 21 illustrates channel conditions for two users within the same cell under breathing cells where both channel gains can be normalized by the average channel gain of the good user. Further, FIG. 22 illustrates variations of $R_k/T_k$ for different users. FIG. 22 can provide information about how a proportional fair scheduler picks users in a particular case. Again, due to the concavity of capacity, when the channel condition improves for both users, the effect for the bad user is more important in terms of $R_k/T_k$; when the channel condition deteriorates, the good user takes a lower decrease in $R_k/T_k$. As a consequence, the scheduler picks the good user when the channel is bad and picks the bad user when the channel is good.

Another salient feature of the breathing-cell design is that the inter-cell interferences experienced by different users are not synchronized in a multi-cell scenario. This can be because the main interfering cells to users at different locations are breathing with different patterns. This adds another degree of variations to the curve of $R_k/T_k$ as shown in FIG. 22. Thus, in different time slots, the scheduler can favor the users experiencing less inter-cell interference.

Delay-sensitive applications: An issue of the breathing-cell design can be related to performance associated with delay-sensitive traffic. In such case, the system does not have so much freedom to schedule the traffic in terms of waiting for the right moment. By artificially introducing channel fluctuations to all the users, long outage periods can be introduced for cell boundary users. Accordingly, extensions of this design can address this issue.

In a multi-carrier system, a possible remedy is to reuse the power variation pattern across carriers too. For example, suppose there are three carriers per cell. A power allocation pattern can be assigned and as a consequence, at each time slot, there can be at least one carrier having better SNR as compared to the simple Reuse-1 scheme. The scheduler gives priority to the delay-sensitive traffic over the elastic traffic and first schedules them to be transmitted over the channel. It can be noted that it may not always be beneficial to schedule the delay sensitive traffic on the best carrier at the moment since it might cause left-overs for the best carrier and reduce the possible benefit for the elastic traffic. A guideline can be to schedule the delay sensitive traffic on the worst carrier(s) which are capable of depleting the delay-sensitive queue.

Such an extension can be utilized when all mobiles, including delay-sensitive mobiles, are wideband mobiles. This assumption might not be true for VOIP type of mobile. For a multi-carrier system with a lot of narrow-band delay-sensitive mobiles, another system design can be to do the fixed power reuse approach instead of the breathing-cell scheme. If the number of carriers within each cell is large, there may be no difference between vary the power across time or across carriers. The same power level variation levels can be assigned as the power-allocation schemes over multiple carriers. In the case of three carriers per sector, this leads to Flexband design. In this case, the scheduler problem for delay-sensitive users is partly shifted to the admission controller. A similar rule to the scheduling guideline mentioned above can be applied here such that a delay-sensitive mobile is admitted to the worst qualified carrier, which is capable of deliver the traffic from the mobile without causing outage. On the other hand, the other wideband data mobiles can still take advantage of a similar benefit as seen in breathing cells.

The single-carrier network with delay-sensitive users can be considered. In this case, apparently, none of the schemes seen above may help if slow variation over transmit power is adopted in all the cells. In this case, actually, a TDD-type of design can at least mitigate the problem that the breathing-cell design causes for delay-sensitive users. The TDD here is not between uplink and downlink, but between different transmit modes determined by transmit power. For example, one can choose three different power levels and each cell chooses a specific order of iterating these three power levels. For elastic users, the benefit of doing this is similar to the Flexband design with three carriers each cell. For delay sensitive users, the outage period is much shorter now as compared to the breathing-cell design. However, this scheme leverages global synchronization, which is available in TDD networks, but not in FDD networks. Also, this introduces more complexity to the system. For example, the scheduler has to track three different SNR levels for all mobiles to make the scheduling decision.

Comparison to opportunistic beamforming: There is similarity between this scheme and the opportunistic beamforming scheme utilized for a multiple antenna downlink. In opportunistic beamforming, the base station uses multiple antennas to form one or multiple beams and sweeps across the users within the cell. This is done by varying the power and phase for the signals fed into different antennas in a slow time scale.

Comparing the two schemes, there are a lot of similarities. First, both schemes try to introduce trackable channel fluctuations to stationary channels so that the system can benefit from multiuser diversity. Second, they both have problems in dealing with delay-sensitive traffic. However, the approaches proposed above also can be used for opportunistic beam-forming with slight modifications. Finally, the gain from opportunistic beam-forming will disappear if all channels are Rayleigh-faded. The breathing-cell design also suffers from Rayleigh-faded channel since in that case, the multi-user diversity boosts the SNR of all users at the times of being scheduled. The gain of the breathing-cell design mainly comes from the fact that the power gain can be translated to a better capacity gain for poor users in the reuse-1 scheme. However, the multi-user diversity caused by fading channels makes everyone a better user and thus reduces the potential gain we can achieve through breathing cells.

However, there are also some differences between the two schemes:

(1) Multiple antennas are not required to achieve the capacity gain in breathing cells. Thus the system complexity is much less as compared to the system with opportunistic beamforming.

(2) The gain of breathing cells is more significant when multiple cells exists. The opportunistic beamforming can see most of its gain even with a single cell.

(3) The gain of breathing cells can only be seen when each cell has mobiles with different SNRs. This is a valid assumption in a loaded system. However, when all the mobiles are close-to-base station mobiles, breathing cells can actually lead to a capacity loss. On the other hand, the opportunistic beamforming can still see a substantial gain when the SNRs of all mobiles are similar. The constraint there, though, is that the mobiles have to differ in angular directions. As a summary, the breathing-cell approach differentiates users according to their distance to the base station, while the opportunistic beamforming mainly differentiates mobiles with different em angular direction.

(4) The scheduler behaves differently in breathing cells. Here, it is not possible to schedule all the users at their peaks. On the contrary, for the good users, the scheduler prefers to schedule them in bad channel conditions. Of course, they can be scheduled much more often in breathing cells as compared to the reuse-1 case since a lot of resources are saved by scheduling.

Figure 23:
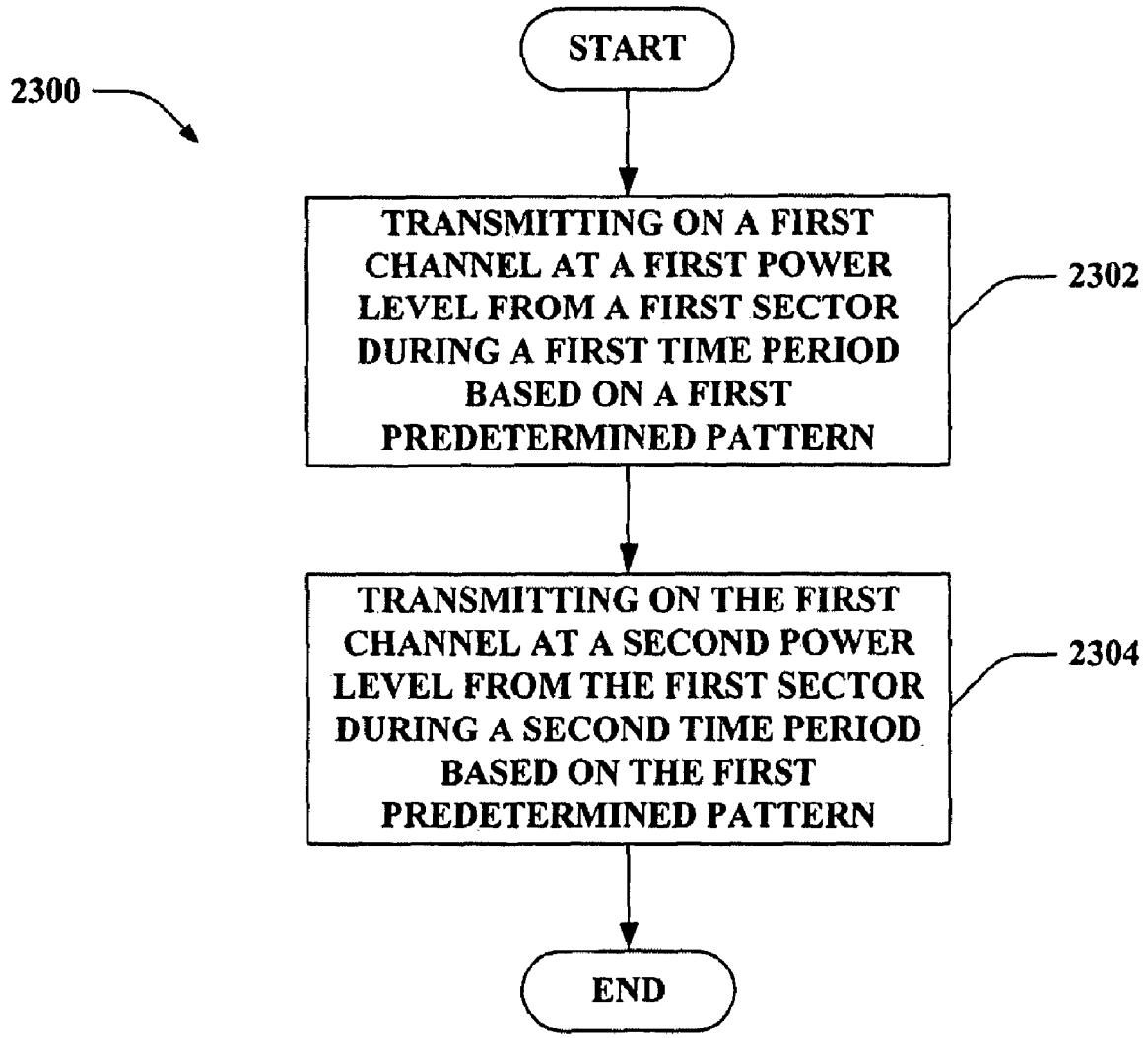
FIG. 23 is an illustration of an example methodology that facilitates operating a communication network including a wireless communication base station that includes a first sector.
Figure 24:
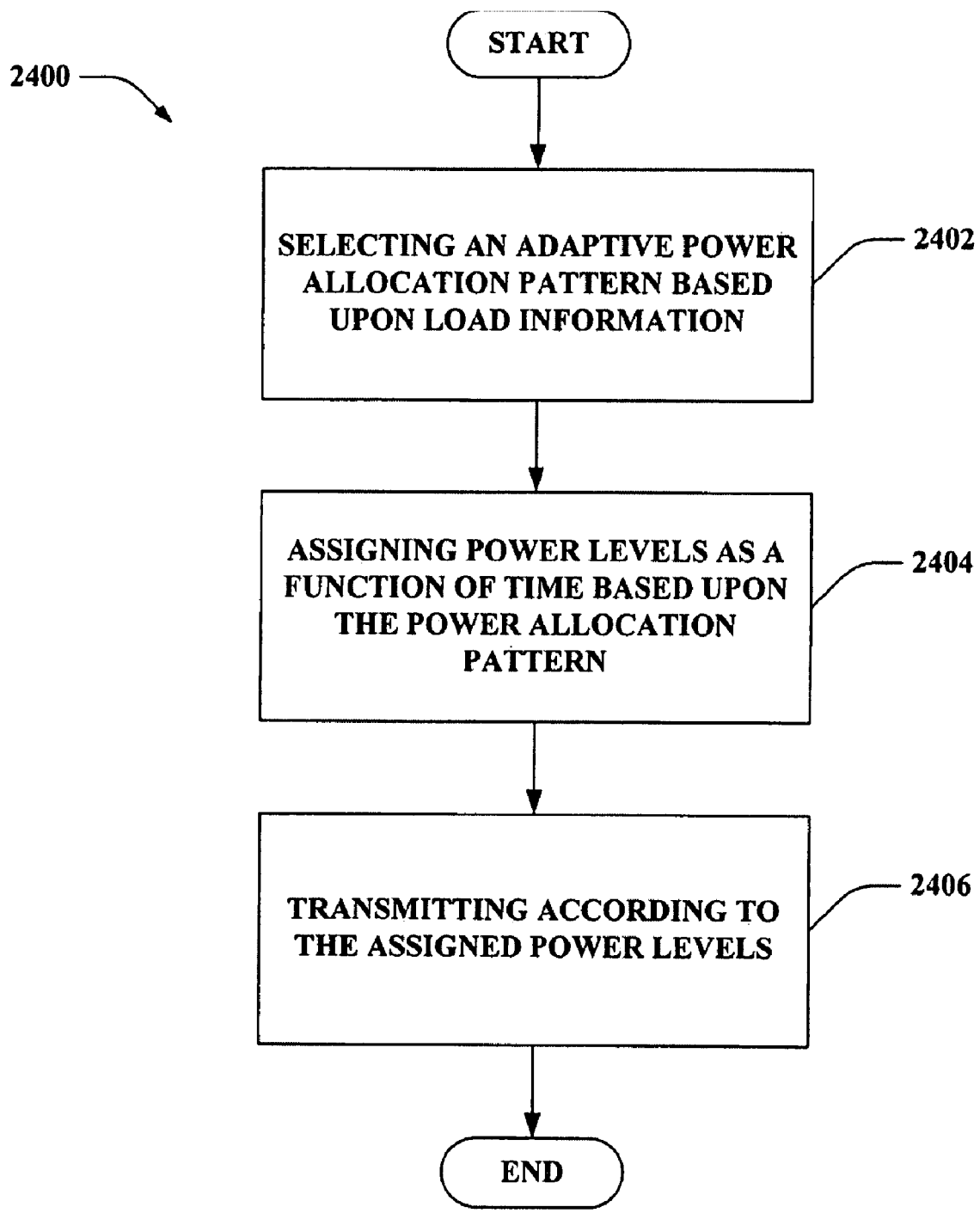
FIG. 24 is an illustration of an example methodology that facilitates adaptively assigning power allocation patterns for allocating power levels.
Figure 25:
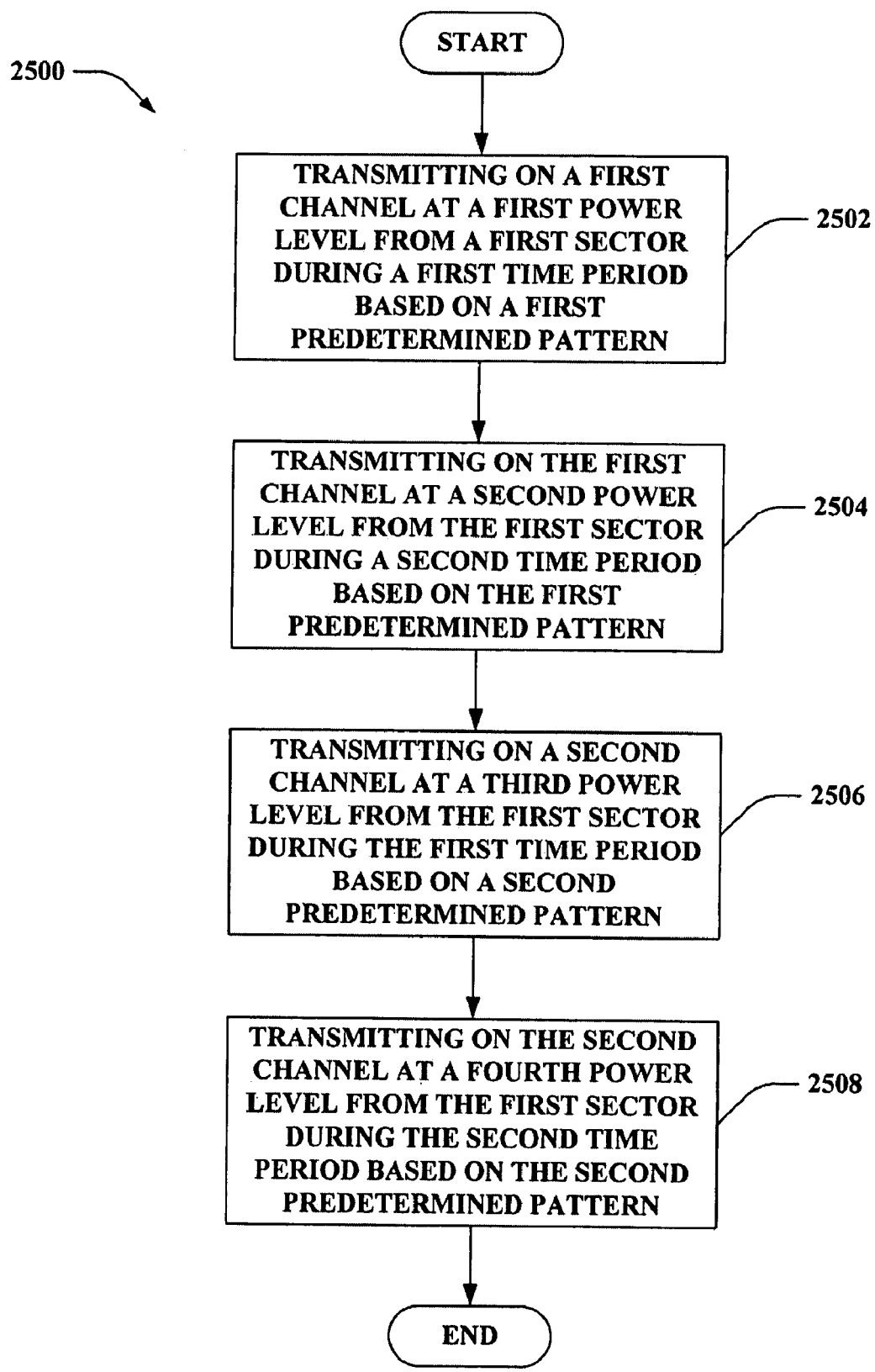
FIG. 25 is an illustration of an example methodology that facilitates operating a multiple carrier communication network including a first wireless communication base station that includes a first sector.

Referring to FIGS. 23-25, methodologies relating to power allocation in a wireless communication network are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 23, illustrated is a methodology 2300 that facilitates operating a communication network including a wireless communication base station that includes a first sector. At 2302, a first channel can be transmitted on at a first power level from the first sector during a first time period based on a first predetermined pattern (e.g., power allocation pattern). Further, the first channel can include a first frequency bandwidth (e.g., carrier). At 2304, the first channel can be transmitted on at a second power level from the first sector during a second time period based on the first predetermined pattern. Moreover, the second power level can be at least 0.5 dB different from the first power level.

The transmissions can occur upon a single carrier; however, it is contemplated that multiple carriers can be utilized. Moreover, according to another example, channel quality report(s) can be received from one or more mobile devices and based upon these reports the first channel can be scheduled; thus, the first channel can be transmitted upon to the one or more mobile devices. Pursuant to an illustration, the first sector and a second sector can be included in a common cell; thus, a sector-wise reuse scheme can be leveraged. According to another embodiment (e.g., cell-wise reuse), the first sector can be included in a first cell, where disparate sector(s) of the first cell enable transmitting at substantially similar power levels as the first sector during each time period, and a second sector can be included in a second cell, where differing sector(s) of the second cell allow transmitting at substantially similar power levels as the second sector during each time period.

It is contemplated that the transmissions can be assigned according to a scheme that can coordinate sectors and/or cells to enhance spectral efficiency. For example, the scheme can leverage discrete power levels that can be allotted in a time division manner. According to another illustration, respective smooth power allocation pattern curves can be allocated to the first sector and the second sector; these smooth power allocation pattern curves can set forth the power level for the sector as a function of time.

By way of further illustration, the first wireless communication base station can include a second sector. As such, a second channel can be transmitted on at a third power level from the second sector during the first time period based on a second predetermined pattern. Further, the second channel can include a second frequency bandwidth, where the first frequency bandwidth and the second frequency bandwidth can have at least 50% frequency bandwidth in common (e.g., a single carrier can be employed). Moreover, the second channel can be transmitted on at a fourth power level from the second sector during the second time period based on the second predetermined pattern. The fourth power level, for instance, can be at least 0.5 dB different from the third power level. Additionally, the first power level can be within 0.5 dB of the third power level and the second power level can be within 0.5 dB of the fourth power level. According to another example, it is to be appreciated that the first predetermined pattern and the second predetermined pattern can be substantially similar.

Pursuant to another example, the communication network can include a second wireless communication base station that can include the second sector described above. Accordingly, the first power level can be at least 0.5 dB greater than the third power level, while the second power level can be at least 0.5 dB less than the fourth power level. Moreover, the first predetermined pattern and the second predetermined pattern can both be periodical. It is to be appreciated that these predetermined patterns can have dissimilar periods and/or substantially similar periods. Further, the first and second predetermined patterns can have substantially similar periods with differing phases.

Turning to FIG. 24, illustrated is a methodology 2400 that facilitates adaptively assigning power allocation patterns for allocating power levels. At 2402, an adaptive power allocation pattern can be selected based upon load information. For instance, load information can be shared amongst sector(s) and/or cell(s). Further, the load information can be leveraged to compare respective loads corresponding to each sector and/or cell. Power allocation patterns can be shifted to accommodate the analyzed loads; for example, a mean power level can be shifted up or down based upon a respective load. At 2404, power levels can be assigned as a function of time based upon the power allocation pattern. The power allocation pattern, for example, can be a sinusoidal curve that provides a power level as a function of time. At 2406, transmission can occur according to the assigned power levels.

Now referring to FIG. 25, illustrated is a methodology 2500 that facilitates operating a multiple carrier communication network including a first wireless communication base station that includes a first sector. At 2502, a first channel can be transmitted on at a first power level from the first sector during a first time period based on a first predetermined pattern. For instance, the first channel can include a first frequency bandwidth. At 2504, the first channel can be transmitted on at a second power level from the first sector during a second time period based on the first predetermined pattern. At 2506, a second channel can be transmitted on at a third power level from the first sector during the first time period based on a second predetermined pattern. Further, the second channel can include a second frequency bandwidth. Moreover, the first frequency bandwidth and the second frequency bandwidth can be non-overlapping. At 2508, the second channel can be transmitted on at a fourth power level from the first sector during the second time period based on the second predetermined pattern. The second power level can be at least 0.5 dB different from the first power level and the fourth power level can be at least 0.5 dB different from the second power level. Additionally, a sum of the first power level and the third power level can be within 0.5 dB of a sum of the second power level and the fourth power level. Further, the first predetermined pattern and the second predetermined pattern can be periodical with substantially similar periods and disparate phases. Moreover, channel quality reports can be received from one or more mobile devices and transmission of the first channel and/or the second channel to the mobile device(s) can be scheduled as a function of the channel quality reports.

According to another example, a second sector can also provide transmissions. The second sector can be included with the first sector in the first wireless communication base station. Alternatively, the second sector can be included in a second wireless communication base station. Moreover, a third channel can be transmitted on at a fifth power level from the second sector during the first time period based on a third predetermined pattern. The third channel can include a third frequency bandwidth that can have at least 50% frequency bandwidth in common with the first frequency bandwidth. Also, the third channel can be transmitted on at a sixth power level from the second sector during the second time period based on the third predetermined pattern. Additionally, a fourth channel can be transmitted on at a seventh power level from the second sector during the first time period based on a fourth predetermined pattern, where the fourth channel can include a fourth frequency bandwidth that does not overlap with the third frequency bandwidth in frequency. Further, the fourth frequency bandwidth can have at least 50% frequency bandwidth in common with the second frequency bandwidth. Moreover, the fourth channel can be transmitted on at an eighth power level from the second sector during the second time period based on the fourth predetermined pattern.

These transmissions can be effectuated within a common sector. Moreover, it is contemplated that any number of sub-carriers can be supported by the common sector; the claimed subject matter is not limited to utilization of two sub-carriers. Further, it is to be appreciated that sector-wise or cell-wise reuse can be utilized in the wireless communication network. Additionally, the power levels can be allocated based upon a predetermined and/or adaptive scheme as described herein.

It will be appreciated that, in accordance with one or more aspects described herein, inferences can be made regarding allocating power levels in a wireless communication network. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining respectively loads encountered by neighboring sector(s) and/or cell(s). In accordance with another example, loading information can be leveraged to infer how to adapt power allocation patterns accordingly. It will be appreciated that the foregoing examples are illustrative in nature and are not intended to limit the number of inferences that can be made or the manner in which such inferences are made in conjunction with the various embodiments and/or methods described herein.

Figure 26:
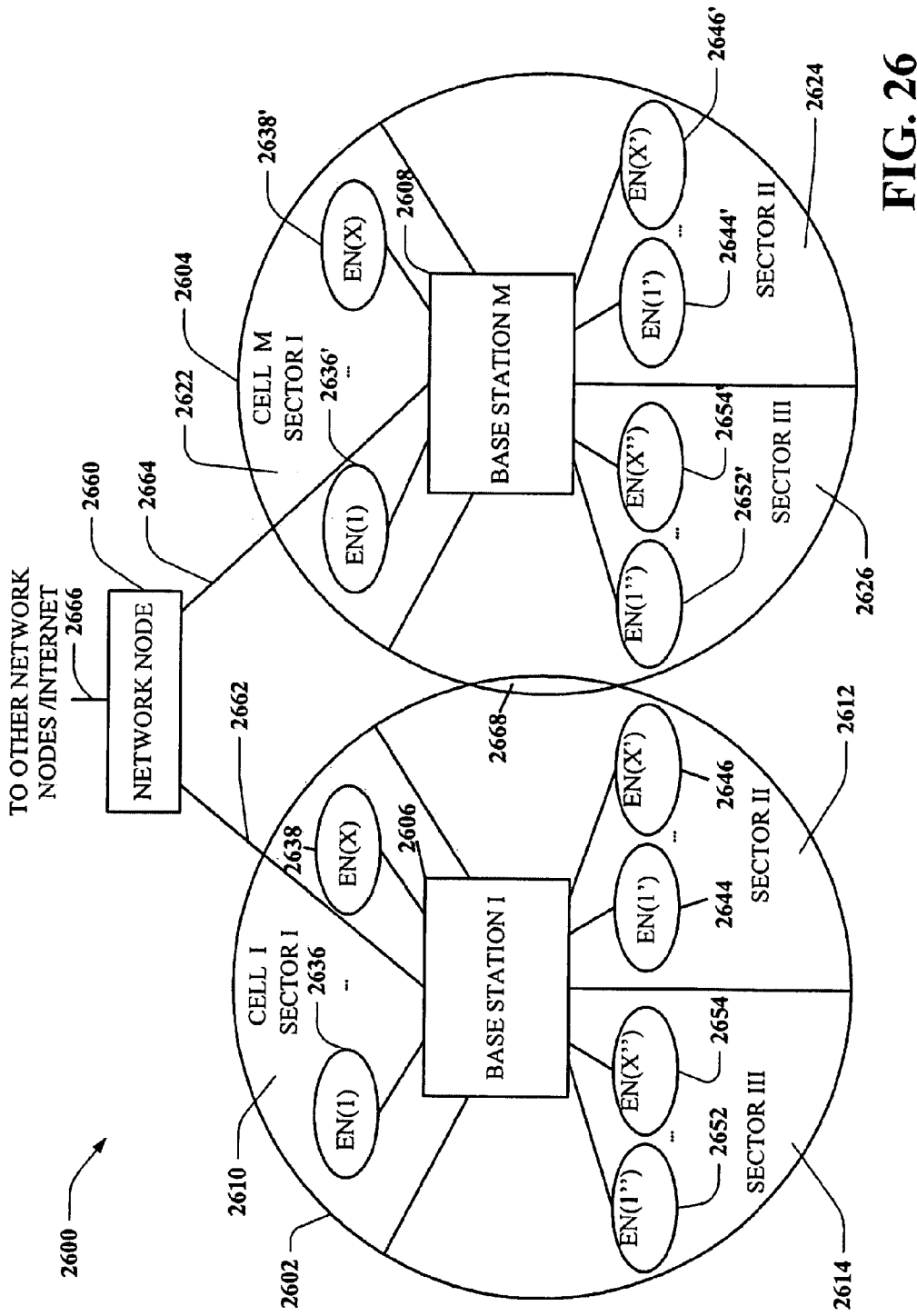
FIG. 26 is an illustration of an example communication system implemented in accordance with various aspects including multiple cells.

FIG. 26 depicts an example communication system 2600 implemented in accordance with various aspects including multiple cells: cell I 2602, cell M 2604. Note that neighboring cells 2602, 2604 overlap slightly, as indicated by cell boundary region 2668. Each cell 2602, 2604 of system 2600 includes three sectors. Cells which have not been subdivided into multiple sectors (N=1), cells with two sectors (N=2) and cells with more than 3 sectors (N>3) are also possible in accordance with various aspects. Cell 2602 includes a first sector, sector I 2610, a second sector, sector II 2612, and a third sector, sector III 2614. Each sector 2610, 2612, 2614 has two sector boundary regions; each boundary region is shared between two adjacent sectors.

Cell I 2602 includes a base station (BS), base station I 2606, and a plurality of end nodes (ENs) (e.g., wireless terminals) in each sector 2610, 2612, 2614. Sector I 2610 includes EN(1) 2636 and EN(X) 2638; sector II 2612 includes EN(1') 2644 and EN(X') 2646; sector III 2614 includes EN(1") 2652 and EN(X") 2654. Similarly, cell M 2604 includes base station M 2608, and a plurality of end nodes (ENs) in each sector 2622, 2624, 2626. Sector I 2622 includes EN(1) 2636' and EN(X) 2638'; sector II 2624 includes EN(1') 2644' and EN(X') 2646'; sector 3 2626 includes EN(1") 2652' and EN(X") 2654'.

System 2600 also includes a network node 2660 which is coupled to BS I 2606 and BS M 2608 via network links 2662, 2664, respectively. Network node 2660 is also coupled to other network nodes, e.g., other base stations, AAA server nodes, intermediate nodes, routers, etc. and the Internet via network link 2666. Network links 2662, 2664, 2666 may be, e.g., fiber optic cables. Each end node, e.g., EN(1) 2636 may be a wireless terminal including a transmitter as well as a receiver. The wireless terminals, e.g., EN(1) 2636 may move through system 2600 and may communicate via wireless links with the base station in the cell in which the EN is currently located. The wireless terminals, (WTs), e.g., EN(1) 2636, may communicate with peer nodes, e.g., other WTs in system 2600 or outside system 2600 via a base station, e.g., BS 2606, and/or network node 2660. WTs, e.g., EN(1) 2636 may be mobile communications devices such as cell phones, personal data assistants with wireless modems, etc.

Figure 27:
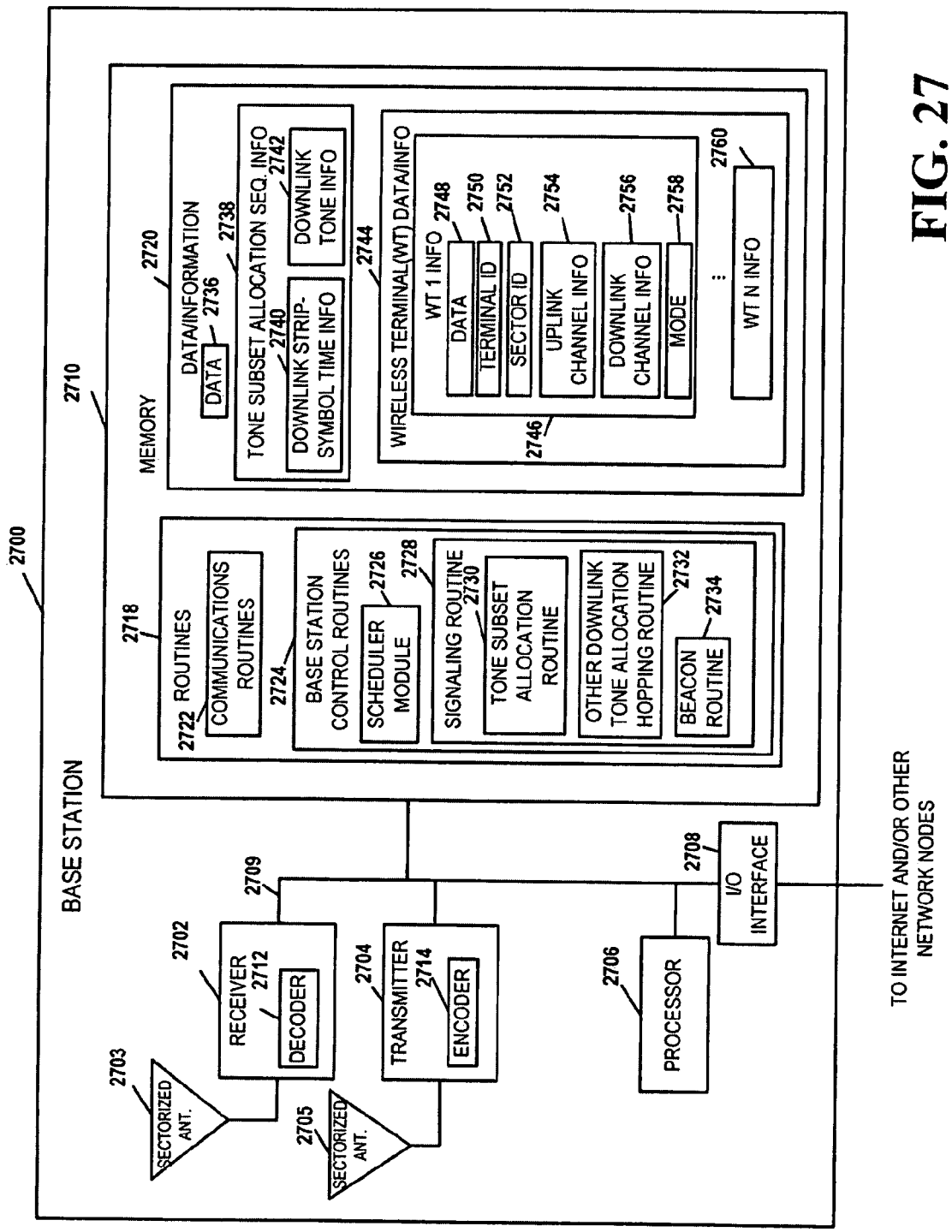
FIG. 27 is an illustration of an example base station in accordance with various aspects.

FIG. 27 illustrates an example base station 2700 in accordance with various aspects. Base station 2700 implements tone subset allocation sequences, with different tone subset allocation sequences generated for respective different sector types of the cell. Base station 2700 may be used as any one of base stations 2606, 2608 of the system 2600 of FIG. 26. The base station 2700 includes a receiver 2702, a transmitter 2704, a processor 2706, e.g., CPU, an input/output interface 2708 and memory 2710 coupled together by a bus 2709 over which various elements 2702, 2704, 2706, 2708, and 2710 may interchange data and information.

Sectorized antenna 2703 coupled to receiver 2702 is used for receiving data and other signals, e.g., channel reports, from wireless terminals transmissions from each sector within the base station's cell. Sectorized antenna 2705 coupled to transmitter 2704 is used for transmitting data and other signals, e.g., control signals, pilot signal, beacon signals, etc. to wireless terminals 2800 (see FIG. 28) within each sector of the base station's cell. In various aspects, base station 2700 may employ multiple receivers 2702 and multiple transmitters 2704, e.g., an individual receiver 2702 for each sector and an individual transmitter 2704 for each sector. Processor 2706, may be, e.g., a general purpose central processing unit (CPU). Processor 2706 controls operation of base station 2700 under direction of one or more routines 2718 stored in memory 2710 and implements the methods. I/O interface 2708 provides a connection to other network nodes, coupling the BS 2700 to other base stations, access routers, AAA server nodes, etc., other networks, and the Internet. Memory 2710 includes routines 2718 and data/information 2720.

Data/information 2720 includes data 2736, tone subset allocation sequence information 2738 including downlink strip-symbol time information 2740 and downlink tone information 2742, and wireless terminal (WT) data/info 2744 including a plurality of sets of WT information: WT 1 info 2746 and WT N info 2760. Each set of WT info, e.g., WT 1 info 2746 includes data 2748, terminal ID 2750, sector ID 2752, uplink channel information 2754, downlink channel information 2756, and mode information 2758.

Routines 2718 include communications routines 2722 and base station control routines 2724. Base station control routines 2724 includes a scheduler module 2726 and signaling routines 2728 including a tone subset allocation routine 2730 for strip-symbol periods, other downlink tone allocation hopping routine 2732 for the rest of symbol periods, e.g., non strip-symbol periods, and a beacon routine 2734.

Data 2736 includes data to be transmitted that will be sent to encoder 2714 of transmitter 2704 for encoding prior to transmission to WTs, and received data from WTs that has been processed through decoder 2712 of receiver 2702 following reception. Downlink strip-symbol time information 2740 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 2742 includes information including a carrier frequency assigned to the base station 2700, the number and frequency of tones, and the set of tone subsets to be allocated to the strip-symbol periods, and other cell and sector specific values such as slope, slope index and sector type.

Data 2748 may include data that WT1 2800 has received from a peer node, data that WT1 2800 desires to be transmitted to a peer node, and downlink channel quality report feedback information. Terminal ID 2750 is a base station 2700 assigned ID that identifies WT 1 2800. Sector ID 2752 includes information identifying the sector in which WT1 2800 is operating. Sector ID 2752 can be used, for example, to determine the sector type. Uplink channel information 2754 includes information identifying channel segments that have been allocated by scheduler 2726 for WT1 2800 to use, e.g., uplink traffic channel segments for data, dedicated uplink control channels for requests, power control, timing control, etc. Each uplink channel assigned to WT1 2800 includes one or more logical tones, each logical tone following an uplink hopping sequence. Downlink channel information 2756 includes information identifying channel segments that have been allocated by scheduler 2726 to carry data and/or information to WT1 2800, e.g., downlink traffic channel segments for user data. Each downlink channel assigned to WT1 2800 includes one or more logical tones, each following a downlink hopping sequence. Mode information 2758 includes information identifying the state of operation of WT1 2800, e.g. sleep, hold, on.

Communications routines 2722 control the base station 2700 to perform various communications operations and implement various communications protocols. Base station control routines 2724 are used to control the base station 2700 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 2728 controls the operation of receiver 2702 with its decoder 2712 and transmitter 2704 with its encoder 2714. The signaling routine 2728 is responsible for controlling the generation of transmitted data 2736 and control information. Tone subset allocation routine 2730 constructs the tone subset to be used in a strip-symbol period using the method of the aspect and using data/information 2720 including downlink strip-symbol time info 2740 and sector ID 2752. The downlink tone subset allocation sequences will be different for each sector type in a cell and different for adjacent cells. The WTs 2800 receive the signals in the strip-symbol periods in accordance with the downlink tone subset allocation sequences; the base station 2700 uses the same downlink tone subset allocation sequences in order to generate the transmitted signals. Other downlink tone allocation hopping routine 2732 constructs downlink tone hopping sequences, using information including downlink tone information 2742, and downlink channel information 2756, for the symbol periods other than the strip-symbol periods. The downlink data tone hopping sequences are synchronized across the sectors of a cell. Beacon routine 2734 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Figure 28:
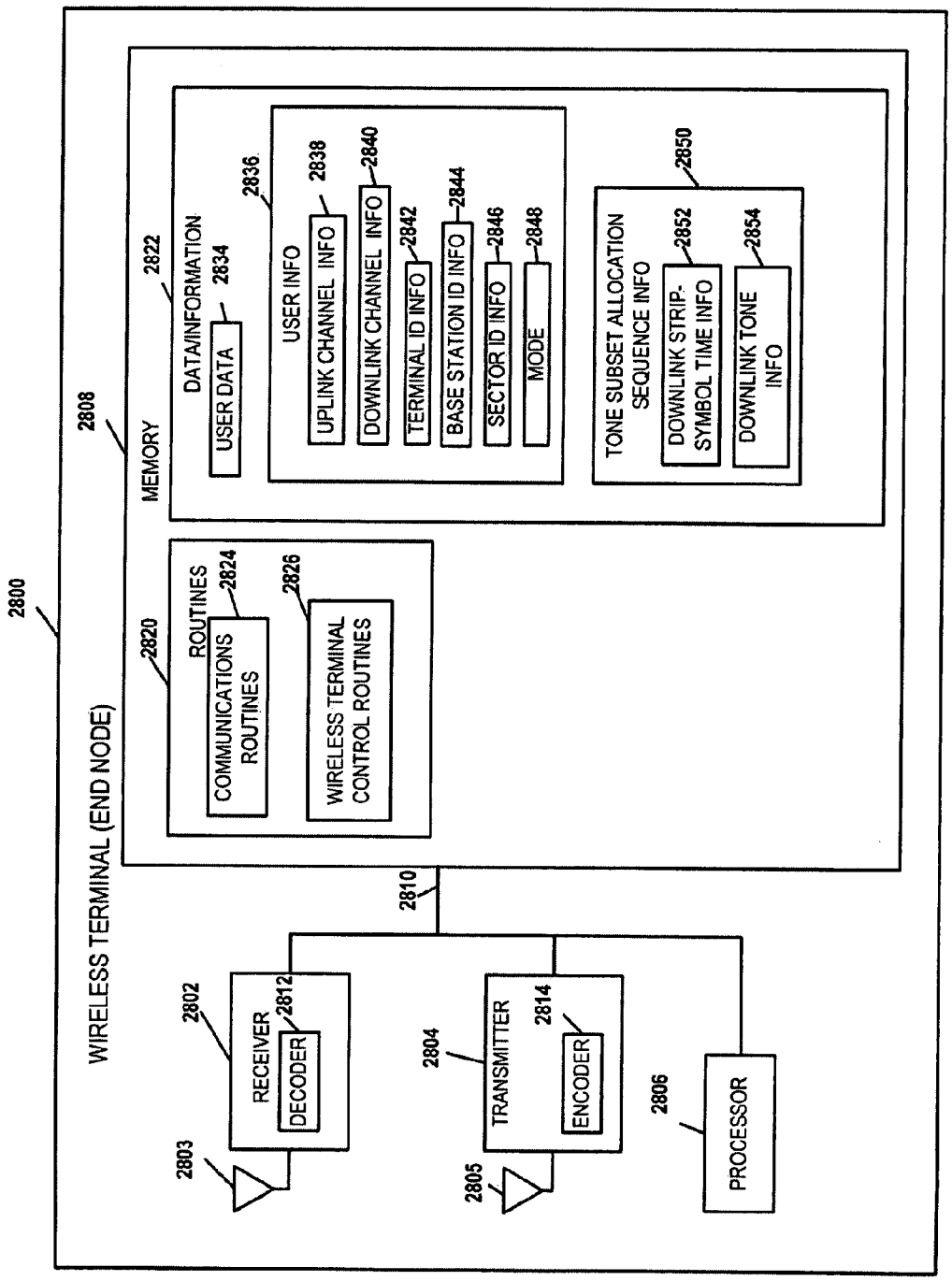
FIG. 28 is an illustration of an example wireless terminal (e.g., mobile device, end node, . . . ) implemented in accordance with various aspects described herein.

FIG. 28 illustrates an example wireless terminal (e.g., end node, mobile device, . . . ) 2800 which can be used as any one of the wireless terminals (e.g., end nodes, mobile devices, . . . ), e.g., EN(1) 2636, of the system 2600 shown in FIG. 26. Wireless terminal 2800 implements the tone subset allocation sequences. Wireless terminal 2800 includes a receiver 2802 including a decoder 2812, a transmitter 2804 including an encoder 2814, a processor 2806, and memory 2808 which are coupled together by a bus 2810 over which the various elements 2802, 2804, 2806, 2808 can interchange data and information. An antenna 2803 used for receiving signals from a base station 2700 (and/or a disparate wireless terminal) is coupled to receiver 2802. An antenna 2805 used for transmitting signals, e.g., to base station 2700 (and/or a disparate wireless terminal) is coupled to transmitter 2804.

The processor 2806 (e.g., a CPU) controls operation of wireless terminal 2800 and implements methods by executing routines 2820 and using data/information 2822 in memory 2808.

Data/information 2822 includes user data 2834, user information 2836, and tone subset allocation sequence information 2850. User data 2834 may include data, intended for a peer node, which will be routed to encoder 2814 for encoding prior to transmission by transmitter 2804 to base station 2700, and data received from the base station 2700 which has been processed by the decoder 2812 in receiver 2802. User information 2836 includes uplink channel information 2838, downlink channel information 2840, terminal ID information 2842, base station ID information 2844, sector ID information 2846, and mode information 2848. Uplink channel information 2838 includes information identifying uplink channels segments that have been assigned by base station 2700 for wireless terminal 2800 to use when transmitting to the base station 2700. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 2840 includes information identifying downlink channel segments that have been assigned by base station 2700 to WT 2800 for use when BS 2700 is transmitting data/information to WT 2800. Downlink channels may include downlink traffic channels and assignment channels, each downlink channel including one or more logical tone, each logical tone following a downlink hopping sequence, which is synchronized between each sector of the cell.

User info 2836 also includes terminal ID information 2842, which is a base station 2700 assigned identification, base station ID information 2844 which identifies the specific base station 2700 that WT has established communications with, and sector ID info 2846 which identifies the specific sector of the cell where WT 2700 is presently located. Base station ID 2844 provides a cell slope value and sector ID info 2846 provides a sector index type; the cell slope value and sector index type may be used to derive tone hopping sequences.

Mode information 2848 also included in user info 2836 identifies whether the WT 2800 is in sleep mode, hold mode, or on mode.

Tone subset allocation sequence information 2850 includes downlink strip-symbol time information 2852 and downlink tone information 2854. Downlink strip-symbol time information 2852 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 2854 includes information including a carrier frequency assigned to the base station 2700, the number and frequency of tones, and the set of tone subsets to be allocated to the strip-symbol periods, and other cell and sector specific values such as slope, slope index and sector type.

Routines 2820 include communications routines 2824 and wireless terminal control routines 2826. Communications routines 2824 control the various communications protocols used by WT 2800. For example, communications routines 2824 may enable communicating via a wide area network (e.g., with base station 2700) and/or a local area peer-to-peer network (e.g., directly with disparate wireless terminal(s)). By way of further example, communications routines 2824 may enable receiving a broadcast signal (e.g., from base station 2700). Wireless terminal control routines 2826 control basic wireless terminal 2800 functionality including the control of the receiver 2802 and transmitter 2804.

Figure 29:
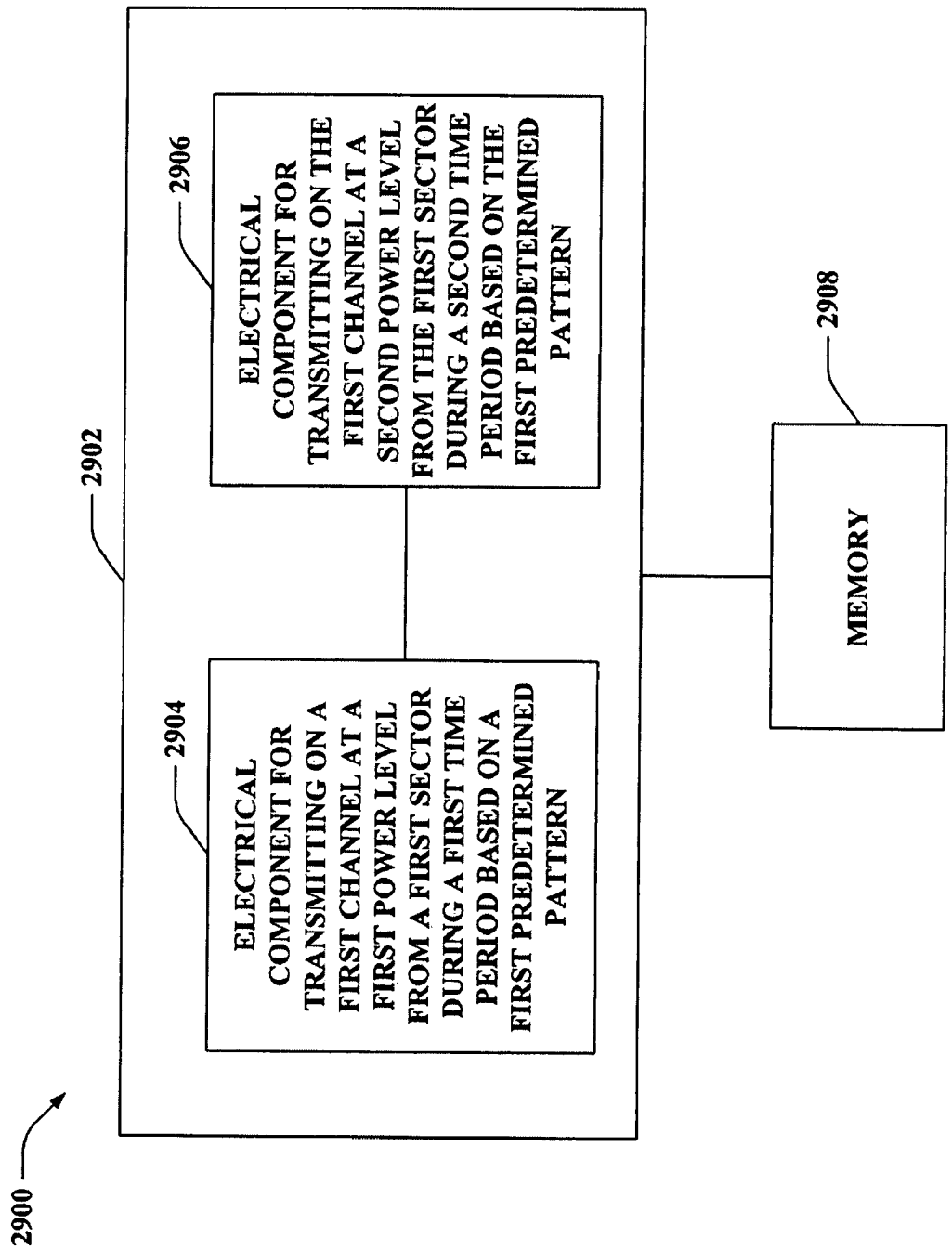
FIG. 29 is an illustration of an example system that enables communicating with allocated power levels.

With reference to FIG. 29, illustrated is a system 2900 that enables communicating with allocated power levels. For example, system 2900 can reside at least partially within a base station. It is to be appreciated that system 2900 is represented as including functional blocks, which may be functional blocks that represent functions implemented by a processor, software, or combination thereof (e.g., firmware). System 2900 includes a logical grouping 2902 of electrical components that can act in conjunction. For instance, logical grouping 2902 can include an electrical component for transmitting on a first channel at a first power level from a first sector during a first time period based on a first predetermined pattern 2904. For instance, the first channel can include a first frequency bandwidth. Further, logical grouping 2902 can comprise an electrical component for transmitting on the first channel at a second power level from the first sector during a second time period based on the first predetermined pattern 2906. The second power level, for example, can be at least 0.5 dB different from the first power level. Additionally, system 2900 can include a memory 2908 that retains instructions for executing functions associated with electrical components 2904 and 2906. While shown as being external to memory 2908, it is to be understood that one or more of electrical components 2904 and 2906 can exist within memory 2908.

Figure 30:
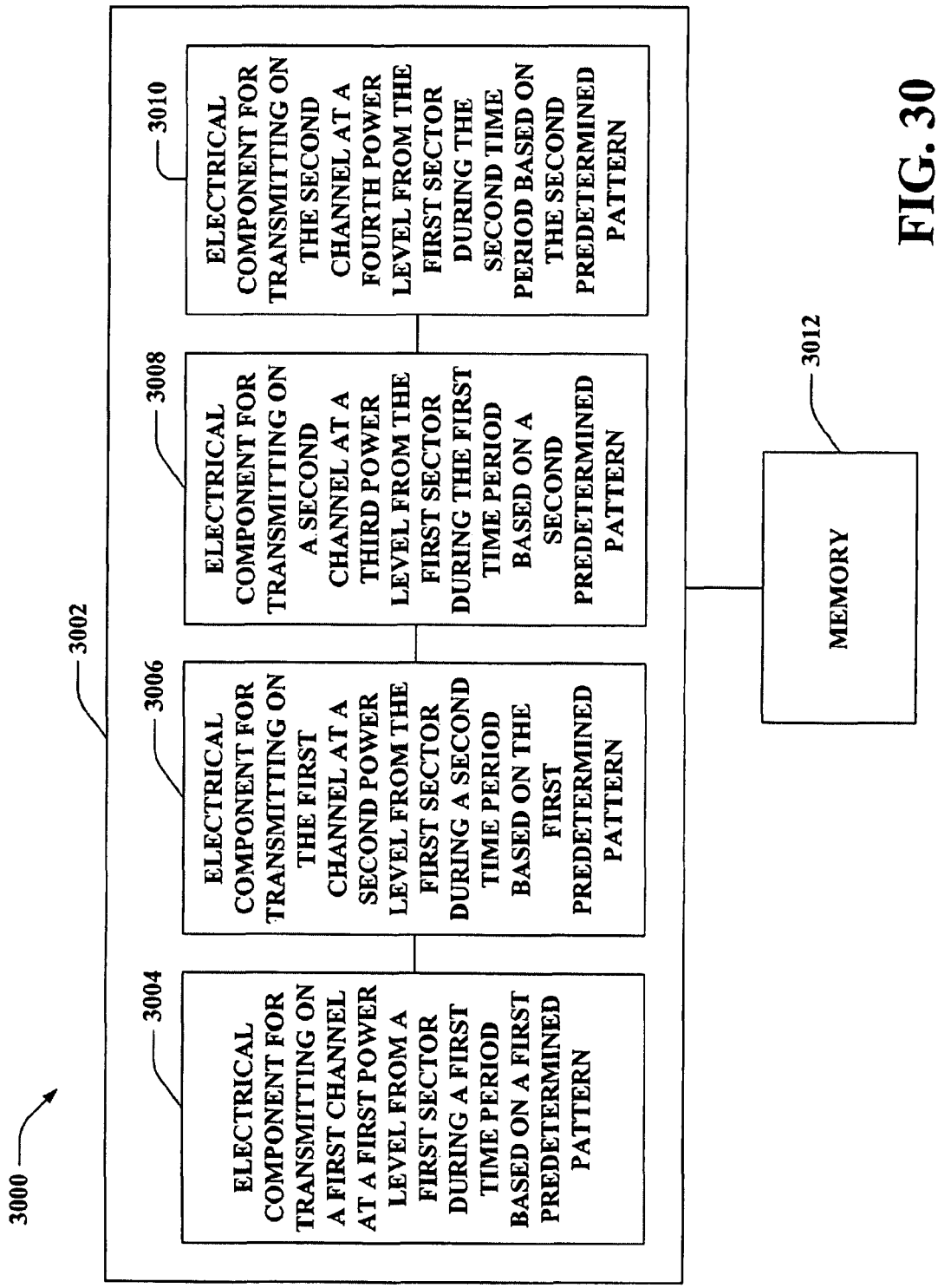
FIG. 30 is an illustration of an example system that enables communicating with allocated power levels in a multiple carrier wireless communication network.

With reference to FIG. 30, illustrated is a system 3000 that enables communicating with allocated power levels in a multiple carrier wireless communication network. For example, system 3000 can reside at least partially within a base station. It is to be appreciated that system 3000 is represented as including functional blocks, which may be functional blocks that represent functions implemented by a processor, software, or combination thereof (e.g., firmware). System 3000 includes a logical grouping 3002 of electrical components that can act in conjunction. For instance, logical grouping 3002 can include an electrical component for transmitting on a first channel at a first power level from a first sector during a first time period based on a first predetermined pattern 3004. For instance, the first channel can include a first frequency bandwidth. Further, logical grouping 3002 can comprise an electrical component for transmitting on the first channel at a second power level from the first sector during a second time period based on the first predetermined pattern 3006. Moreover, logical grouping 3002 can include an electrical component for transmitting on a second channel at a third power level from the first sector during the first time period based on a second predetermined pattern 3008. The second channel, for example, can include a second frequency bandwidth that does not overlap with the first frequency bandwidth in frequency. Logical grouping 3002 can also include an electrical component for transmitting on the second channel at a fourth power level from the first sector during the second time period based on the second predetermined pattern 3010. Additionally, system 3000 can include a memory 3012 that retains instructions for executing functions associated with electrical components 3004, 3006, 3008, and 3010. While shown as being external to memory 3012, it is to be understood that one or more of electrical components 3004, 3006, 3008, and 3010 can exist within memory 3012.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates operating a communication network including a first wireless communication base station that includes a first sector, comprising:

transmitting on a first channel at a first transmission power level from the first sector during a first time period, said first transmission power level being based on a first predetermined transmission power pattern that indicates a first pattern for varying transmission power as a function of time, the first channel including a first frequency bandwidth; and transmitting on the first channel at a second transmission power level from the first sector during a second time period, said second transmission power level being based on the first predetermined transmission power pattern, the second transmission power level being at least 0.5 dB different from the first transmission power level, wherein the first wireless communication base station includes a second sector, further comprising:

transmitting on a second channel at a third transmission power level from the second sector during the first time period, said third transmission power level being based on a second predetermined transmission power pattern that indicates a second pattern for varying transmission power as a function of time, the second channel including a second frequency bandwidth, the first frequency bandwidth and second frequency bandwidth having at least 50% frequency bandwidth in common; and transmitting on the second channel at a fourth transmission power level from the second sector during the second time period, said fourth transmission power level being based on the second predetermined transmission power pattern, the fourth transmission power level being at least 0.5 dB different from the third transmission power level.

2. The method of claim 1, further comprising:
receiving a channel quality report from a mobile device;
scheduling the first channel as a function of the channel quality report; and
transmitting on the first channel to the mobile device.

3. The method of claim 1, wherein the first transmission power level is within 0.5 dB of the third transmission power level, and the second transmission power level is within 0.5 dB of the fourth transmission power level.

4. The method of claim 1, wherein the first and the second predetermined transmission power patterns are substantially similar.

5. The method of claim 1, wherein the communication network includes a second wireless communication base station that includes a second sector, the method further comprising:

transmitting on a second channel at a third transmission power level from the second sector during the first time period, said third transmission power level being based on a second predetermined transmission power pattern, the second channel including a second frequency bandwidth, the first frequency bandwidth and second frequency bandwidth having at least 50% frequency bandwidth in common; and transmitting on the second channel at a fourth transmission power level from the second sector during the second time period, said fourth transmission power level being based on the second predetermined transmission power pattern, the fourth transmission power level is being at least 0.5 dB different from the third transmission power level.

6. The method of claim 5, wherein the first power transmission level is at least 0.5 dB greater than the third transmission power level, and the second transmission power level is at least 0.5 dB less than the fourth transmission power level.

7. The method of claim 5, wherein the first and the second predetermined transmission power patterns are periodical with dissimilar different periods.

8. The method of claim 5, wherein the first and the second predetermined transmission power patterns are periodical with substantially similar periods and different phases.

9. A wireless communications apparatus, comprising:
a memory that retains instructions related to transmitting on a first channel at a first transmission power level from a first sector during a first time period, said first transmission power level being based on a first predetermined transmission power pattern that indicates a first pattern for varying transmission power as a function of time and transmitting on the first channel at a second transmission power level from the first sector during a second time period, said second transmission power level being based on the first predetermined transmission power pattern, the second transmission power level is being at least 0.5 dB different from the first transmission power level, wherein the memory further retains instructions related to transmitting on a second channel at a third transmission power level from a second sector during the first time period, said third transmission power level being based on a second predetermined transmission power pattern and transmitting on the second channel at a fourth transmission power level from the second sector during the second time period, said fourth transmission power level being based on the second predetermined transmission power pattern, wherein the second channel includes a second frequency bandwidth, the first frequency bandwidth and the second frequency bandwidth having at least 50% frequency bandwidth in common, and the fourth transmission power level being at least 0.5 dB different from the third transmission power level; and a processor, coupled to the memory, configured to execute the instructions retained in the memory.

10. The wireless communications apparatus of claim 9, wherein the memory further retains instructions for obtaining a channel quality report from a mobile device, scheduling the first channel as a function of the channel quality report, and transmitting on the first channel to the mobile device.

11. The wireless communications apparatus of claim 9, wherein a first wireless communications base station includes the first sector and the second sector.

12. The wireless communications apparatus of claim 9, wherein a first wireless communications base station includes the first sector and a second wireless communications base station includes the second sector.

13. The wireless communications apparatus of claim 9, wherein the first and the second predetermined transmission power patterns are substantially similar.

14. The wireless communications apparatus of claim 9, wherein the first and the second predetermined transmission patterns are periodical with different periods.

15. The wireless communications apparatus of claim 9, wherein the first and the second predetermined transmission power patterns are periodical with substantially similar periods and different phases.

16. A wireless communications apparatus that enables communicating with allocated power levels, comprising:
means for transmitting on a first channel at a first transmission power level from a first sector during a first time period, said first transmission power level being based on a first predetermined transmission power pattern that indicates a first pattern for varying transmission power as a function of time, the first channel including a first frequency bandwidth;
means for transmitting on the first channel at a second transmission power level from the first sector during a second time period, said second transmission power level being based on the first predetermined transmission power pattern, the second transmission power level being at least 0.5 dB different from the first transmission power level;

means for transmitting on a second channel at a third transmission power level from a second sector during the first time period, said third transmission power level being based on a second predetermined transmission power pattern, the second channel including a second frequency bandwidth, the first frequency bandwidth and the second frequency bandwidth having at least 50% frequency bandwidth in common; and means for transmitting on the second channel at a fourth transmission power level from the second sector during the second time period, said fourth transmission power level being based on the second predetermined transmission power pattern, the fourth transmission power level being at least 0.5 dB different from the third transmission power level.

17. The wireless communications apparatus of claim 16, further comprising:

means for obtaining a channel quality report from a mobile device;

means for scheduling the first channel as a function of the channel quality report; and means for transmitting on the first channel to the mobile device.

18. The wireless communications apparatus of claim 16, wherein the first and the second predetermined transmission power patterns are periodical and have at least one of disparate periods and disparate phases.

19. A non-transitory machine-readable medium having stored thereon machine-executable instructions which when executed by a processor control a communications device to perform the steps of:

transmitting on a first channel at a first transmission power level from a first sector during a first time period, said first transmission power level being based on a first predetermined transmission power pattern that indicates a first pattern for varying transmission power as a function of time, the first channel including a first frequency bandwidth;

transmitting on the first channel at a second transmission power level from the first sector during a second time period, said second transmission power level being based on the first predetermined transmission power pattern, the second transmission power level being at least 0.5 dB different from the first transmission power level;

transmitting on a second channel at a third transmission power level from a second sector during the first time period, said third transmission power level being based on a second predetermined transmission power pattern, the second channel including a second frequency bandwidth, the first frequency bandwidth and the second frequency bandwidth having at least 50% frequency bandwidth in common; and transmitting on the second channel at a fourth transmission power level from the second sector during the second time period, said fourth transmission power level being based on the second predetermined transmission power pattern, the fourth transmission power level is being at least 0.5 dB different from the third transmission power level, the first predetermined transmission power pattern and the second predetermined transmission power pattern are periodical and have at least one of disparate periods and different phases.

20. The non-transitory machine-readable medium of claim 19, the machine-executable instructions further comprising instructions for controlling the communications device to perform the steps of: receiving a channel quality report from a mobile device; scheduling the first channel as a function of the channel quality report; and transmitting on the first channel to the mobile device.

21. In a wireless communications system, an apparatus comprising:

a processor configured to:

transmit on a first channel at a first transmission power level during a first time period, said first transmission power level being based on a first predetermined transmission power pattern, the first channel including a first frequency bandwidth;

transmit on the first channel at a second transmission power level during a second time period, said second transmission power level being based on the first predetermined transmission power pattern, the second transmission power level is being at least 0.5 dB different from the first transmission power level;

transmitting on a second channel at a third transmission power level from the second sector during the first time period, said third transmission power level being based on a second predetermined transmission power pattern that indicates a second pattern for varying transmission power as a function of time, the second channel including a second frequency bandwidth, the first frequency bandwidth and second frequency bandwidth having at least 50% frequency bandwidth in common; and transmitting on the second channel at a fourth transmission power level from the second sector during the second time period, said fourth transmission power level being based on the second predetermined transmission power pattern, the fourth transmission power level being at least 0.5 dB different from the third transmission power level.

22. The method of claim 1, wherein said steps of: i) transmitting on a first channel at a first transmission power level and ii) transmitting on a first channel at a second transmission power level are performed using a single antenna, the same single antenna being used for each of said recited transmitting steps.

23. The wireless communications apparatus of claim 9, further comprising:

a single transmitter; and wherein said transmitting on a first channel at a first transmission power level and said transmitting on a first channel at a second transmission power level are performed using said single transmitter antenna.

24. The non-transitory machine-readable medium of claim 19, wherein said processor executable instructions further include instructions for controlling said communications device to use a single transmit antenna for transmitting on a first channel at a first transmission power level and transmitting on a first channel at a second transmission power level.

25. The apparatus of claim 21, further comprising:

a single transmitter antenna; and wherein said processor is configured to use said single antenna for transmitting on a first channel at a first transmission power level and transmitting on a first channel at a second transmission power level.

* * * * *